(12) United States Patent
Zhang et al.

(10) Patent No.: US 12,520,367 B2
(45) Date of Patent: Jan. 6, 2026

(54) METHODS, NODES AND COMPUTER READABLE MEDIUM FOR RELAY CONNECTION ESTABLISHMENT

(71) Applicant: Telefonaktiebolaget LM Ericsson (publ), Stockholm (SE)

(72) Inventors: Congchi Zhang, Shanghai (CN); Zhang Zhang, Beijing (CN); Zhang Fu, Stockholm (SE); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 555 days.

(21) Appl. No.: 17/922,991

(22) PCT Filed: Apr. 30, 2021

(86) PCT No.: PCT/EP2021/061493
§ 371 (c)(1),
(2) Date: Nov. 3, 2022

(87) PCT Pub. No.: WO2021/224149
PCT Pub. Date: Nov. 11, 2021

(65) Prior Publication Data
US 2023/0363035 A1 Nov. 9, 2023

(30) Foreign Application Priority Data
May 5, 2020 (WO) ................ PCT/CN2020/088603

(51) Int. Cl.
*H04W 4/00* (2018.01)
*H04W 76/20* (2018.01)
(Continued)

(52) U.S. Cl.
CPC .......... *H04W 76/20* (2018.02); *H04W 84/042* (2013.01); *H04W 88/04* (2013.01)

(58) Field of Classification Search
None
See application file for complete search history.

(56) References Cited

U.S. PATENT DOCUMENTS

| 2016/0345243 A1 | 11/2016 | Zaus et al. |
| 2019/0028962 A1 | 1/2019 | Chun |
| 2021/0250749 A1* | 8/2021 | Cheng .................. H04W 8/005 |

OTHER PUBLICATIONS

Examination Report for Indian Patent Application No. 202217065981, mailed Apr. 9, 2025, 7 pages.
(Continued)

*Primary Examiner* — Zewdu A Beyen
(74) *Attorney, Agent, or Firm* — Withrow & Terranova, PLLC

(57) ABSTRACT

There is provided a method at a second user equipment (UE2) comprising receiving, from a first UE (UE1), a relay request message indicating a relay request of UE1. The relay request is for a relay service requested by UE1. The relay request message comprises an indication of a Public Land Mobile Network (PLMN) to which UE1 is subscribed. The method comprises determining that the relay request can be accepted by UE2 in at least one case where: the UE2 is authorized to support the relay service; the relay service is allowed by a current cell of UE2 served by a network node; UE2 is currently in a Radio Resource Control connected state; UE1 subscribes to a same PLMN as UE2; or the network node has provided relevant Access Stratum configurations to UE2. The method comprises transmitting a relay response message to UE1 based on a result of the determination.

24 Claims, 27 Drawing Sheets

(51) Int. Cl.
   *H04W 84/04*   (2009.01)
   *H04W 88/04*   (2009.01)

(56) References Cited

OTHER PUBLICATIONS

Author Unknown, "Technical Specification Group Services and System Aspects; Study on Architecture Enhancements to ProSe UE-to-Network Relay (Release 15)," Technical Report 23.733, Version 15.1.0, Dec. 2017, 3GPP Organizational Partners, 81 pages.
Author Unknown, "Technical Specification Group Services and System Aspects; Study on system enhancement for Proximity based Services (ProSe) in the 5G System (5GS) (Release 17)," Technical Report 23.752, Version 0.3.0, Jan. 2020, 3GPP Organizational Partners, 73 pages.
Author Unknown, "Technical Specification Group Services and System Aspects; Architecture enhancements for 5G System (5GS) to support Vehicle-to-Everything (V2X) services (Release 16)," Technical Specification 23.287, Version 16.2.0, Mar. 2020, 3GPP Organizational Partners, 53 pages.
Author Unknown, "Technical Specification Group Services and System Aspects; Proximity-based services (ProSe); Stage 2 (Release 15)," Technical Specification 23.303, Version 15.1.0, Jun. 2018, 3GPP Organizational Partners, 130 pages.
Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.6.0, Mar. 2020, 3GPP Organizational Partners, 436 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Technical Specification 36.300, Version 16.1.0, Mar. 2020, 3GPP Organizational Partners, 386 pages.
Author Unknown, "Technical Specification Group Radio Access Network; NR; NR and NG-RAN Overall Description; Stage 2 (Release 16)," Technical Specification 38.300, Version 16.1.0, Mar. 2020, 3GPP Organizational Partners, 133 pages.
International Search Report and Written Opinion for International Patent Application No. PCT/EP2021/061493, mailed Jul. 16, 2021, 11 pages.
International Preliminary Report on Patentability for International Patent Application No. PCT/EP2021/061493, mailed Jul. 26, 2022, 31 pages.

* cited by examiner

RM UE 1400

RM UE 1500

METHODS, NODES AND COMPUTER READABLE MEDIUM FOR RELAY CONNECTION ESTABLISHMENT

This application is a 35 U.S.C. § 371 national phase filing of International Application No. PCT/EP2021/061493, filed Apr. 30, 2021, which claims the benefit of International Application No. PCT/CN2020/088603, filed May 5, 2020, the disclosures of which are incorporated herein by reference in their entireties.

TECHNICAL FIELD

The present disclosure generally relates to the technical field of communication technologies, and particularly to methods, nodes and computer readable medium for relay connection establishment.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

3GPP TS 23.303 V15.1.0 specifies a Long Term Evolution (LTE) Device-to-Device (D2D), also known as Proximity Services (ProSe) in Release 12 and Rel-13 of LTE. Later in Release 14 and Release 15, LTE Vehicle-to-Everything (V2X) related enhancements targeting specific characteristics of vehicular communications are specified. The Third Generation Partnership Project (3GPP) started a new Work Item (WI) in August 2018 within the scope of Release 16 to develop a New Radio (NR) version of V2X communications. The NR V2X mainly targets advanced V2X services, which can be categorized into four use case groups: vehicles platooning, extended sensors, advanced driving and remote driving. The advanced V2X services may require an enhanced NR system and a new NR sidelink to meet stringent requirements in terms of latency and reliability. An NR V2X system may also have higher system capacity and better coverage and may allow for easy extension to support the future development of further advanced V2X services and other services.

Given the targeted services of NR V2X, it is commonly recognized that groupcast/multicast and unicast transmissions may be desired, in which the intended receiver of a message consists of only a subset of the vehicles in proximity to the transmitter (groupcast) or of a single vehicle (unicast). For example, in the platooning service there are certain messages that are only of interest to the member of the platoon, making the members of the platoon a natural groupcast. In another example, a see-through use case may involve only a pair of vehicles, for which unicast transmissions naturally fit. Therefore, NR sidelink (SL) can support broadcast (as in LTE), groupcast and unicast transmissions. Furthermore, NR SL may be designed in such a way that its operation is possible with and without network coverage and with varying degrees of interaction between the User Equipments (UEs) and the network (NW), including support for standalone, network-less operation.

In 3GPP, Release 17 discussions are taking place and National Security Public Safety (NSPS) is considered to be one use case that can benefit from the already developed NR SL. Therefore, it may be that 3GPP will specify enhancements related to the NSPS use case taking the NR SL of Release 16 as a baseline.

For NR SL, unicast at an access stratum (AS) is supported for services requiring high reliability. Between the same UE pair, there can be multiple SL unicast links, and each link can support multiple SL Quality of Service (QoS) flows/radio bearers as illustrated in FIG. 1.

At the access stratum, each link can be identified by the source and destination Layer 2 identity (L2 ID). For instance, the PC5 unicast link 1 in FIG. 1 can be identified by the pair of L2 ID1 (i.e. corresponding to application layer ID1) and L2 ID2 (i.e. corresponding to application layer ID2).

The SL unicast link can be established by way of a direct discovery procedure as illustrated in FIG. 2. At S2-1 of FIG. 2, one or more UEs (e.g. UE-2, UE-3 and/or UE-4) determine the destination L2 ID for signaling reception. At S2-2 of FIG. 2, at an initiating UE (UE-1), a V2X application layer provides application information for PC5 unicast communication. At S2-3 of FIG. 2, the initiating UE that intends to communicate with a specific UE or another UE supporting a specific service broadcasts a Direct Communication Request message. If a specific target UE is known by the initiating UE, the initiating UE includes the upper layer ID of the target UE in the Direct Communication Request message (i.e. this is referred to as e.g. "A) UE oriented Layer-2 link establishment" in FIG. 2). If the initiating UE is to discover all UEs in proximity having an interest in the same service, e.g. V2X service, a service ID can instead be included in the Direct Communication Request message (i.e., this is referred to as e.g. "B) V2X service-oriented Layer-2 link establishment" in FIG. 2).

UEs in proximity that receive the Direct Communication Request respond to the initiating UE, only if it is the target UE or if it has an interest in the same service. The link is established after L2 ID exchange and security setup. In more detail, in UE oriented Layer-2 link establishment, at S2-4a of FIG. 2, the specific target UE (UE-2) transmits a Direct Communication Request (Unicast) message to UE1. At S2-5a of FIG. 2, V2X service data is transferred over a unicast link. On the other hand, in V2X service-oriented Layer-2 link establishment, at S2-4b of FIG. 2, UEs in proximity (UE-2 and UE-4) each transmit a Direct Communication Request (Unicast) message to UE1. At S2-5b of FIG. 2, V2X service data is transferred over a unicast link to UE-2 and UE-4.

In the traditional specific NSPS communication systems, such as Trans European Trunked Radio (TETRA), the data rates are in an order of a few kbit/s at most, which does not provide support for the foreseen NSPS use case scenarios. Moreover, the NSPS use case requires an enhanced coverage and high reliability for its communications. Therefore, NSPS is a particularly interesting case for NR, since it can provide the required robustness in the communications and the ability to communicate even in the cases where a fixed infrastructure is not installed.

Some of the scenarios where NSPS communication has no support from infrastructure are, for example, tunnels, inside some buildings or in emergency situations where the infrastructure is destroyed or non-operative. Even though in some of these cases, cellular coverage can be provided using some mobile stations, e.g., trucks with a portable base station installed as shown in FIG. 3 (which exemplarily illustrates a scenario for NSPS including in and out-of-coverage users), the implementation of SL communications can be beneficial in NSPS. Among the requirements for NSPS, one main topic is the group communication for NSPS in cases such as, a group of workers in a building.

The scenarios which are considered for NSPS include in-coverage scenarios where a network (i.e. a network node, e.g. an evolved NodeB or gNode B (eNB/gNB)) is available and out-of-coverage scenarios where there is no infrastructure. For the out-of-coverage scenario, the addition of SL for synchronization and communication among the users is foreseen, however, the inclusion of multi-hop SL UE to UE relay has not been implemented in legacy communication systems (i.e. up to 3GPP Release 16, e.g. 3GPP TS 38.300 V16.1.0).

In Release 14 and Release 15, an L2 evolved UE-to-Network (also represented as "UE-to-NW") Relay process is introduced. The Remote UE's user plane and control plane data are relayed above Radio Link Control (RLC) via an evolved UE-to-Network Relay UE (also represented as an eRelay UE). Packet Data Convergence Protocol (PDCP) and Radio Resource Control (RRC) layers are terminated between the evolved Remote UE (also represented as eRemote UE) and the network node, e.g., eNB, while RLC, Media Access Control (MAC) and Physical (PHY) layers are terminated in each hop. FIG. 4A and FIG. 4B exemplarily illustrate a user plane radio protocol stack for L2 evolved UE-to-Network Relay process and a control plane radio protocol stack for L2 evolved UE-to-Network Relay process, respectively.

An adaptation layer between the evolved UE-to-Network Relay UE and the network node, e.g. eNB, is able to differentiate between Uu bearers of a particular evolved Remote UE. Different evolved Remote UEs and different Uu bearers of the evolved Remote UE are indicated by additional information (e.g. UE IDs and bearer IDs) included in adaptation layer header which is added to PDCP Protocol Data Unit (PDU). The adaptation layer can be considered as a part of PDCP layer or a separate new layer between PDCP layer and RLC layer.

One functionality of the adaptation layer is mapping bearers associated with similar QoS characteristics into the same logical channel (LCH) in the Uu interface between the L2 evolved UE-to-Network Relay UE and the network node, e.g. gNB. The bearers may target one or more evolved Remote UE(s) or the L2 evolved UE-to-Network Relay UE. In the PC5 interface between the evolved Remote UE and the evolved Relay UE, different Uu bearers of the evolved Remote UE are distinguished by different SL Logical Channel IDs (LCIDs).

3GPP TR 23.733 V15.1.0 discloses some possible approaches to establish a UE-to-NW relay service, but without any details. FIG. 5 exemplarily shows a traditional eRemote UE Triggered Service Request process in LTE, as discussed in 3GPP TR 23.733 V15.1.0. As shown in FIG. 5, the traditional eRemote UE Triggered Service Request process includes:

S5-1. The eRemote UE and eRelay UE perform a PC5 discovery procedure, according to a selected solution for Key Issue 2.

S5-2. Triggered by upper layers, the eRemote UE initiates one-to-one communication with the eRelay UE, by sending an INDIRECT_COMMUNICATION_REQUEST to the eRelay UE.

It is up to Stage 3 to decide whether a new PC5 signaling message is needed or not.

S5-3. Triggered by the request received from the eRemote UE, the eRelay UE sends a Service Request message (eRelay UE identity e.g. Globally Unique Temporary UE Identity (GUTI), Serving-Temporary Mobile Subscriber Identity (S-TMSI)) to eRelay UE's Mobility Management Entity (MME). This step is according to clause 5.3.4 in TS 23.401.

If the eRelay UE is already in an Evolved Packet System Connection Management (ECM)_CONNECTED state and is authorised to perform an eRelay service then step S5-3 can be omitted.

S5-4. The eRelay UE sends an INDIRECT_COMMUNICATION_RESPONSE message to the eRemote UE.

S5-5. If the INDIRECT_COMMUNICATION_REQUEST was accepted, the eRemote UE sends a Service Request (eRemote UE identity, e.g., GUTI, S-TMSI) to the eRemote UE's MME. The Service Request message is encapsulated in an RRC message to the eNB. The eRelay UE forwards the message to the eNB using RAN specified L2 relay method.

S5-6. The eNB uses the eRemote UE's identity to derive the eRemote UE MME identity and forwards the Non-Access Stratum (NAS) message in an S1-MME control message. This step is according to clause 5.3.4 in TS 23.401.

Whether the eNB attaches the eRelay UE's identifier or any other information to the S1-MME control message, depends on the final selection for an eRemote UE Idle mode operation and charging solution S5-7. NAS authentication/security procedures as defined in clause 5.3.10 in TS 23.401 on "Security function" may be performed.

S5-8. The MME sends an S1 Application Protocol (S1-AP) Initial Context Setup Request message to the eNB.

S5-9. The eNB performs the radio bearer establishment procedure according to clause 5.3.4 in TS 23.401. The eRelay UE forwards all the messages between the eRemote UE and eNB using RAN specified L2 relay method.

S5-10. The uplink data from the eRemote UE can now be forwarded by the eRelay UE and the eNB to the Serving Gateway (SGW). The SGW forwards the uplink data to the Public Data Network (PDN) Gateway (PGW).

S5-11. The eNB sends an S1-AP message Initial Context Setup Complete to the MME. This step is described in detail in TS 36.300.

Although the L2 UE-to-NW relay has many use cases and has been widely discussed, it not been defined how to establish an L2 UE-to-NW relay connection in an efficient way with necessary details. It is thus desired to achieve an approach to efficiently establish an L2 UE-to-NW relay connection.

SUMMARY

One of the objects of the present disclosure is to achieve a more efficient approach for relay connection establishment between UEs by taking features, such as discovery, access control, service request, AS configurations, authorization, RRC state, etc., into account.

According to a first aspect of the present disclosure, a method at a second User Equipment (UE) is provided. The method comprises receiving, from a first UE, a relay request message indicating a relay request of the first UE. The relay request is for a relay service requested by the first UE. The relay request message comprises an indication of a Public Land Mobile Network (PLMN) to which the first UE is subscribed. The method also comprises determining that the relay request can be accepted by the second UE in at least one case where: the second UE is authorized to support the relay service, the relay service is allowed by a current cell of the second UE served by a network node, the second UE is currently in a Radio Resource Control 'RRC'_CONNECTED state, the first UE subscribes to a same PLMN as the second UE, or the network node has provided relevant Access Stratum 'AS' configurations to the second UE. The method also comprises transmitting a relay response message to the first UE based on a result of the determination.

In an exemplary embodiment, the method may further comprise receiving system information of the current cell of the second UE from the network node, the system information comprising at least one of an indication of whether the relay service is allowed by the current cell of the second UE, or a PLMN list.

In an exemplary embodiment, the relay response message may comprise at least one of an indication of whether or not the second UE accepts the relay request, an RRC state of the second UE, an indication of a PLMN subscribed by the second UE, an indication of whether the second UE subscribes to a same PLMN as the first UE, the received system information, or capability information of the second UE.

In an exemplary embodiment, the relay response message may be transmitted to the first UE only if the second UE accepts the relay request.

In an exemplary embodiment, the relay request message may further comprise an indication of whether or not a Layer 2 relay or a Layer 3 relay is requested.

In an exemplary embodiment, the relay response message may be transmitted to the first UE after at least one of: the second UE receives the relay request message from the first UE, the second UE enters an RRC connected state from an RRC inactive or idle state and is configured, by the network node based on an RRC setup message received from the network node, to support the relay service in an RRC connection establishment process with the network node, or the second UE is configured, by the network node based on an RRC reconfiguration message received from the network node, to support the relay service in an RRC reconfiguration process with the network node.

In an exemplary embodiment, if the second UE is in an RRC connected state, the method may further comprise initiating an RRC reconfiguration process with the network node in order to support the relay service, after the second UE receives, from the first UE, a relay accept message indicating that the second UE is selected by the first UE as a relay node or the relay request message.

In an exemplary embodiment, the RRC reconfiguration process may comprise transmitting, to the network node, an RRC reconfiguration request message or a relay service request message that includes the relay service, receiving, from the network node, an RRC reconfiguration message including AS configurations for the second UE to support the relay service, configuring the second UE itself based on the AS configurations in the received RRC reconfiguration message, and transmitting, to the network node, an RRC reconfiguration complete message indicating that the second UE is configured based on the AS configurations in the received RRC reconfiguration message to support the relay service.

In an exemplary embodiment, the AS configurations may comprise at least one of an adaptation layer configuration, a Uu Logical Channel (LCH) configuration, or a PC5 LCH configuration.

In an exemplary embodiment, the adaptation layer configuration may comprise at least one of indexes assigned for the first UE and the second UE, or a Uu LCH to PC5 LCH mapping.

According to a second aspect of the present disclosure, a method at a first UE is provided. The method comprises transmitting, to at least one second UE, a relay request message indicating a relay request of the first UE. The relay request is for a relay service requested by the first UE, and the relay request message comprises an indication of a Public Land Mobile Network (PLMN) to which the first UE is subscribed. The method also comprises receiving a relay response message from the at least one second UE. Each relay response message comprises at least one of an indication of whether or not the corresponding second UE accepts the relay request, a Radio Resource Control (RRC) state of the corresponding second UE, an indication of a PLMN to which the corresponding second UE is subscribed, an indication of whether or not the corresponding second UE subscribes to a same PLMN as the first UE, system information received by the corresponding second UE from a network node that serves the corresponding second UE, or capability information of the corresponding second UE.

In an exemplary embodiment, the relay response message may be received from the corresponding second UE only if the corresponding second UE accepts the relay request in at least one case where the corresponding second UE is authorized to support the relay service, the relay service is allowed by a current cell of the corresponding second UE served by the network node, the corresponding second UE is currently in an RRC connected state, the first UE subscribes to a same PLMN as the corresponding second UE, or the network node has provided relevant Access Stratum (AS) configurations to the corresponding second UE.

In an exemplary embodiment, the system information may comprise at least one of an indication of whether or not the relay service is allowed by a current cell of the corresponding second UE, or a PLMN list.

In an exemplary embodiment, the relay request message may further comprise an indication of whether or not a Layer 2 relay or a Layer 3 relay is requested.

In an exemplary embodiment, the relay response message may be received from the corresponding second UE after at least one of the first UE transmits the relay request message to the corresponding second UE, the corresponding second UE enters an RRC connected state from an RRC inactive or idle state and is configured, by the network node based on an RRC setup message received from the network node, to support the relay service in an RRC connection establishment process of the corresponding second UE with the network node, or the corresponding second UE is configured, by the network node based on an RRC reconfiguration message received from the network node, to support the relay service in an RRC reconfiguration process of the corresponding second UE with the network node.

In an exemplary embodiment, the method may further comprise initiating an RRC connection establishment process between the first UE and the network node after at least one of the RRC connection establishment process between the first UE and the corresponding second UE is established, or the second UE is configured to support the relay service.

According to a third aspect of the present disclosure, a method at a network node is provided. The method comprises receiving, from a second User Equipment (UE) served by the network node, a configuration request message indicating a request for the network node to configure the second UE to support a relay service that is requested by a first UE for the second UE. The method also comprises transmitting, to the second UE, a configuration message for configuring the second UE to support the relay service. The configuration message comprises Access Stratum (AS) configurations that include at least one of an adaptation layer configuration, a Uu Logical Channel (LCH) configuration, or a PC5 LCH configuration.

In an exemplary embodiment, in a case where the second UE is in an Radio Resource Control (RRC) inactive or idle state, the configuration request message may be an RRC setup request message that comprises the relay service, and the configuration message may be an RRC setup message that comprises the AS configurations for the second UE to support the relay service.

In an exemplary embodiment, the method may further comprise receiving, from the second UE, an RRC setup complete message indicating that the second UE is configured based on the RRC setup message, wherein the RRC setup complete message includes an NAS registration request, transmitting the NAS registration request to an Access Management Function (AMF) node of the second UE to initialize context of the second UE at the AMF node, and receiving, from the AMF node, a UE context setup request message indicating whether or not a Layer 2 relay and/or a Layer 3 relay is authorized.

In an exemplary embodiment, in a case where the second UE is in a Radio Resource Control (RRC) connected state, or the second UE enters the RRC connected state from an RRC active or idle state but is not configured to support the relay service in an RRC connection establishment process, the configuration request message may be an RRC reconfiguration request message or a relay service request message that comprises the relay service, and the configuration message may be an RRC reconfiguration message that comprises the AS configurations for the second UE to support the relay service.

In an exemplary embodiment, the method may further comprise receiving, from the second UE, an RRC reconfiguration complete message indicating that the second UE is configured to support the relay service.

In an exemplary embodiment, the adaptation layer configuration may comprise at least one of indexes assigned for the first UE and the second UE, or a Uu LCH to PC5 LCH mapping.

In an exemplary embodiment, the configuration request message may be received from the second UE, after the second UE is selected by the first UE as a relay node, or after the second UE receives, from the first UE, a relay request message including the relay service requested by the first UE.

In an exemplary embodiment, the method may further comprise transmitting system information to the second UE, the system information comprising at least one of an indication of whether or not the relay service is allowed by a current cell of the second UE served by the network node, or a Public Land Mobile Network (PLMN) list.

According to a fourth aspect of the present disclosure, a second UE is provided. The second UE comprises at least one processor, and at least one memory, storing instructions which, when executed on the at least one processor, cause the second UE to perform the method according to the first aspect of the present disclosure.

According to a fifth aspect of the present disclosure, a first UE is provided. The first UE comprises at least one processor, and at least one memory, storing instructions which, when executed on the at least one processor, cause the first UE to perform the method according to the second aspect of the present disclosure.

According to a sixth aspect of the present disclosure, a network node is provided. The network node comprises at least one processor, and at least one memory, storing instructions which, when executed on the at least one processor, cause the network node to perform the method according to the third aspect of the present disclosure.

According to a seventh aspect of the present disclosure, a computer readable storage medium is provided. The computer storage medium has computer program instructions stored thereon, the computer program instructions, when executed by at least one processor in a network node, cause the at least one processor to perform the methods respectively according to the first, second, and/or third aspects of the present disclosure.

According to an eighth aspect of the present disclosure, a communication system is provided. The communication system includes a host computer including: processing circuitry configured to provide user data; and a communication interface configured to forward the user data to a cellular network for transmission to a UE. The cellular network includes a base station, a transmission point, relay node, an Integrated Access and Backhaul (IAB) node or a UE having a radio interface and processing circuitry. The base station's processing circuitry is configured to perform the method according to the first or fourth aspect of the present disclosure.

In an exemplary embodiment, the communication system can further include the base station.

In an exemplary embodiment, the communication system can further include the UE. The UE can be configured to communicate with the base station.

In an exemplary embodiment, the processing circuitry of the host computer can be configured to execute a host application, thereby providing the user data. The UE can include processing circuitry configured to execute a client application associated with the host application.

According to a ninth aspect of the present disclosure, a method is provided. The method is implemented in a communication system including a host computer, a base station and a UE. The method includes: at the host computer, providing user data; and at the host computer, initiating a transmission carrying the user data to the UE via a cellular network including the base station. The base station can perform the method according to the first aspect of the present disclosure.

In an exemplary embodiment, the method further can include: at the base station, transmitting the user data.

In an exemplary embodiment, the user data can be provided at the host computer by executing a host application. The method can further include: at the UE, executing a client application associated with the host application.

According to a tenth aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry. The UE's processing circuitry is configured to perform the method according to the first aspect of the present disclosure.

In an exemplary embodiment, the communication system can further include the UE.

In an exemplary embodiment, the cellular network can further include a base station configured to communicate with the UE.

In an exemplary embodiment, the processing circuitry of the host computer can be configured to execute a host application, thereby providing the user data. The UE's processing circuitry can be configured to execute a client application associated with the host application.

According to an eleventh aspect of the present disclosure, a method is provided. The method is implemented in a communication system including a host computer, a base station and a UE. The method includes: at the host computer, providing user data; and at the host computer, initiating a transmission carrying the user data to the UE via a cellular network including the base station. The UE can perform the method according to the fourth aspect of the present disclosure.

In an exemplary embodiment, the method can further include: at the UE, receiving the user data from the base station.

According to a twelfth aspect of the present disclosure, a communication system is provided. The communication system includes a host computer including: a communication interface configured to receive user data originating from a transmission from a UE to a base station. The UE includes a radio interface and processing circuitry. The UE's processing circuitry is configured to: perform the method according to the first aspect of the present disclosure.

In an exemplary embodiment, the communication system can further include the UE.

In an exemplary embodiment, the communication system can further include the base station. The base station can include a radio interface configured to communicate with the UE and a communication interface configured to forward to the host computer the user data carried by a transmission from the UE to the base station.

In an exemplary embodiment, the processing circuitry of the host computer can be configured to execute a host application. The UE's processing circuitry can be configured to execute a client application associated with the host application, thereby providing the user data.

In an exemplary embodiment, the processing circuitry of the host computer can be configured to execute a host application, thereby providing request data. The UE's processing circuitry can be configured to execute a client application associated with the host application, thereby providing the user data in response to the request data.

According to a thirteenth aspect of the present disclosure, a method is provided. The method is implemented in a communication system including a host computer, a base station and a UE. The method includes: at the host computer, receiving user data transmitted to the base station from the UE. The UE can perform the method according to the first aspect of the present disclosure.

In an exemplary embodiment, the method can further include: at the UE, providing the user data to the base station.

In an exemplary embodiment, the method can further include: at the UE, executing a client application, thereby providing the user data to be transmitted; and at the host computer, executing a host application associated with the client application.

In an exemplary embodiment, the method can further include: at the UE, executing a client application; and at the UE, receiving input data to the client application, the input data being provided at the host computer by executing a host application associated with the client application. The user data to be transmitted is provided by the client application in response to the input data.

According to a fourteenth aspect of the present disclosure, a communication system is provided. The communication system includes a host computer including a communication interface configured to receive user data originating from a transmission from a UE to a base station. The base station includes a radio interface and processing circuitry. The base station's processing circuitry is configured to perform the method according to the first or fourth aspect of the present disclosure.

In an exemplary embodiment, the communication system can further include the base station.

In an exemplary embodiment, the communication system can further include the UE. The UE can be configured to communicate with the base station.

In an exemplary embodiment, the processing circuitry of the host computer can be configured to execute a host application; the UE can be configured to execute a client application associated with the host application, thereby providing the user data to be received by the host computer.

According to a fifteenth aspect of the present disclosure, a method is provided. The method is implemented in a communication system including a host computer, a base station and a UE. The method includes: at the host computer, receiving, from the base station, user data originating from a transmission which the base station has received from the UE. The base station can perform the method according to the first or fourth aspect of the present disclosure.

In an exemplary embodiment, the method can further include: at the base station, receiving the user data from the UE.

In an exemplary embodiment, the method can further include: at the base station, initiating a transmission of the received user data to the host computer.

The technical solutions according to the embodiments of the present disclosure may achieve at least the benefits of efficient relay path/connection establishment, reduced signaling overhead, and improved power efficiency.

BRIEF DESCRIPTION OF THE DRAWINGS

The objects, advantages and characteristics of the present disclosure will be more apparent, according to descriptions of preferred embodiments in connection with the drawings, in which.

Figure 1:
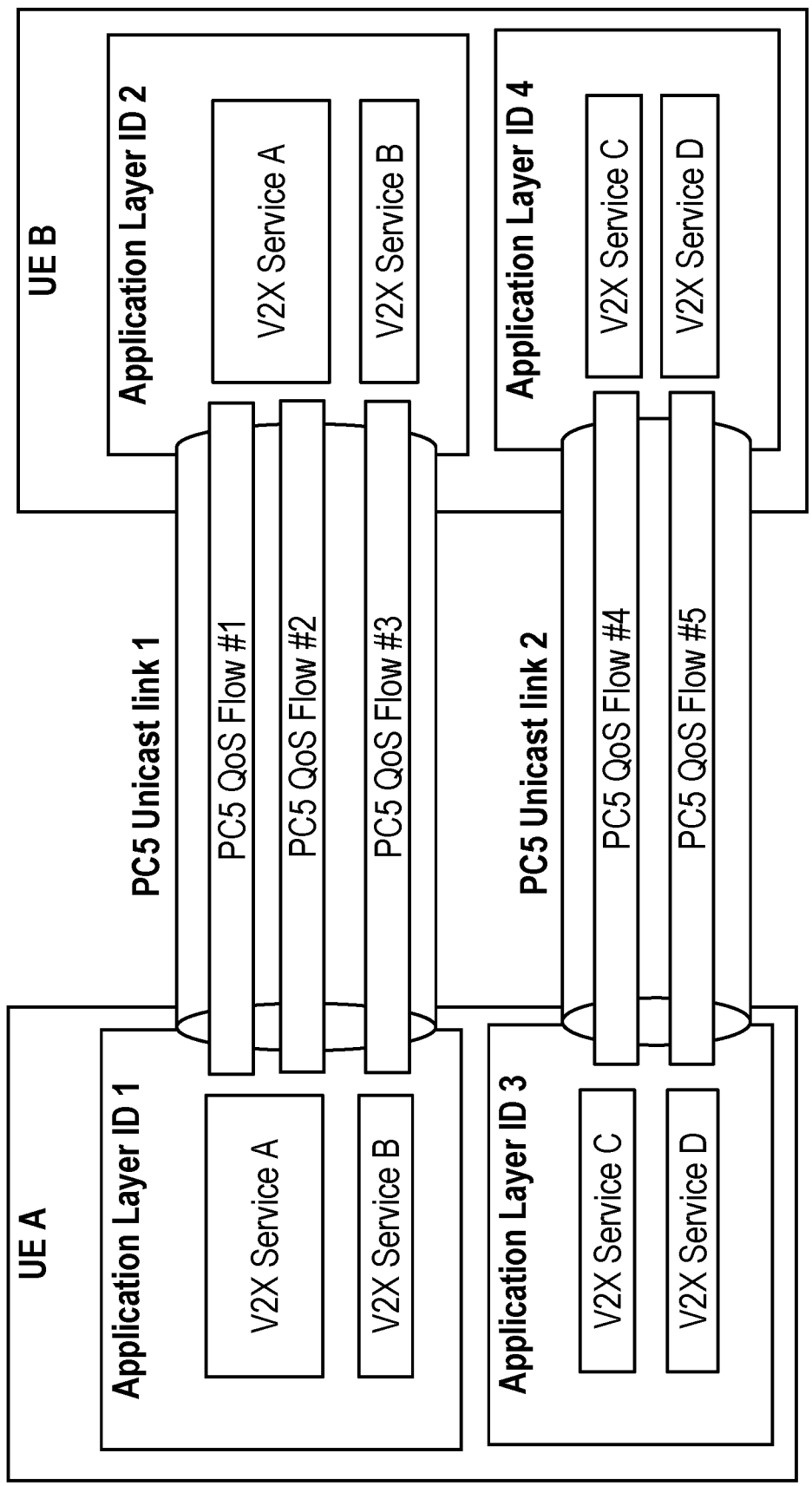
FIG. 1 schematically illustrates an exemplary NR SL unicast links between two UEs.
Figure 2:
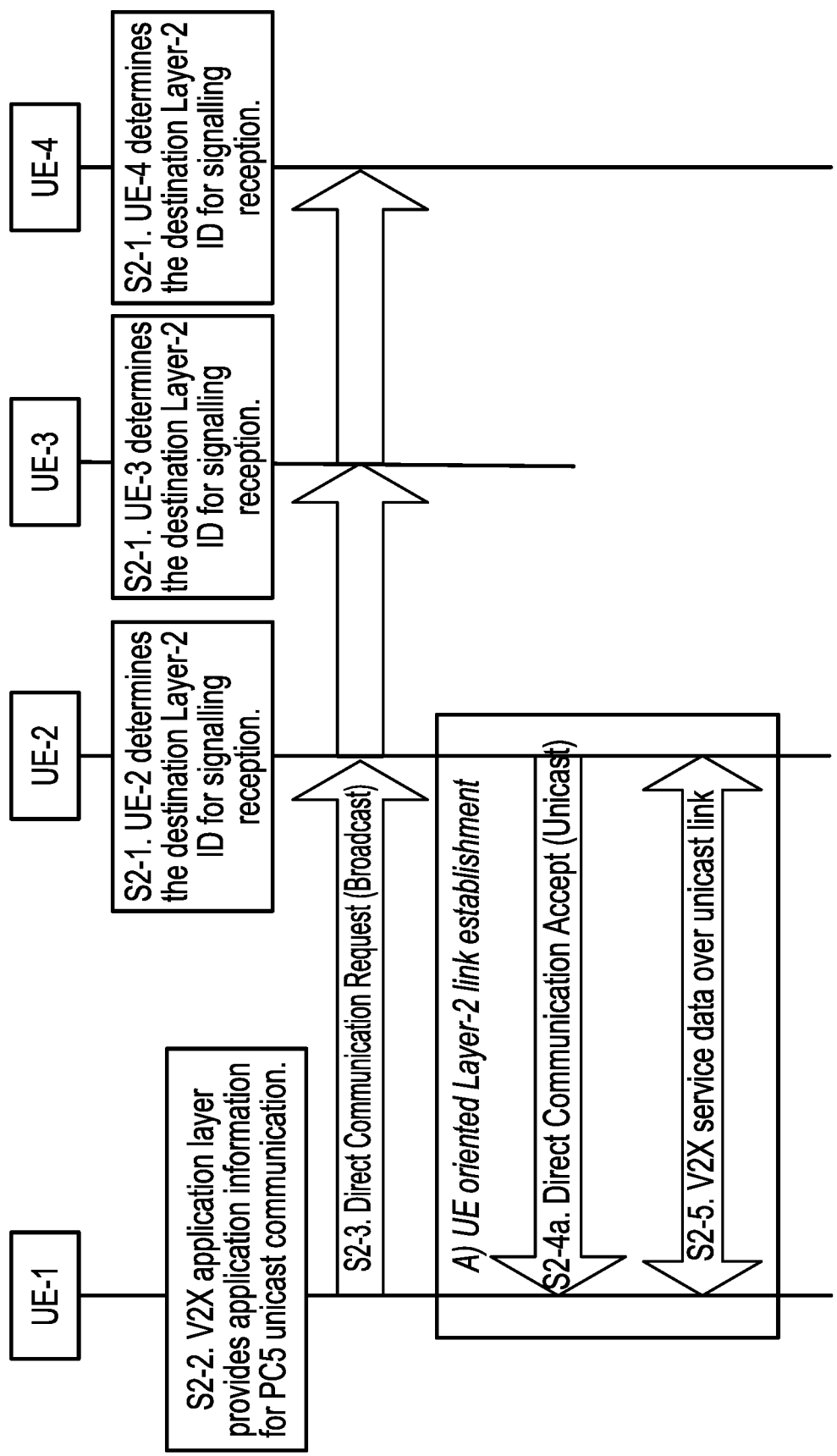
FIG. 2 schematically illustrates an exemplary NR SL unicast link establishment process.
Figure 2:
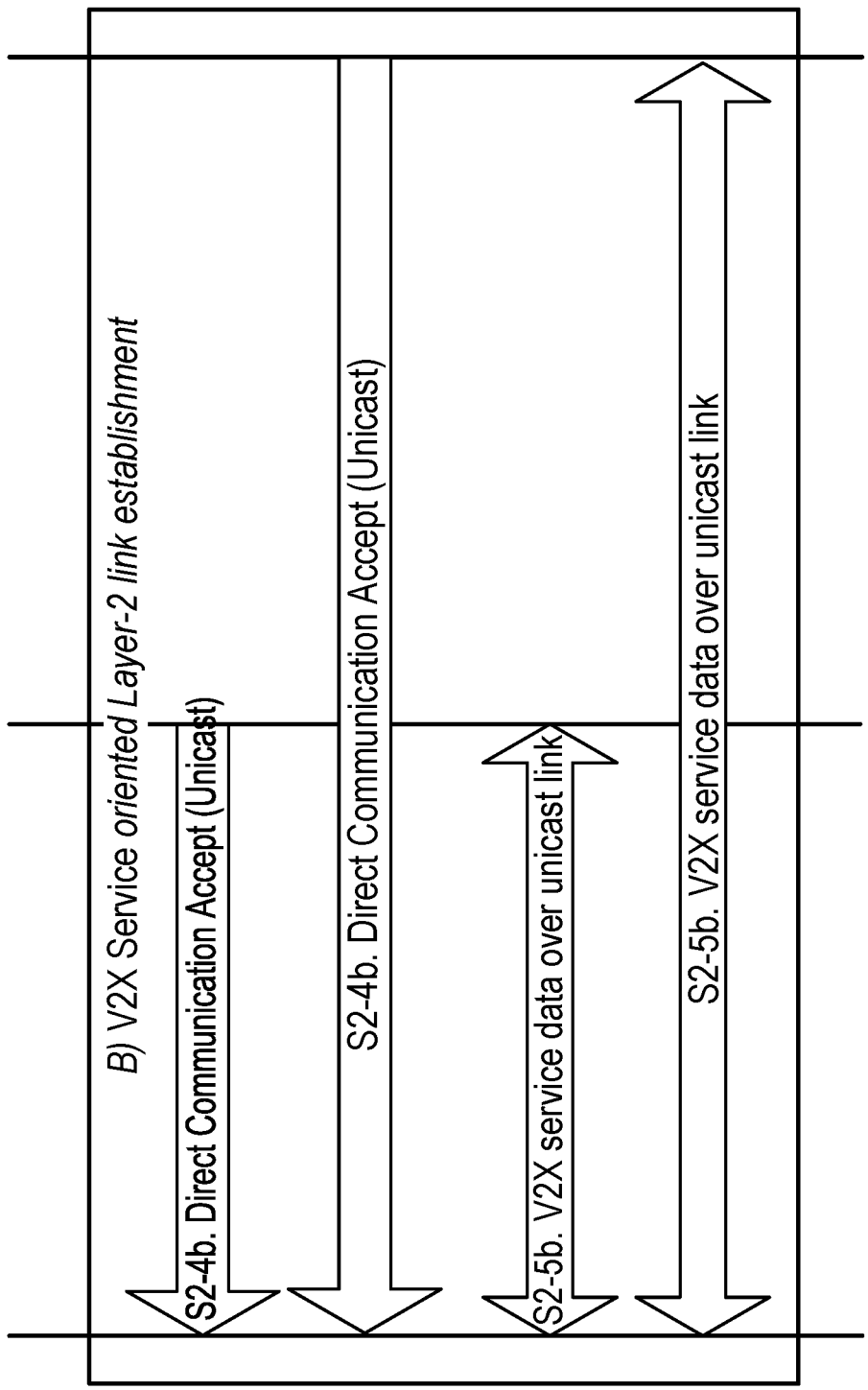
Figure 3:
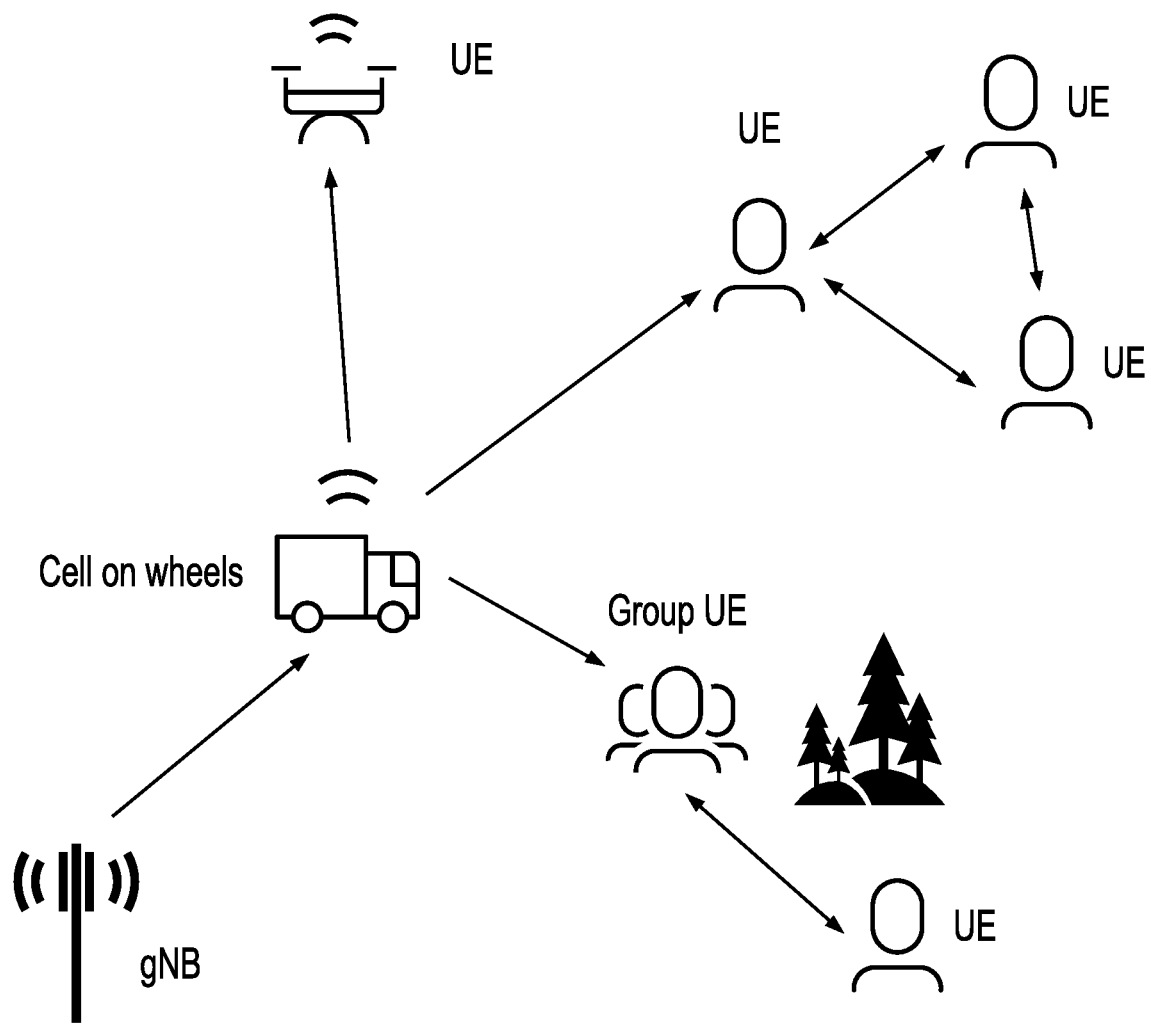
FIG. 3 schematically illustrates an exemplary scenario for NSPS including in and out-of-coverage users.
Figure 4A:
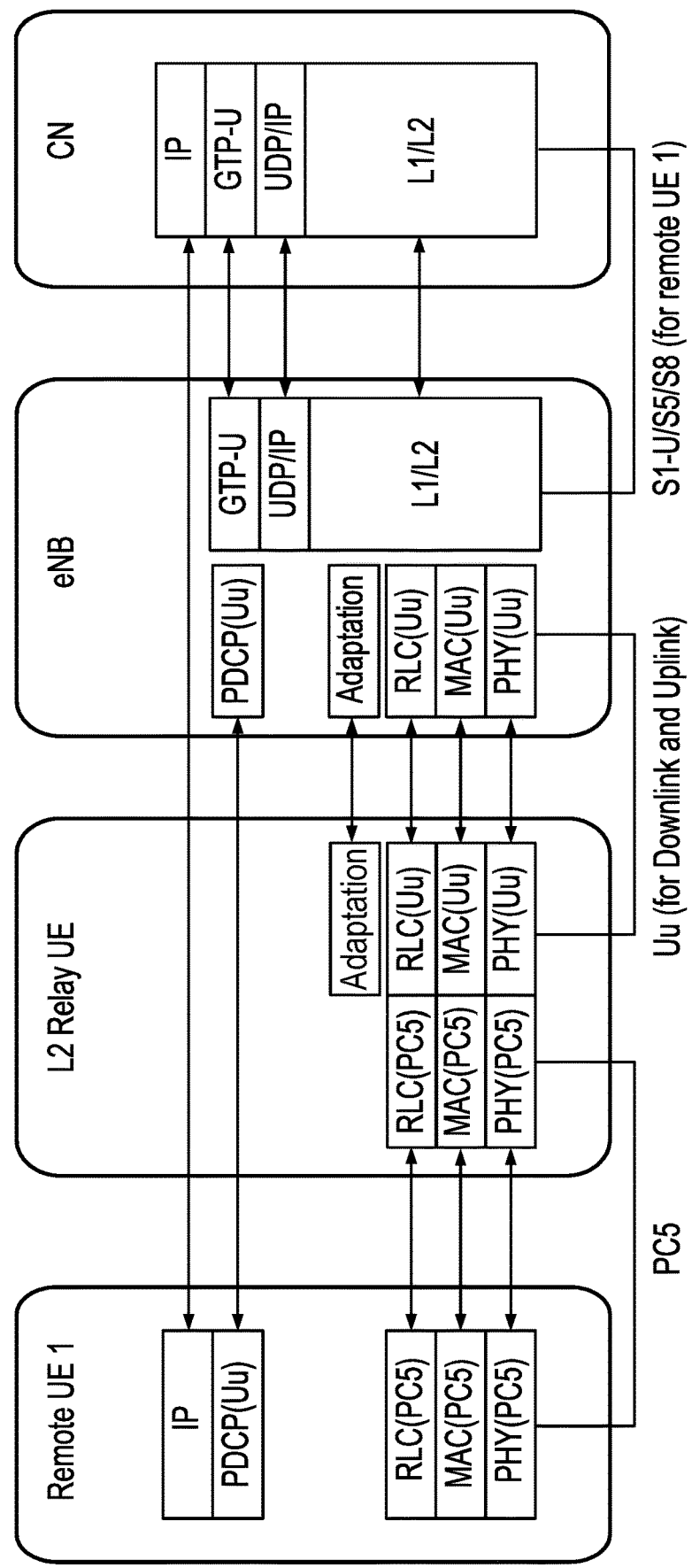
FIG. 4A and FIG. 4B schematically illustrate an exemplary user plane radio protocol stack for L2 evolved UE-to-NW Relay and an exemplary control plane radio protocol stack for L2 evolved UE-to-NW Relay, respectively.
Figure 4B:
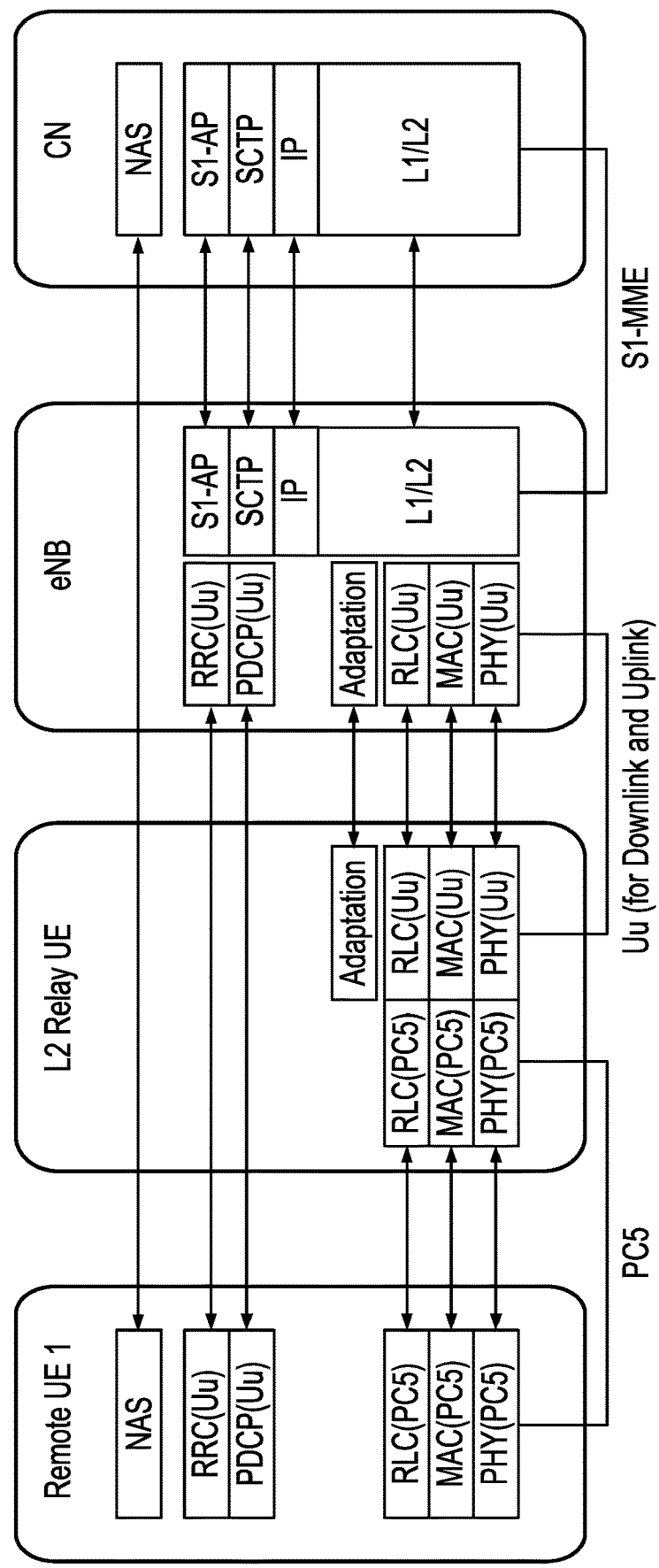
Figure 5:
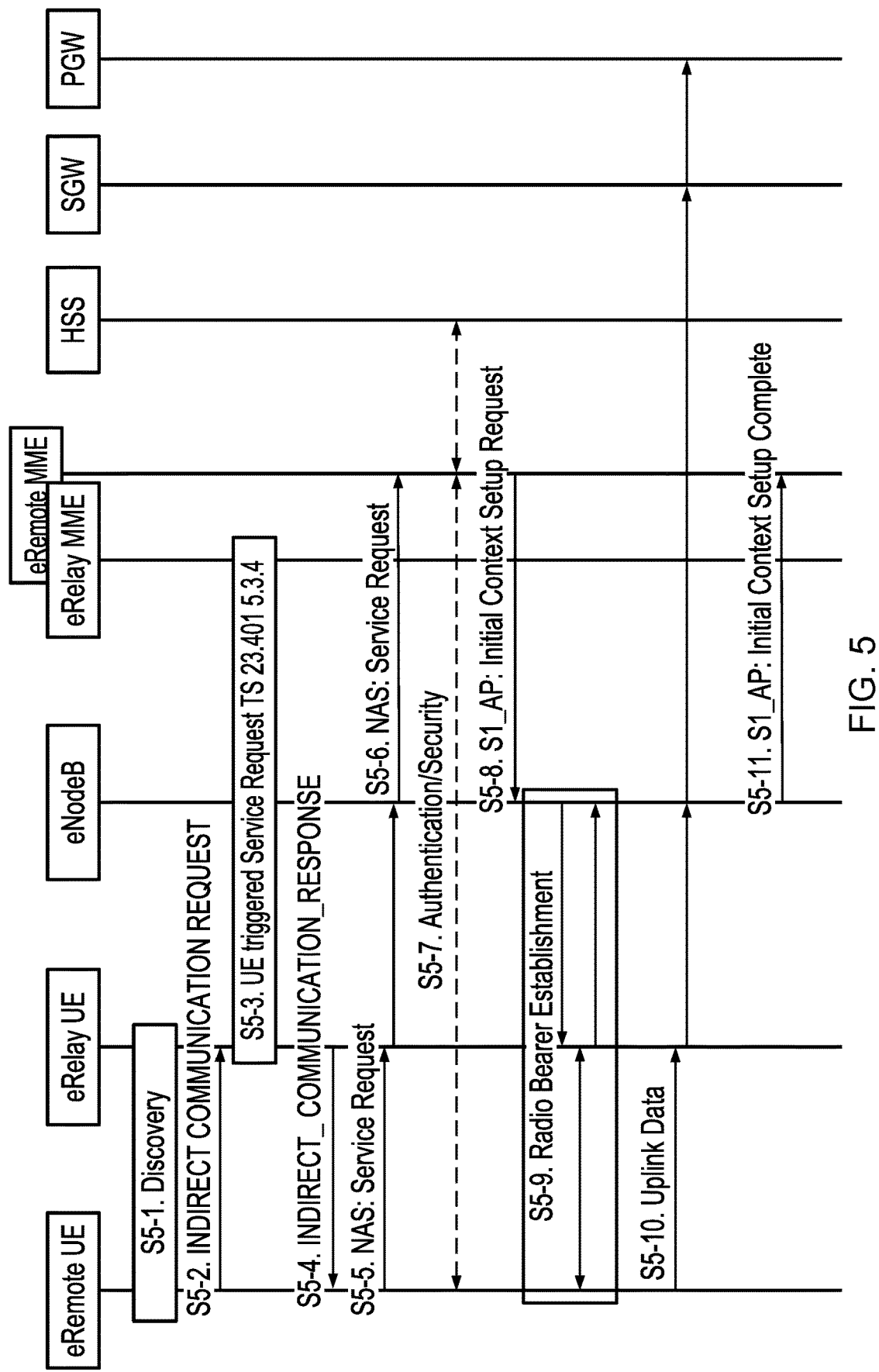
FIG. 5 schematically illustrates an exemplary traditional eRemote UE Triggered Service Request process in LTE.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The techniques described herein may be used for various wireless communication networks such as Code-Division Multiple Access (CDMA), Time-Division Multiple Access (TDMA), Frequency-Division Multiple Access (FDMA), Orthogonal Frequency-Division Multiple Access (OFDMA), Single-Carrier Frequency-Division Multiple Access (SC-FDMA), Long Term Evolution (LTE) and other networks developed in the future. The terms "network" and "system" are often used interchangeably. For illustration only, certain aspects of the techniques are described below for the next, i.e. the 5th generation of wireless communication network, such as New Radio (NR). However, it will be appreciated by the skilled in the art that the techniques described herein may also be used for other wireless networks such as LTE and corresponding radio technologies mentioned herein as well as wireless networks and radio technologies proposed in the future.

As used herein, the term "network node" refers to a device in a wireless communication network via which a terminal device or another network node accesses the network and receives services therefrom. The network node refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "UE" refers to any end device that can access a wireless communication network and receive services therefrom. By way of example and not limitation, the UE refers to a mobile terminal, terminal device, or other suitable devices. The UE may be, for example, a SS (Subscriber Station), a Portable Subscriber Station, a MS (Mobile Station), or an AT (Access Terminal), a relay node. The UE may include, but not limited to, portable computers, image capture terminal devices such as digital cameras, gaming terminal devices, music storage and playback appliances, a mobile phone, a cellular phone, a smart phone, voice over internet protocol (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), universal serial bus (USB) dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's Global System for Mobile Communications (GSM), Unified Threat Management System (UMTS), LTE, and/or fifth generation (5G) standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a UE may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a Mobile-Terminating Call (MTC) device. As one particular example, the UE may be a terminal device implementing the 3GPP Narrowband IoT (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

Figure 6:
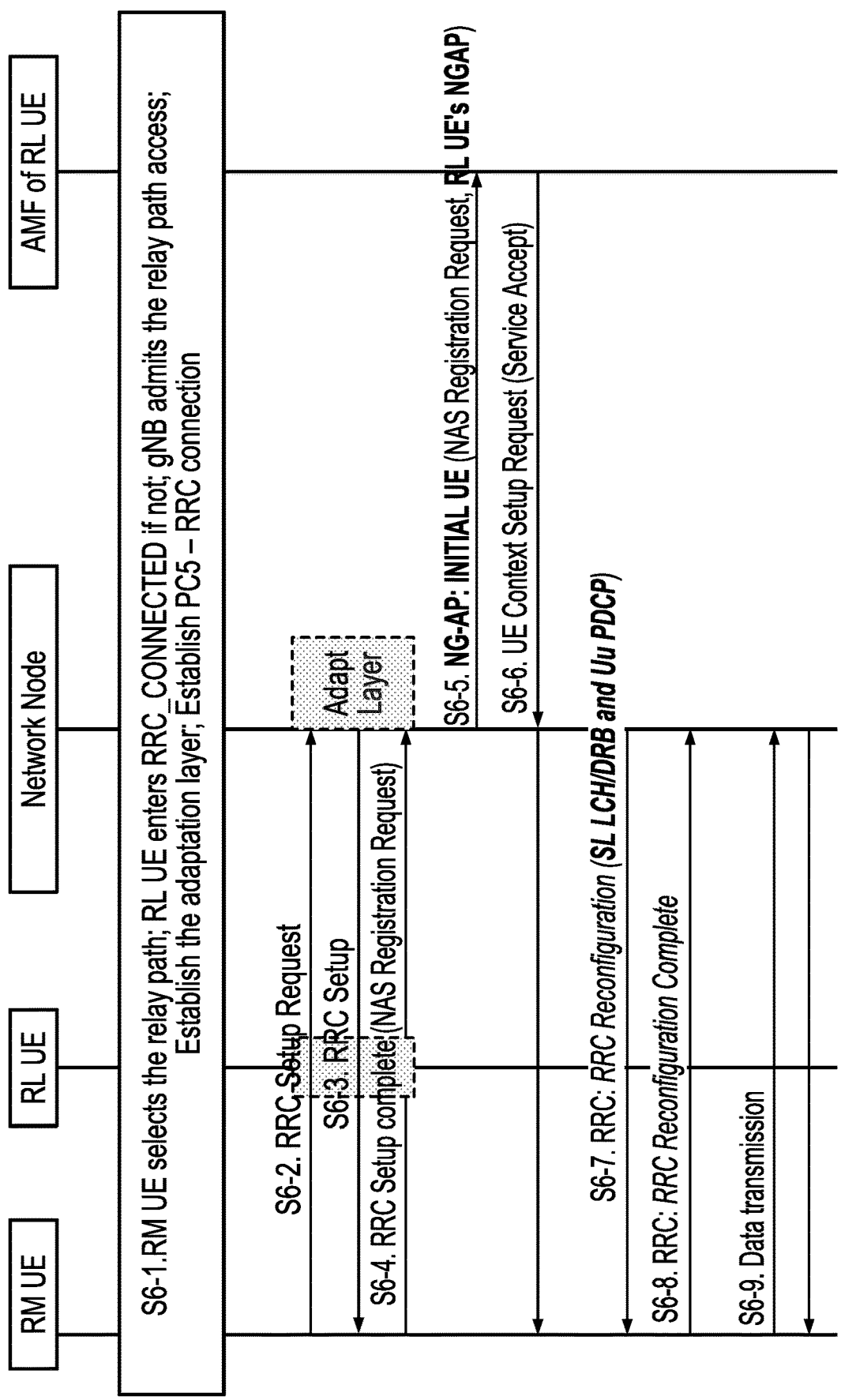
FIG. 6 schematically illustrates an overall exemplary UE-to-NW relay connection establishment process to which embodiments of the present disclosure are applied.

Hereinafter, an overall exemplary User Equipment to Network (UE-to-NW) relay connection establishment process to which embodiments of the present disclosure are applied will be described with reference to FIG. 6. As shown in FIG. 6, the exemplary UE-to-NW relay connection establishment process includes:

S6-1. Before a Remote ("RM") UE establishes its Radio Resource Control (RRC) connection at a network node, a Uu-RRC connection between a Relay ("RL") UE and the network node (if not established yet) and a PC5-RRC connection between the RL UE and the RM UE may be established, and the RL UE may be configured by the network node to support relay connection. Herein, the RM UE may be an evolved Remote UE ("eRemote UE"), the network node may be a base station such as an evolved NodeB ("eNodeB" or "eNB") or gNB, and/or the RL UE may be an evolved Relay UE ("eRelay UE"). The following operations may be performed:

the RM UE may discover and select a relay connection (also called a relay path);
the RL UE may enter an RCC connected ("RRC_CONNECTED") state (if not);
the network node may admit the relay connection access;
the network node may configure the RL UE and establish the protocol layer for relay connection, e.g. an adaptation layer; and
the PC5-RRC connection between the RL UE and the RM UE may be established.

S6-2. The RM UE sends an RRC Setup Request message to the network node (forwarded by the RL UE).

S6-3. The network node responds with an RRC Setup message to the RM UE (forwarded by the RL UE).

S6-4. The RM UE sends an RRC Setup complete message containing a Non-Access Stratum (NAS) Registration Request to the network node (forwarded by RL UE).

S6-5. The network node initializes a Next Generation-Application Protocol (NG-AP) context of the RM UE at an Access Management Function (AMF) of the RM UE by forwarding the NAS registration request to the RM UE's AMF.

S6-6. The AMF of the RM UE accepts the service request by responding with a NAS message of UE context setup request.

S6-7. The network node provides configuration at the RM UE per RRC message including e.g. a Uu Service Data Adaptation Protocol (SDAP) or Packet Data Convergence Protocol (PDCP) configuration and a PC5 Radio Link Control (RLC) configuration.

S6-8. The RM UE replies with an RRC Reconfiguration Complete message.

S6-9. Data transmissions at uplink and downlink are started.

The overall exemplary UE-to-NW relay connection establishment process has been generally described in conjunction with FIG. 6. The Layer 2 UE-to-NW relay means that the RM UE has an RRC/PDCP protocol with the network node, e.g., a Radio Access Network (RAN) node. The present disclosure, as an important part of the UE-to-NW relay connection establishment process, mainly focuses on S6-1 of the UE-to-NW relay connection establishment process as shown in FIG. 6, which will be further described in detail later in conjunction with FIGS. 7A to 17.

It will be understood that the methods proposed in the present disclosure can be applied to both LTE and NR Radio Access Technology (RAT), and some of the proposed methods can be applied to a Layer 3 UE-NW relay scenario.

The basic idea of the present disclosure consists in features required by a UE-to-NW relay, such as discovery, access control, service request, Access Stratum (AS) configurations, authorization, RRC state, etc., which are considered during the UE-to-NW relay connection establishment process, and which will be described in detail from the perspective of the RL UE, the RM UE and the network node, respectively. The RM UE is a UE that is remote from the network. As such, the RM UE is unable to communicate directly with the network (or any node of the network, i.e. any network node). Thus, herein, a relay service can be a service that allows the RM UE to communicate with a network node via one or more RL UEs. In this way, a UE-to-NW relay service can be provided. Herein, an RRC state refers to a state that the RL UE is in. Examples of the RRC state include an RRC idle state, an RRC connected state, and an RRC inactive state. An RRC idle state can be where the RL UE is not connected to the network (e.g. any network nodes). An RRC connected state can be where the RL UE has both connection to a RAN node (e.g. NodeB) and connection to a core NW node (e.g. AMF) via the RAN node. An RRC inactive state can be where the RL UE is not connected to the RAN node (e.g. NodeB), but the connection between the RAN node and the core NW node (e.g. AMF) is kept.

Figure 7A:
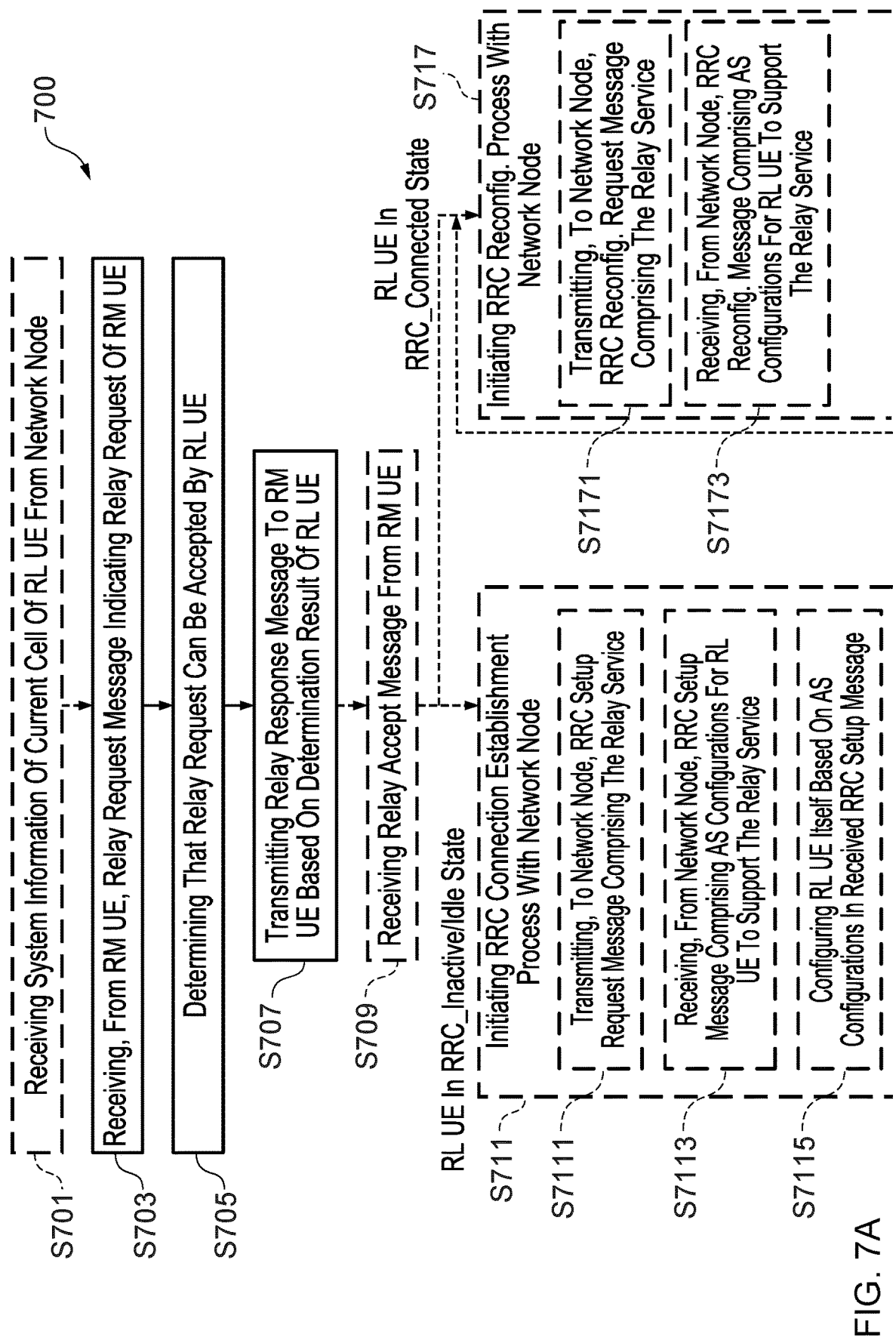
FIG. 7A and FIG. 7B schematically illustrate flowcharts illustrating methods at a relay UE for UE-to-NW relay connection establishment according to a first and a second exemplary embodiments of the present disclosure, respectively.
Figure 7A:
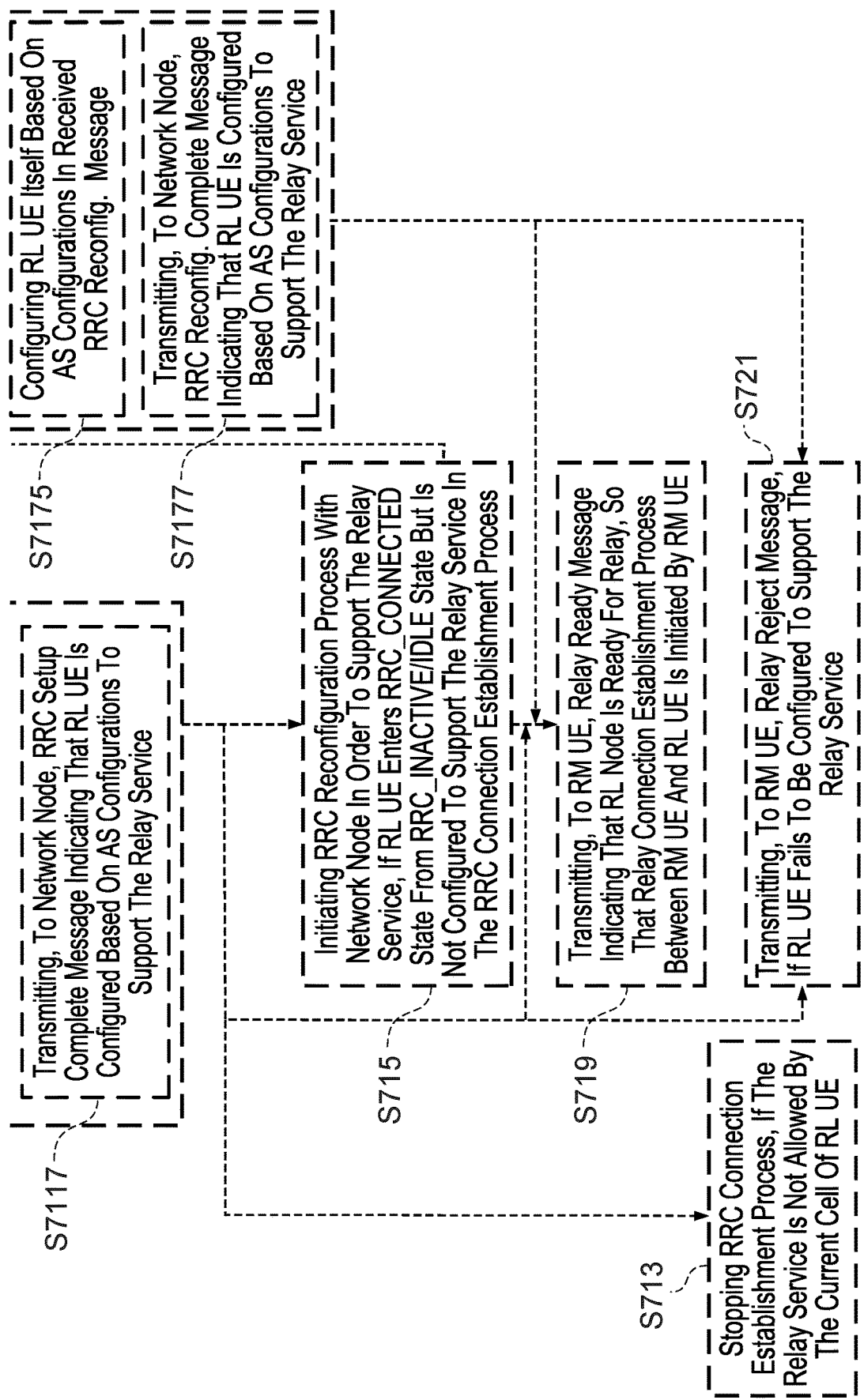
Figure 7B:
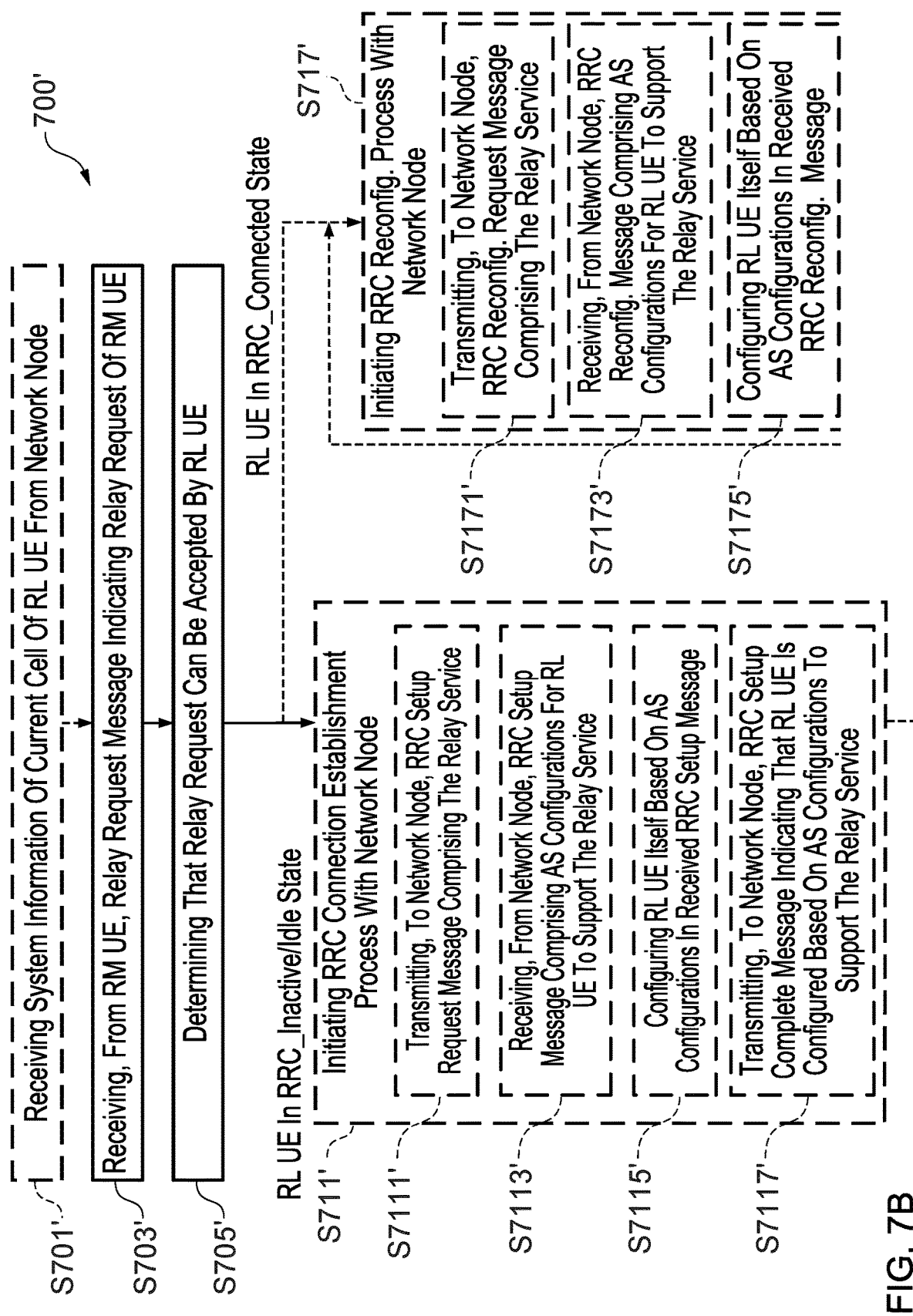
Figure 7B:
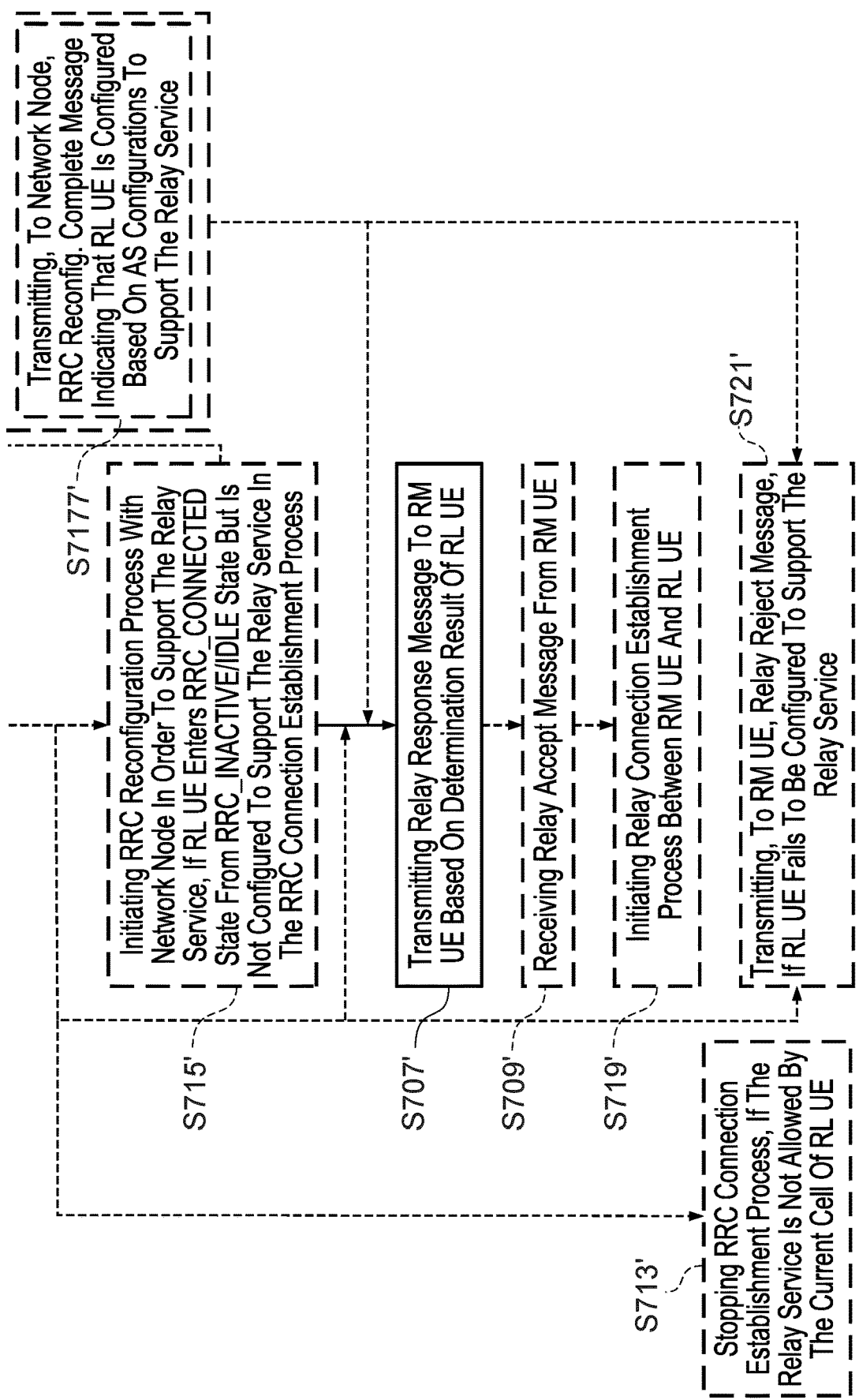

FIGS. 7A and 7B schematically illustrate flowcharts illustrating methods 700/700' at an RL UE for a UE-to-NW relay connection establishment according to first and second exemplary embodiments of the present disclosure. Since most of the steps of FIGS. 7A and 7B are identical, but the sequences of some steps are different, same or similar reference numbers are used for same or similar steps in FIGS. 7A and 7B for the convenience of finding the difference between FIGS. 7A and 7B. Accordingly, the same steps in FIGS. 7A and 7B are described concurrently for simplicity.

In step S703/S703', the RL UE receives, from the RM UE, a relay request message indicating a relay request of the RM UE. The relay request message may include at least: a relay service requested by the RM UE, and an indication of a Public Land Mobile Network (PLMN) subscribed by the RM UE (or to which the RM UE is subscribed). Alternatively or additionally, the relay request message may further include an indication of whether a Layer 2 (L2) relay or a Layer 3 (L3) relay is requested. For the L2 relay, the relay function is performed below PDCP, e.g. in the adaptation layer. The remote UE's traffic (both control plane and user plane traffic) is transparently transferred between the RM UE and the network node (e.g. gNB) over the L2 UE to NW Relay UE without any modifications. For the L3 relay, the remote UE is invisible to the core NW, i.e. it does not have its own context and Protocol Data Unit (PDU) session in the core NW, its traffic is forwarded in the relay UE's PDU session.

In an exemplary embodiment, the relay request of the RM UE may be periodically broadcasted by the RM UE per PC5-S message. In particular, the relay request may be transmitted via the PC5-S Direct Communication Request message which contains a specific service identifier (ID) or application ID indicating the relay service of the RM UE. The PC5-S Direct Communication Request message may also include the RM UE's subscription information, e.g. the operator that the UE is from, which can be indicated by a PLMN-ID from a Subscription Permanent Identifier (SUPI), and whether an L2 relay or an L3 relay is requested/preferred.

In step S705/S705', the RL UE determines that the relay request can be accepted by the RL UE in at least one of cases where:
  the RL UE is authorized to support the relay service, which can imply that the RL UE is Proximity Service (ProSe) capable, i.e., related to Authorization;
  the relay service is allowed by a current cell of the RL UE served by a network node (and, in an exemplary embodiment, this may be embodied as a current cell's accessing/barring list, but the disclosure is not limited to this);
  the RL UE is currently in an RRC_CONNECTED state, i.e., related to the RRC state;
  the RM UE subscribes to the same PLMN as the RL UE, i.e., related to Subscription; or
  the network node has provided relevant AS configurations to the RL UE, i.e., related to AS configurations.

In step S707/S707', the RL UE transmits a relay response message to the RM UE based on the result of the determination (i.e. the determination result) of the RL UE. The relay response message may include at least one of:
  an indication of whether or not the RL UE accepts the relay request;
  an RRC state of the RL UE, e.g., RRC_Connected state, RRC inactive ("RRC_INACTIVE") state, or RRC idle ("RRC_IDLE") state;
  an indication of a PLMN subscribed by the RL UE (or to which the RL UE is subscribed), i.e., the serving PLMN of the RL UE;
  an indication of whether the RL UE subscribes to the same PLMN as the RM UE (and, in an exemplary embodiment, a 1-bit indicator on whether the RL UE subscribes to the same PLMN as the RM UE may be used);
  system information, such as Master Information Block (MIB) or System Information Block (SIB) information, of the current cell of the RL UE received from the network node, which may include at least one of: an indication of whether the relay service is allowed by the current cell of the RL UE (e.g., a current cell's accessing/baring list), or a PLMN list; or
  capability information of the RL UE, e.g. how many carriers the RL UE can support, the UE transmit (Tx) power class, etc.

In an exemplary embodiment, the method 700/700' may include step S701/S701', in which the RL UE receives the system information of the current cell of the RL UE from the network node. It should be noted that the reference numbers in the drawings do not intend to limit a certain sequence of the corresponding steps. Here, the sequence of S701/S701' and S703/S703' is not particularly limited in the present disclosure.

In an exemplary embodiment, the relay response message may be transmitted to the RM UE, only if the RL UE accepts the relay request.

Figure 10:
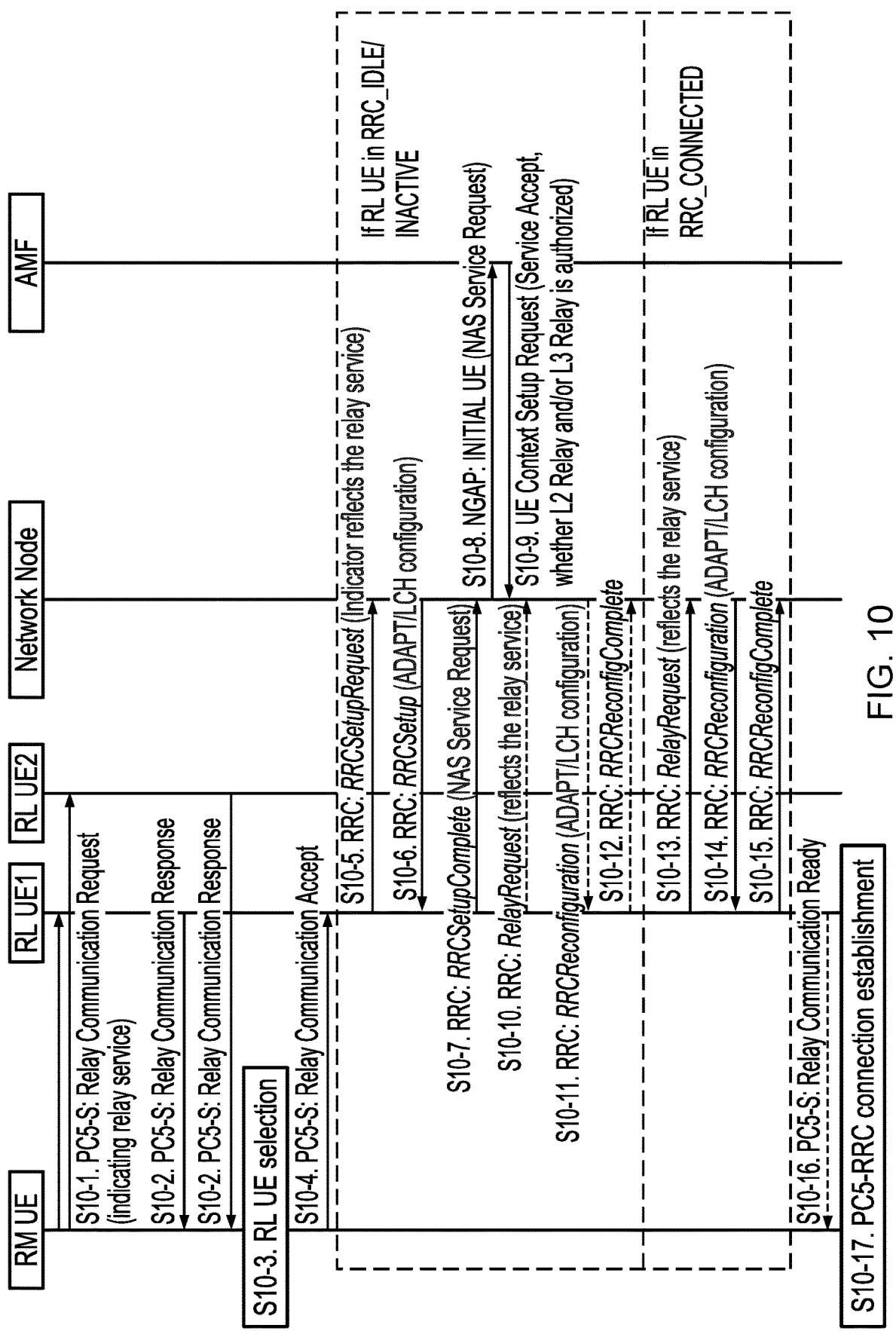
FIG. 10 schematically illustrates a signaling flowchart for UE-to-NW relay connection establishment according to a first embodiment of the present disclosure.
Figure 11:
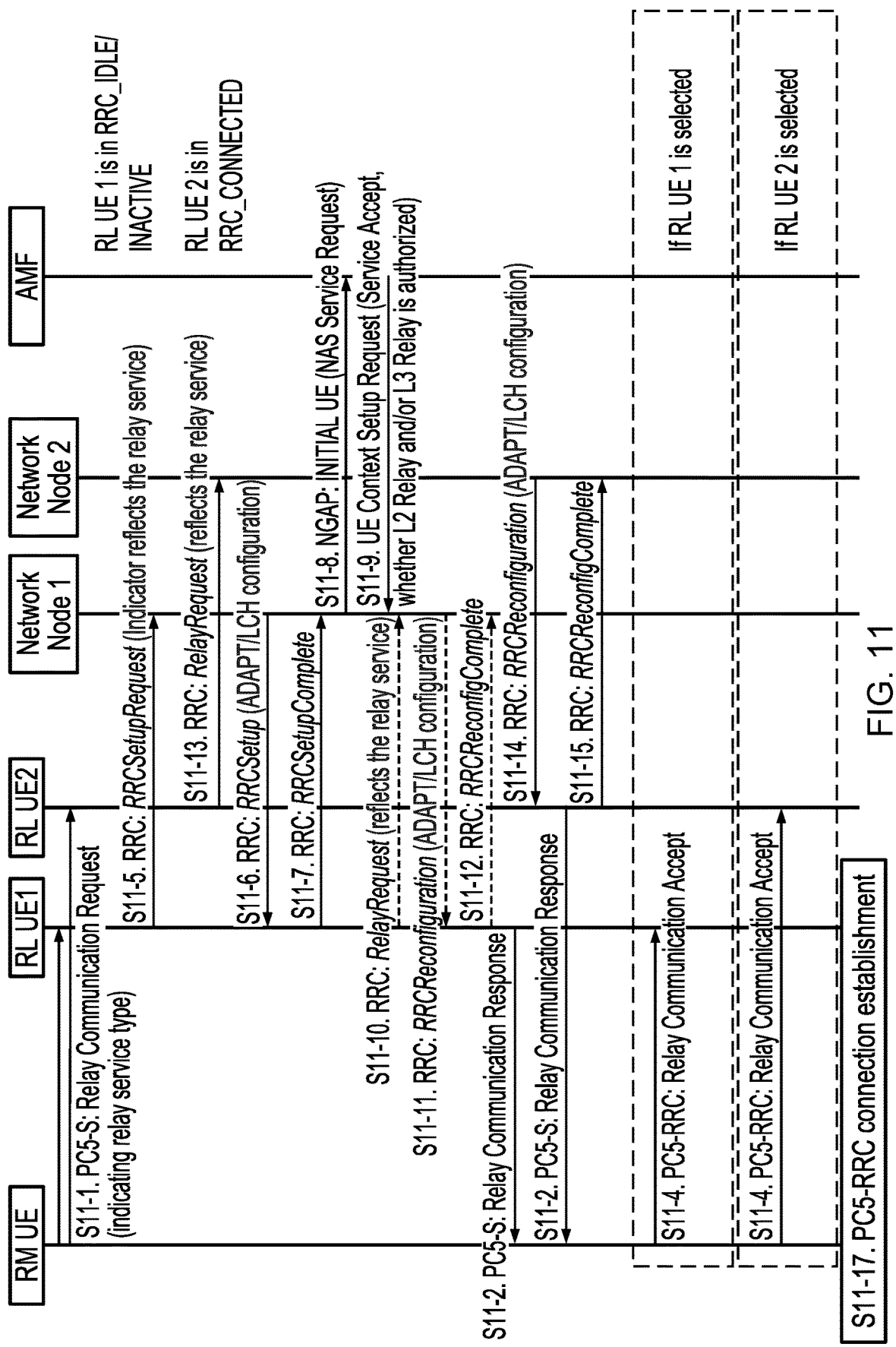
FIG. 11 schematically illustrates a signaling flowchart for UE-to-NW relay connection establishment according to a second embodiment of the present disclosure.

In an exemplary embodiment, the relay response message may be transmitted to the RM UE, after at least one of:
  the RL UE receives the relay request message from the RM UE (S703 in FIG. 7A, corresponding to S10-1 in FIG. 10; or S703' in FIG. 7B, corresponding to S11-1 in FIG. 11);
  the RL UE enters an RRC_CONNECTED state from an RRC_INACTIVE/IDLE state and is configured, by the network node based on an RRC setup message received from the network node, to support the relay service in an RRC connection establishment process with the network node (S7115' in FIG. 7B, corresponding to S11-6 in FIG. 11), or
  the RL UE is configured, by the network node based on an RRC reconfiguration message received from the network node, to support the relay service in an RRC reconfiguration process with the network node (S715' or S7175' in FIG. 7B, corresponding to S11-10 or S11-13 in FIG. 11). Herein, an RRC reconfiguration process can be a process that reconfigures the RL UE such that it can support the relay service.

If the RL UE is in an RRC_INACTIVE/IDLE state, the method 700/700' may further include step S711/S711', in which the RL UE initiates an RRC connection establishment process with the network node.

In particular, in the method 700 according to the first exemplary embodiment as shown in FIG. 7A, in step S711, the RL UE initiates the RRC connection establishment process with the network node, after the RL UE receives in step S709, from the RM UE, a relay accept message indicating that the RL UE is selected by the RM UE as a relay node.

Alternatively, in the method 700' according to the second exemplary embodiment as shown in FIG. 7B, in step S711', the RL UE initiates the RRC connection establishment process with the network node, after the RL UE receives in step S703', from the RM UE, the relay request message. Here, although FIG. 7B exemplarily shows that step S711' is performed following step S705' after step S703', this is shown only for illustration but not for any limitation. Alternatively, step S711' may be performed immediately after S703'.

In an exemplary embodiment, the RRC connection establishment process includes steps S7111/S7111' to S7117/S7117'.

In step S7111/S7111', the RL UE transmits, to the network node, an RRC setup request message including the relay service. Here, the relay service requested by the RM UE may be indicated as an establishment cause.

In step S7113/S7113', the RL UE receives, from the network node, an RRC setup message including AS configurations for the RL UE to support the relay service, if the network node accepts the RL UE's RRC setup request caused by the relay service.

In step S7115/S7115', the RL UE configures itself based on the AS configurations in the received RRC setup message.

In step S7115/S7115', the RL UE transmits, to the network node, an RRC setup complete message indicating that the RL UE is configured based on the AS configurations in the received RRC setup message to support the relay service.

In an exemplary embodiment, the method 700/700' may include step S713/S713', in which the RL UE stops the RRC connection establishment process, which is caused by the relay service of the RM UE, if the relay service is not allowed by the current cell of the RL UE, e.g., if the relay service of the RM UE is barred in the current cell of the RL UE based on the current cell's accessing/barring list.

In an exemplary embodiment, the method 700/700' may include step S715/S715', in which the RL UE further initiates an RRC reconfiguration process with the network node in order to support the relay service, if the RL UE enters the RRC_CONNECTED state from the RRC_INACTIVE/IDLE state in step S7117/S7117' but is not configured to support the relay service in the RRC connection establishment process. For example, the RL UE does not receive the AS configurations for the RL UE to support the relay service in the RRC setup message from the network node, and thus cannot configure itself to support the relay service.

If the RL UE is in an RRC_CONNECTED state or enters the RRC_CONNECTED state from the RRC_INACTIVE/IDLE state, the method 700/700' further includes step S717/S717', in which the RL UE initiates an RRC reconfiguration process with the network node in order to support the relay service.

In particular, in the method 700 according to the first exemplary embodiment as shown in FIG. 7A, in step S717, the RL UE initiates the RRC reconfiguration process with the network node, after the RL UE receives in step S709, from the RM UE, the relay accept message indicating that the RL UE is selected by the RM UE as a relay node.

Alternatively, in the method 700' according to the second exemplary embodiment as shown in FIG. 7B, in step S717', the RL UE initiates the RRC reconfiguration process with the network node, after the RL UE receives in step S703', from the RM UE, the relay request message. Here, although FIG. 7B exemplarily shows that step S717' is performed following step S705' after step S703', this is shown only for illustration but not for any limitation. Alternatively, step S717' may be performed immediately after S703'.

In an exemplary embodiment, the RRC reconfiguration process for the RL UE in the RRC_CONNECTED state includes steps S7171/S7171' to S7177/S7177'.

In step S7171/S7171', the RL UE transmits, to the network node, an RRC reconfiguration request message or a relay service request message that includes the relay service. Here, the RRC reconfiguration request message is the SL UE information message (a type of existing RRC message) that includes the information of the corresponding relay service, while the relay service request message refers to a new/dedicated RRC message.

In step S7173/S7173', the RL UE receives, from the network node, an RRC reconfiguration message including AS configurations for the RL UE to support the relay service.

In step S7175/S7175', the RL UE configures itself based on the AS configurations in the received RRC reconfiguration message.

In step S7177/S7177', the RL UE transmits, to the network node, an RRC reconfiguration complete message indicating that the RL UE is configured based on the AS configurations in the received RRC reconfiguration message to support the relay service.

In an exemplary embodiment, the AS configurations include at least one of: an adaptation layer configuration, a Uu Logical Channel (LCH) configuration, or a PC5 LCH configuration. The adaptation layer configuration may include at least one of: indexes assigned for the RM UE and the RL UE, or a Uu LCH to PC5 LCH (Uu-PC5 LCH) mapping. The related LCH configurations may include e.g. LCH ID, RLC configuration etc.

In the method 700/700', the relay accept message is received in step S709/S709' from the RM UE, after the RM UE selects the RL UE as the relay node based on the relay response message received from the RL UE.

In the method 700 according to the first exemplary embodiment as shown in FIG. 7A, after the RL UE is configured to support the relay service based on the AS configurations in the RRC setup message or the RRC reconfiguration message, which means that the Uu interface between the RL UE and the network node is prepared to support the relay service, the method 700 may further include step S719, in which the RL UE transmits, to the RM UE, a relay ready message indicating that the RL UE is ready for relay, so that an RRC connection establishment process between the RM UE and the RL UE (also called a PC5-RRC connection establishment process) is initiated by the RM UE that receives the relay ready message.

Different from the method 700 in FIG. 7A, in the method 700' according to the second exemplary embodiment as shown in FIG. 7B, after the RL UE is configured to support the relay service based on the AS configurations in the RRC setup message or the RRC reconfiguration message, the RL UE transmits, to the RM UE, the relay response message in step S707'. Then, the RL UE may receive the relay accept message from the RM UE in step S709' if the RM UE selects the RL UE as the relay node based on the relay response message transmitted by the RL UE. Since the RM UE has received the relay response message from the RL UE, which may indicate that the RL UE is ready for relay, the method 700' may proceed to step S719' after step S709'. In step S719', the RL UE initiates an RRC connection establishment process between the RL UE and the RM UE (also called a PC5-RRC connection establishment process).

Alternatively or additionally, if the RL UE fails to be configured to support the relay service in some cases, the method 700/700' further includes step S721/S721', in which the RL UE transmits to, the RM UE, a relay reject message.

Accordingly, a method at an RM UE for UE-to-NW relay connection establishment will be described in conjunction with FIGS. 8A and 8B.

Figure 8A:
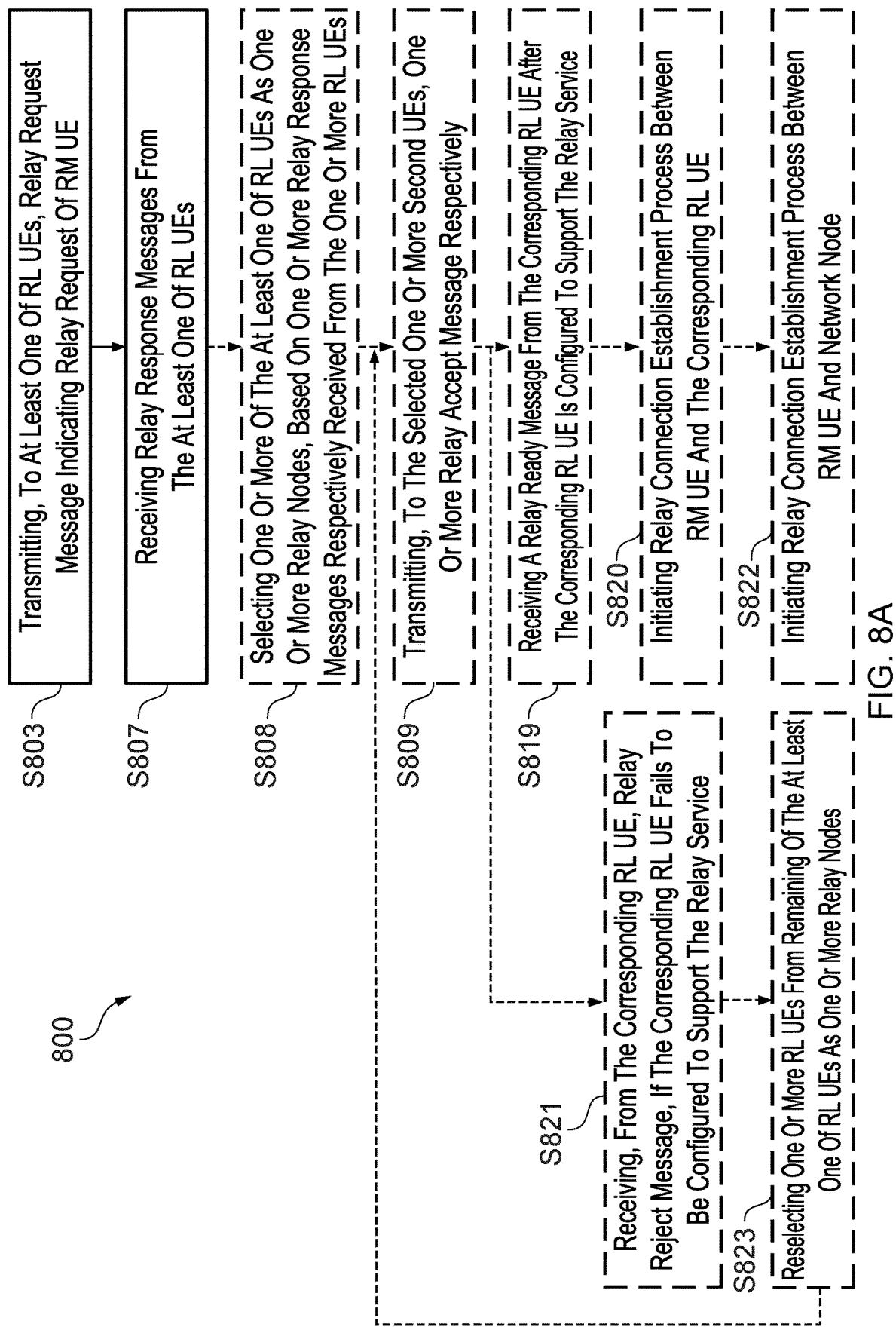
FIG. 8A and FIG. 8B schematically illustrate flowcharts illustrating methods at a remote UE for UE-to-NW relay connection establishment according to a first and a second exemplary embodiments of the present disclosure, respectively.
Figure 8B:
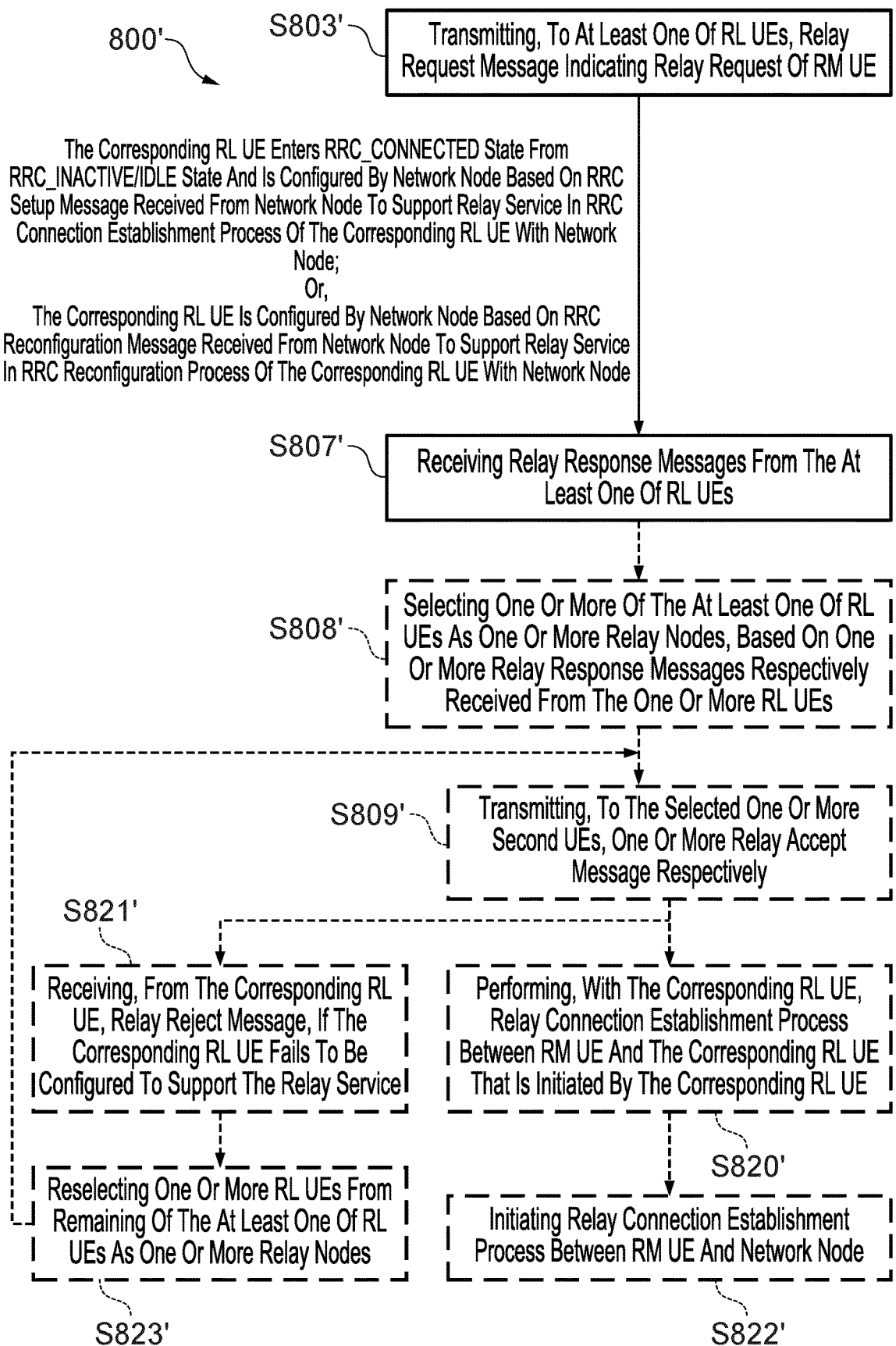

FIGS. 8A and 8B schematically illustrate flowcharts illustrating methods 800/800' at an RM UE for a UE-to-NW relay connection establishment according to a first and a second exemplary embodiments of the present disclosure. Since most steps of FIGS. 8A and 8B are identical, but the sequences of some steps are different, same or similar reference numbers are used for same or similar steps in FIGS. 8A and 8B for the convenience of finding the difference between FIGS. 8A and 8B. Accordingly, the same steps in FIGS. 8A and 8B are described concurrently for simplicity. Also, similar reference numbers are used for corresponding steps in FIGS. 7A/7B and 8A/8B for convenience of understanding. Related description of the corresponding steps in FIGS. 8A and 8B may also refer to those in FIGS. 7A and 7B.

In step S803/S803', the RM UE transmits, to at least one of RL UEs, a relay request message indicating a relay request of the RM UE. The relay request message may include at least: a relay service requested by the RM UE, and an indication of a PLMN subscribed by the RM UE. Alternatively or additionally, the relay request message may further include an indication of whether an L2 relay or an L3 relay is requested.

In an exemplary embodiment, the relay request of the RM UE may be periodically broadcasted by the RM UE per PC5-S message. In particular, the relay request may be transmitted via the PC5-S Direct Communication Request message which contains a specific service ID/application ID indicating the relay service of the RM UE. The PC5-S Direct Communication Request message may also include RM UE's subscription information, e.g. the operator that the UE is from, which can be indicated by a PLMN-ID from a SUPI, and whether an L2 relay or an L3 relay is requested/preferred.

In step S807/S807', the RM UE receives relay response messages respectively from the at least one RL UE. Each relay response message may include at least one of:
  an indication of whether or not the RL UE accepts the relay request;
  an RRC state of the RL UE, e.g., RRC_Connected, RRC_INACTIVE, or RRC_IDLE;
  an indication of a PLMN subscribed by the RL UE, i.e., the serving PLMN of the RL UE;
  an indication of whether the RL UE subscribes to the same PLMN as the RM UE (and, in an exemplary embodiment, a 1-bit indicator on whether the RL UE subscribes to the same PLMN as the RM UE may be used);
  system information, such as MIB/SIB information, of the current cell of the RL UE received from the network node, which may include at least one of: an indication of whether the relay service is allowed by the current cell of the RL UE (e.g., a current cell's accessing/baring list), or a PLMN list; or
  capability information of the RL UE.

In an exemplary embodiment, the relay response message may be received from the corresponding RL UE, only if the corresponding RL UE accepts the relay request in at least one of cases where:
  the RL UE is authorized to support the relay service, which can imply that the RL UE is ProSe capable, i.e., related to Authorization;
  the relay service is allowed by a current cell of the RL UE served by a network node (and, in an exemplary embodiment, this may be embodied as a current cell's accessing/barring list, but the disclosure is not limited to this);
  the RL UE is currently in an RRC_CONNECTED state, i.e., related to RRC state;
  the RM UE subscribes to the same PLMN as the RL UE, i.e., related to Subscription; or
  the network node has provided relevant AS configurations to the RL UE, i.e., related to AS configurations.

In an exemplary embodiment, the relay response message may be received from the RL UE, after at least one of:
  the RM UE transmits the relay request message to the corresponding RL UE (S803 in FIG. 8A, corresponding to S10-1 in FIG. 10; or S803' in FIG. 8B, corresponding to S11-1 in FIG. 11);
  the corresponding RL UE enters an RRC_CONNECTED state from an RRC_INACTIVE/IDLE state and is configured by the network node based on an RRC setup message received from the network node to support the relay service in an RRC connection establishment process with the network node (S7115' in FIG. 7B, corresponding to S11-6 in FIG. 11), or
  the RL UE is configured by the network node based on an RRC reconfiguration message received from the network node to support the relay service in an RRC reconfiguration process with the network node (S715' or S7175' in FIG. 7B, corresponding to S11-10 or S11-13 in FIG. 11).

In an exemplary embodiment, the method 800/800' further includes steps S808/S808' and S809/S809'.

In step S808/S808', the RM UE selects one or more of the at least one of RL UEs as one or more relay nodes, based on one or more relay response messages respectively received from the one or more RL UEs.

In step S809/S809', the RM UE transmits, to the selected one or more RL UEs, one or more relay accept message respectively. Here, the relay accept message indicates that the corresponding RL UE is selected by the RM UE as a relay node.

In the method 800 according to the first exemplary embodiment as shown in FIG. 8A, after the RL UE is configured to support the relay service based on the AS configurations in the RRC setup message or the RRC reconfiguration message, which means that the Uu interface between the RL UE and the network node is prepared to support the relay service, the method 800 may further include step S819, in which the RM UE receives, from the corresponding RL UE, a relay ready message indicating that the RL UE is ready for relay. Then, in step S820, the RM UE initiates an RRC connection establishment process between the RM UE and the RL UE (also called a PC5-RRC connection establishment process) after receiving the relay ready message from the corresponding RL UE.

Different from the method 800 in FIG. 8A, in the method 800' according to the second exemplary embodiment as shown in FIG. 8B, after the RL UE is configured to support the relay service based on the AS configurations in the RRC setup message or the RRC reconfiguration message, the RM UE receives, from the at least one of RL UEs, the relay response message in step S807'. Then, the RM UE selects one or more of the at least one of RL UEs as one or more relay nodes based on the corresponding relay response messages received from the one or more RL UEs in step S808'. The RM UE may transmit the relay accept message to the selected one or more RM UEs in step S809'. Since the RM UE has received the relay response message from the RL UE, which may indicate that the RL UE is ready for relay, the method 800' may proceed to step S820' after step S809'. In step S820', the RM UE performs, with the corresponding RL UE, an RRC connection establishment process between the RM UE and the corresponding RL UE (also called a PC5-RRC connection establishment process) that is initiated by the corresponding RL UE.

Alternatively or additionally, after the RRC connection establishment process between the RM UE and the corresponding RL UE is established in step S820, and/or after the RL UE is configured to support the relay service, the method 800/800' may further include step S822/S822', in which the RM UE initiates an RRC connection establishment process between the RM UE and the network node (also called a UE-to-NW relay/RRC connection establishment process).

Alternatively or additionally, if the corresponding RL UE fails to be configured to support the relay service in some cases, the method 800/800' may further include step S821/S821', in which the RM UE receives, from the corresponding RL UE, a relay reject message.

Alternatively or additionally, the method 800/800' may further include step S823/S823', in which the RM UE reselects one or more RL UEs from remaining of the at least one of RL UEs as one or more relay nodes, based on the relay reject message and one or more relay response messages respectively received from the one or more RL UEs.

The reselection may be performed when a number of received relay reject message is larger than a predefined threshold.

Accordingly, a method at a network node for UE-to-NW relay connection establishment will be described in conjunction with FIGS. 9A and 9B.

Figure 9A:
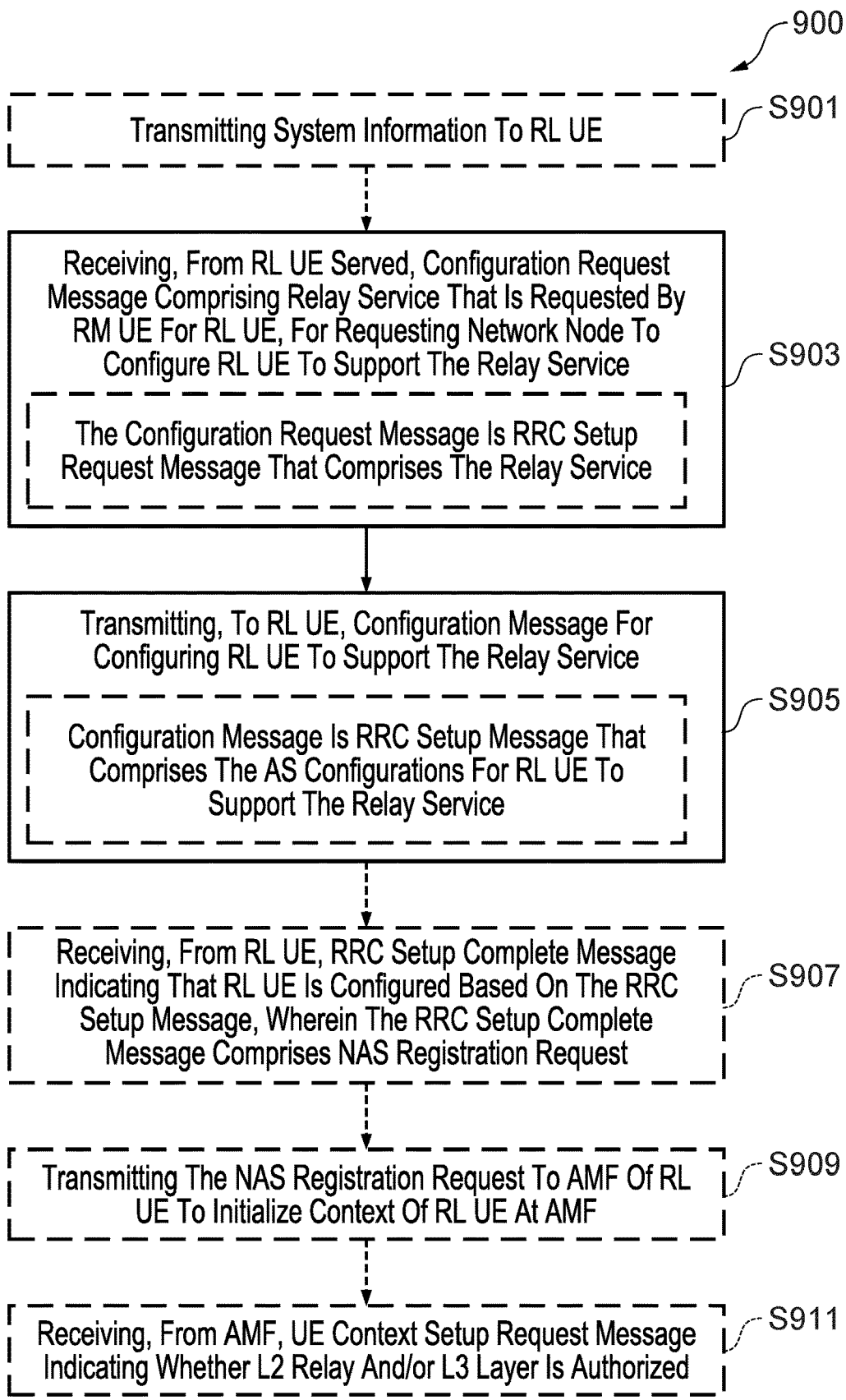
FIG. 9A and FIG. 9B schematically illustrate flowcharts illustrating methods at a network node for UE-to-NW relay connection establishment according to exemplary embodiments of the present disclosure, respectively.
Figure 9B:
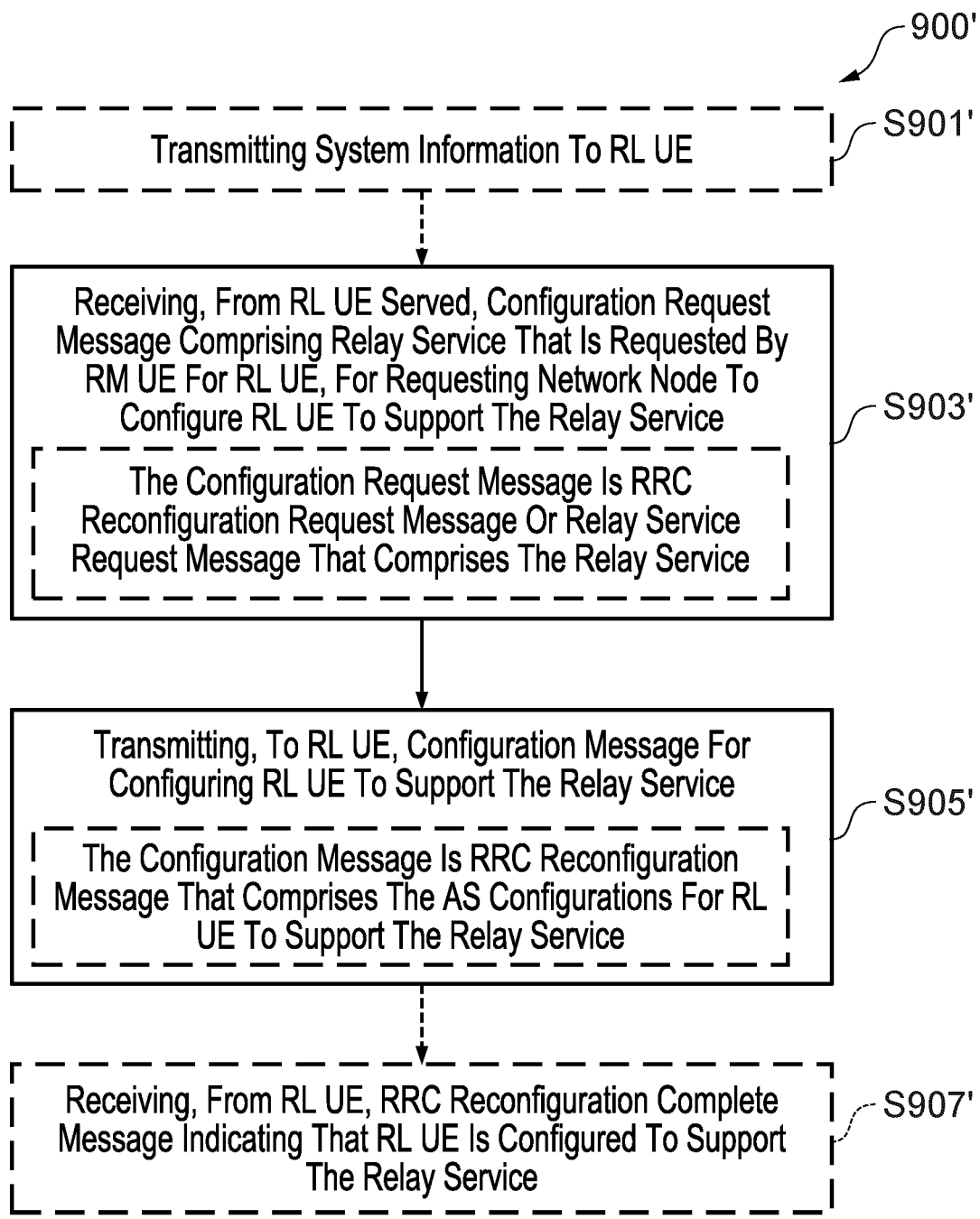

FIGS. 9A and 9B schematically illustrate flowcharts illustrating methods 900/900' at a network node for a UE-to-NW relay connection establishment according to exemplary embodiments of the present disclosure. Since most steps of FIGS. 9A and 9B are identical, but the sequences of some steps are different, same or similar reference numbers are used for same or similar steps in FIGS. 9A and 9B for the convenience of finding the difference between FIGS. 9A and 9B. Accordingly, the same steps in FIGS. 9A and 9B are described concurrently for simplicity. Related description of the corresponding steps in FIGS. 9A and 9B may also refer to those in FIGS. 7A to 8B.

In step S903/903', the network node receives, from an RL UE served by the network node, a configuration request message including a relay service that is requested by an RM UE for the RL UE. The configuration request message is used for requesting the network node to configure the RL UE to support the relay service.

In step S905/905', the network node transmits, to the RL UE, a configuration message for configuring the RL UE to support the relay service. The configuration message includes AS configurations, which contain at least one of: an adaptation layer configuration, a Uu LCH configuration, or a PC5 LCH configuration. The adaptation layer configuration may include at least one of: indexes assigned for the RM UE and the RL UE, or a Uu-PC5 LCH mapping. The related LCH configurations may include e.g. LCH ID, RLC configuration etc.

In the method 900 according to one of the exemplary embodiments as shown in FIG. 9A, if the RL UE is in an RRC_INACTIVE/IDLE state, an RRC connection establishment process between the network node and the RL UE may be performed.

In this case, the configuration request message may be an RRC setup request message that includes the relay service, and accordingly, the configuration message may be an RRC setup message that includes the AS configurations for the RL UE to support the relay service.

As such, the method 900 in FIG. 9A particularly includes:
step S903, in which the network node receives, from the RL UE served by the network node, the RRC setup request message including a relay service that is requested by an RM UE for the RL UE. The configuration request message is used for requesting the network node to configure the RL UE to support the relay service; and
step S905, in which the network node transmits, to the RL UE, the RRC setup message for configuring the RL UE to support the relay service. The RRC setup message includes AS configurations, which contain at least one of: an adaptation layer configuration, a Uu LCH configuration, or a PC5 LCH configuration.

Next, the method 900 as shown in FIG. 9A may further include steps S907 to S911.

In step S907, the network node receives, from the RL UE, an RRC setup complete message indicating that the RL UE is configured based on the RRC setup message, wherein the RRC setup complete message includes an NAS registration request.

In step S909, the network node transmits the NAS registration request to an AMF node of the RL UE to initialize context of the RL UE at the AMF node.

In step S911, the network node receives, from the AMF node, a UE context setup request message indicating whether an L2 relay and/or an L3 relay is authorized, e.g., if the AMF node accepts the relay service.

Alternatively, if the RL UE enters the RRC_CONNECTED state from the RRC_INACTIVE/IDLE state but is not configured to support the relay service in the RRC connection establishment process, an RRC reconfiguration process between the network node and the RL UE may be performed. In this case, the configuration request message may be an RRC reconfiguration request message or a relay service request message that includes the relay service, and the configuration message may be an RRC reconfiguration message that includes the AS configurations for the RL UE to support the relay service.

The RRC reconfiguration process for the RL UE that enters the RRC_CONNECTED state from the RRC_INACTIVE/IDLE state may include:
receiving, from the RL UE, the RRC reconfiguration request message or the relay service request message that includes the relay service;
transmitting, to the RL UE, the RRC reconfiguration message for configuring the RL UE to support the relay service. The RRC reconfiguration message includes AS configurations, which contain at least one of: an adaptation layer configuration, a Uu LCH configuration, or a PC5 LCH configuration; and
receiving, from the RL UE, the RRC reconfiguration complete message indicating that the RL UE is configured based on the AS configurations in the received RRC reconfiguration message to support the relay service.

Alternatively, in the method 900' according to another of the exemplary embodiments as shown in FIG. 9B, if the RL UE is in an RRC_CONNECTED state, an RRC reconfiguration process between the network node and the RL UE may be performed. In this case, the configuration request message may be an RRC reconfiguration request message or a relay service request message that includes the relay service, and the configuration message may be an RRC reconfiguration message that includes the AS configurations for the RL UE to support the relay service.

As such, the method 900' in FIG. 9B particularly includes:
step S903', in which the network node receives, from the RL UE served by the network node, the RRC reconfiguration request message or the relay service request message including a relay service that is requested by an RM UE for the RL UE. The RRC reconfiguration request message is used for requesting the network node to configure the RL UE to support the relay service; and
step S905', in which the network node transmits, to the RL UE, the RRC reconfiguration message for configuring the RL UE to support the relay service. The RRC reconfiguration message includes AS configurations, which contain at least one of: an adaptation layer configuration, a Uu LCH configuration, or a PC5 LCH configuration.

Next, the method 900' as shown in FIG. 9B may further include step S907'.

In step S907', the network node receives, from the RL UE, an RRC reconfiguration complete message indicating that the RL UE is configured based on the AS configurations in the received RRC reconfiguration message to support the relay service.

In the method 900/900', the configuration request message is received from the RL UE, after the RL UE is selected by the RM UE as a relay node, or after the RL UE receives, from the RM UE, a relay request message including the relay service requested by the RM UE.

In an exemplary embodiment, the method 900/900' further includes step S901/S901', in which the network node transmits system information to the RL UE, the system information including at least one of: an indication of whether the relay service is allowed by a current cell of the RL UE served by the network node, or a PLMN list. As previously described, it should be noted that the reference numbers in the drawings do not intend to limit a certain sequence of the corresponding steps. Here, the sequence of S901/S901' and S903/S903' is not particularly limited in the present disclosure.

Hereinafter, the method for a UE-to-NW relay connection establishment according to a first exemplary embodiment of the present disclosure will be described in detail in conjunction with a signaling sequence diagram as shown in FIG. 10. In connection with the signaling sequence diagrams of FIG. 10, the methods for the UE-to-NW relay connection establishment as previously described in conjunction with FIGS. 7A, 8A and 9A-9B will be understood better. The related description of the signaling in FIG. 10 may also refer to those in FIGS. 7A, 8A and 9A-9B.

FIG. 10 schematically illustrates a signaling flowchart for a UE-to-NW relay connection establishment according to the first embodiment of the present disclosure. It should be noted that the description below only focuses on signaling related to the present disclosure, and other signaling is omitted to avoid obscuring the principle of the present disclosure.

As previously discussed, the signaling flowchart of FIG. 10 is a detailed process of S6-1 in FIG. 6, which is performed before the RM UE transmits the RRC setup request message to the network node. In the first embodiment, as shown in FIG. 10, the RM UE selects the RL UE first before the RL UE accesses the network node.

In S10-1 (corresponding to S703 in FIG. 7A, and S803 in FIG. 8A), the RM UE transmits, to at least one RL UE (e.g., RL UE1 and/or RL UE2, but not limited to this), relay request message, e.g., PC5-S relay communication request messages, each indicating a relay request of the RM UE. The relay request message may be periodically broadcasted by the RM UE.

Then, the corresponding RL UE(s) (e.g., RL UE1 and/or RL UE2) receiving the relay request may determine that the relay request can be accepted in at least one case where:
the RL UE is authorized to support the relay service, which can imply that the RL UE is ProSe capable, i.e., related to Authorization;
the relay service is allowed by a current cell of the RL UE served by a network node (and, in an exemplary embodiment, this may be embodied as a current cell's accessing/barring list, but the disclosure is not limited to this);
the RL UE is currently in an RRC_CONNECTED state, i.e., related to RRC state;
the RM UE subscribes to the same PLMN as the RL UE, i.e., related to Subscription; or
the network node has provided relevant AS configurations to the RL UE, i.e., related to AS configurations.

In S10-2 (corresponding to S707 in FIG. 7A, and S807 in FIG. 8A), the corresponding RL UE(s) (e.g., RL UE1 and/or RL UE2) transmits a relay response message to the RM UE based on the result of the determination (i.e. the determination result) of the RL UE. The relay response message may include at least one of:
an indication of whether or not the RL UE accepts the relay request;
an RRC state of the RL UE, e.g., RRC_Connected, RRC_INACTIVE, or RRC_IDLE;
an indication of a PLMN to which the RL UE is subscribed (i.e. subscribed by the RL UE), i.e., the serving PLMN of the RL UE;
an indication of whether the RL UE subscribes to the same PLMN as the RM UE (and, in an exemplary embodiment, a 1-bit indicator on whether the RL UE subscribes to the same PLMN as the RM UE may be used);
system information, such as MIB/SIB information, of the current cell of the RL UE received from the network node, which may include at least one of: an indication of whether the relay service is allowed by the current cell of the RL UE (e.g., a current cell's accessing/baring list), or a PLMN list; or
capability information of the RL UE.

In S10-3 (corresponding to S808 in FIG. 8A), the RM UE selects one or more RL UEs of the at least one RL UE as one or more relay nodes, based on one or more relay response messages respectively received from the one or more RL UEs.

In S10-4 (corresponding to S709 in FIG. 7A, and S809 in FIG. 8A), the RM UE transmits, to the selected one or more RL UEs, one or more relay accept messages respectively.

Here, the relay accept message indicates that the corresponding RL UE is selected by the RM UE as a relay node.

S10-5 to S10-12 apply to RL UE(s) in an RRC_INACTIVE/IDLE state.

In S10-5 (corresponding to S7111 in FIG. 7A, and S903 in FIG. 9A), the selected RL UE(s) may transmit, to the network node, an RRC setup request message including the relay service (i.e., initiating an RRC connection establishment process with the network node). Here, the relay service requested by the RM UE may be indicated as an establishment cause.

In S10-6 (corresponding to S7113 in FIG. 7A, and S905 in FIG. 9A), the network node may transmit, to the corresponding RL UE(s), a configuration message for configuring the RL UE(s) to support the relay service(s). The configuration message includes AS configurations, which contain at least one of: an adaptation layer configuration, a Uu LCH configuration, or a PC5 LCH configuration. The adaptation layer configuration may include at least one of indexes assigned for the RM UE and the corresponding RL UE, or a Uu LCH to PC5 LCH (i.e. Uu-PC5 LCH) mapping. The related LCH configurations may include e.g. LCH ID, RLC configuration etc.

The RL UE(s) may configure itself (or themselves) based on the AS configurations in the RRC setup message.

In S10-7 (corresponding to S7117 in FIG. 7A, and S907 in FIG. 9A), the corresponding RL UE(s) transmits, to the network node, an RRC setup complete message indicating that the corresponding RL UE(s) is configured based on the AS configurations in the received RRC setup message to support the relay service(s), wherein the RRC setup complete message includes an NAS registration request.

In S10-8 (corresponding to S909 in FIG. 9A), the network node transmits the NAS registration request to an AMF node of the corresponding RL UE to initialize context of the corresponding RL UE(s) at the AMF node.

In S10-9 (corresponding to S911 in FIG. 9A), the corresponding RL UE(s)' AMF(s) accepts the (requested) relay service(s), and indicates to the network node, in a UE context setup request message, whether an L2 relay and/or an L3 relay is authorized.

Alternatively, if the network node does not transmit the AS configurations to the corresponding RL UE(s) in S10-6 so that the corresponding RL UE(s) is not configured to support the relay service(s), or if the corresponding RL UE(s) is not configured to support the relay service(s) due to some other reasons, in S10-10 (corresponding to S7171 in FIG. 7A), the RL UE transmits, to the network node, an RRC reconfiguration request message or a relay service request message that includes the relay service, requesting the network node for configuration of the RL UE to support the relay service. Here, the RRC reconfiguration request message may be the SL UE information message (a type of existing RRC message) that includes the information of the corresponding relay service, and the relay service request message refers to a new/dedicated RRC message.

In S10-11 (corresponding to S7173 in FIG. 7A), the network node transmits, to the corresponding RL UE(s), the RRC reconfiguration message for configuring the corresponding RL UE(s) to support the relay service(s). The RRC reconfiguration message includes AS configurations, which contain at least one of: an adaptation layer configuration, a Uu LCH configuration, or a PC5 LCH configuration.

The corresponding RL UE(s) configures itself (or themselves) based on the AS configurations in the received RRC reconfiguration message.

In S10-12 (corresponding to S7177 in FIG. 7A), the corresponding RL UE(s) transmits, to the network node, an RRC reconfiguration complete message indicating that the corresponding RL UE(s) is configured based on the AS configurations in the received RRC reconfiguration message to support the relay service(s).

S10-13 to S10-15 apply to RL UE(s) in RRC_CONNECTED state.

In S10-13 (corresponding to S7171 in FIG. 7A, and S903' in FIG. 9B), the corresponding RL UE(s) transmits, to the network node, an RRC reconfiguration request message or a relay service request message that includes the relay service, requesting the network node for configuration of the RL UE to support the relay service. Here, the RRC reconfiguration request message may be the SL UE information message (a type of existing RRC message) that includes the information of the corresponding relay service, while the relay service request message refers to a new/dedicated RRC message.

In S10-14 (corresponding to S7173 in FIG. 7A, and S905' in FIG. 9B), the network node transmits, to the corresponding RL UE(s), the RRC reconfiguration message for configuring the corresponding RL UE(s) to support the relay service(s). The RRC reconfiguration message includes AS configurations, which contain at least one of: an adaptation layer configuration, a Uu LCH configuration, or a PC5 LCH configuration.

The RL UE configures itself based on the AS configurations in the received RRC reconfiguration message.

In S10-15 (corresponding to S7177 in FIG. 7A, and S907' in FIG. 9B), the RL UE transmits, to the network node, an RRC reconfiguration complete message indicating that the RL UE is configured based on the AS configurations in the received RRC reconfiguration message to support the relay service.

In S10-16 (corresponding to S719 in FIG. 7A, and S819 in FIG. 8A), the RL UE transmits, to the RM UE, a relay ready message indicating that the RL UE is ready for relay, after the RL UE is configured to support the relay service based on the AS configurations in the RRC setup message or the RRC reconfiguration message, which means that the Uu interface between the RL UE and the network node is prepared to support the relay service.

If the RL UE fails to be configured to support the relay service, the RL UE transmits to, the RM UE, a relay reject message, upon which the RM UE reselects one or more RL UEs from remaining of the at least one of RL UEs as one or more relay nodes, based on the relay reject message and one or more relay response messages respectively received from the one or more RL UEs.

The reselection may be performed when a number of received relay reject message is larger than a predefined threshold.

In S10-17 (corresponding to S820 in FIG. 8A), the RM UE initiates an RRC connection establishment process between the RM UE and the RL UE (also called a PC5-RRC connection establishment process) after receiving the relay ready message from the corresponding RL UE.

Hereinafter, the method for a UE-to-NW relay connection establishment according to a second exemplary embodiment of the present disclosure will be described in detail in conjunction with a signaling sequence diagram as shown in FIG. 11. In connection with the signaling sequence diagrams of FIG. 11, the methods for the UE-to-NW relay connection establishment as previously described in conjunction with FIGS. 7B, 8B and 9A-9B will be understood better. The related description of the signaling in FIG. 11 may also refer to those in FIGS. 7B, 8B and 9A-9B.

FIG. 11 schematically illustrates a signaling flowchart for a UE-to-NW relay connection establishment according to the second embodiment of the present disclosure. It should be noted that the description below only focuses on signaling related to the present disclosure, and other signaling is omitted to avoid obscuring the principle of the present disclosure.

As previously discussed, the signaling flowchart of FIG. 11 is a detailed process of S6-1 in FIG. 6, which is performed before the RM UE transmits the RRC setup request message to the network node. In the first embodiment as shown in FIG. 11, the RM UE selects the RL UE after the RL UE accesses the network node. Similar reference numbers are used for the convenience of comparing to the embodiment of FIG. 10.

In S11-1 (corresponding to S703' in FIG. 7B, and S803' in FIG. 8B), the RM UE transmits, to at least one RL UE (e.g., RL UE1 and/or RL UE2, but not limited to this), relay request message, e.g., PC5-S relay communication request messages, each indicating a relay request of the corresponding RM UE. The relay request message may be periodically broadcasted by the RM UE.

Then, the corresponding RL UE (e.g., RL UE1 and/or RL UE2) receiving the relay request may determine that the relay request can be accepted in at least one of cases where:
the RL UE is authorized to support the relay service, which can imply that the RL UE is ProSe capable, i.e., related to Authorization;
the relay service is allowed by a current cell of the RL UE served by a network node (and, in an exemplary embodiment, this may be embodied as a current cell's accessing/barring list, but the disclosure is not limited to this);
the RL UE is currently in an RRC_CONNECTED state, i.e., related to RRC state;
the RM UE subscribes to the same PLMN as the RL UE, i.e., related to Subscription; or
the network node has provided relevant AS configurations to the RL UE, i.e., related to AS configurations.

S11-5 to S11-12 apply to RL UE(s) in RRC_INACTIVE/IDLE state.

In S11-5 (corresponding to S7111' in FIG. 7B, and S903 in FIG. 9A), the corresponding RL UE(s) (e.g., RL UE1 in FIG. 11) receiving the relay request may transmit, to the network node, an RRC setup request message including the relay service (i.e., initiating an RRC connection establishment process with the network node). Here, the relay service requested by the RM UE may be indicated as an establishment cause.

In S11-6 (corresponding to S7113' in FIG. 7A, and S905 in FIG. 9A), the network node may transmit, to the corresponding RL UE(s) (e.g., RL UE1 in FIG. 11), a configuration message for configuring the RL UE(s) to support the relay service. The configuration message includes AS configurations, which contain at least one of: an adaptation layer configuration, a Uu LCH configuration, or a PC5 LCH configuration. The adaptation layer configuration may include at least one of: indexes assigned for the RM UE and the RL UE, or a Uu LCH to PC5 LCH (i.e. Uu-PC5 LCH) mapping. The related LCH configurations may include e.g. LCH ID, RLC configuration etc.

The RL UE(s) may configure itself based on the AS configurations in the RRC setup message.

In S11-7 (corresponding to S7117' in FIG. 7B, and S907 in FIG. 9A), the RL UE(s) transmits, to the network node, an RRC setup complete message indicating that the RL UE is configured based on the AS configurations in the received RRC setup message to support the relay service, wherein the RRC setup complete message includes an NAS registration request.

In S11-8 (corresponding to S909 in FIG. 9A), the network node transmits the NAS registration request to an AMF node of the corresponding RL UE(s) to initialize context of the RL UE at the AMF node.

In S11-9 (corresponding to S911 in FIG. 9A), the corresponding RL UE(s)' AMF(s) accepts the (requested) relay service, and indicates to the network node, in a UE context setup request message, whether an L2 relay and/or an L3 relay is authorized.

Alternatively, if the network node does not transmit the AS configurations to the corresponding RL UE(s) in S11-6 so that the corresponding RL UE(s) is not configured to support the relay service, or if the corresponding RL UE(s) is not configured to support the relay service due to some other reasons, in S11-10 (corresponding to S7171' in FIG. 7B), the RL UE transmits, to the network node, an RRC reconfiguration request message or a relay service request message that includes the relay service, requesting the network node for configuration of the RL UE to support the relay service. Here, the RRC reconfiguration request message may be the SL UE information message (a type of existing RRC message) that includes the information of the corresponding relay service, and the relay service request message refers to a new/dedicated RRC message.

In S11-11 (corresponding to S7173' in FIG. 7B), the network node transmits, to the corresponding RL UE(s), the RRC reconfiguration message for configuring the corresponding RL UE(s) to support the relay service(s). The RRC reconfiguration message includes AS configurations, which contain at least one of: an adaptation layer configuration, a Uu LCH configuration, or a PC5 LCH configuration.

The corresponding RL UE(s) configures itself based on the AS configurations in the received RRC reconfiguration message.

In S11-12 (corresponding to S7177' in FIG. 7B), the corresponding RL UE(s) transmits, to the network node, an RRC reconfiguration complete message indicating that the corresponding RL UE(s) is configured based on the AS configurations in the received RRC reconfiguration message to support the relay service(s).

S11-13 to S11-15 apply to RL UE(s) in RRC_CONNECTED state.

In S11-13 (corresponding to S7171' in FIG. 7B, and S903' in FIG. 9B), the corresponding RL UE(s) (RL UE2 in FIG. 11) transmits, to the network node, an RRC reconfiguration request message or a relay service request message that includes the relay service, requesting the network node for configuration of the RL UE to support the relay service. Here, the RRC reconfiguration request message may be the SL UE information message (a type of existing RRC message) that includes the information of the corresponding relay service, while the relay service request message refers to a new/dedicated RRC message.

In S11-14 (corresponding to S7173' in FIG. 7B, and S905' in FIG. 9B), the network node transmits, to the corresponding RL UE(s), the RRC reconfiguration message for configuring the corresponding RL UE(s) to support the relay service(s). The RRC reconfiguration message includes AS configurations, which contain at least one of: an adaptation layer configuration, a Uu LCH configuration, or a PC5 LCH configuration.

The corresponding RL UE(s) configures itself based on the AS configurations in the received RRC reconfiguration message.

In S11-15 (corresponding to S7177' in FIG. 7B, and S907' in FIG. 9B), the corresponding RL UE(s) transmits, to the network node, an RRC reconfiguration complete message indicating that the corresponding RL UE(s) is configured based on the AS configurations in the received RRC reconfiguration message to support the relay service(s).

In S11-2 (corresponding to S707' in FIG. 7B, and S807' in FIG. 8B), the corresponding RL UE(s) (e.g., RL UE1 and/or RL UE2) transmits a relay response message to the RM UE based on the result of the determination (i.e. the determination result) of the corresponding RL UE(s). The relay response message may include at least one of:
- an indication of whether or not the RL UE accepts the relay request;
- an RRC state of the RL UE, e.g., RRC_Connected, RRC_INACTIVE, or RRC_IDLE;
- an indication of a PLMN subscribed by the RL UE, i.e., the serving PLMN of the RL UE;
- an indication of whether the RL UE subscribes to the same PLMN as the RM UE (and, in an exemplary embodiment, a 1-bit indicator on whether the RL UE subscribes to the same PLMN as the RM UE may be used);
- system information, such as MIB/SIB information, of the current cell of the RL UE received from the network node, which may include at least one of: an indication of whether the relay service is allowed by the current cell of the RL UE (e.g., a current cell's accessing/baring list), or a PLMN list; or
- capability information of the RL UE.

As in S808' in FIG. 8B, the RM UE selects one or more of the at least one of RL UEs as one or more relay nodes, based on one or more relay response messages respectively received from the one or more RL UEs.

In S11-4 (corresponding to S709' in FIG. 7B, and S809' in FIG. 8B), the RM UE transmits, to the selected one or more RL UEs, one or more relay accept message respectively. Here, the relay accept message indicates that the corresponding RL UE is selected by the RM UE as a relay node.

It should be understood that although FIG. 11 shows the signaling in a certain sequence, such a sequence is shown for illustration only but not for any limitation. For example, S11-2 may follow S11-6 or S11-7 (if the RL UE initially in the RRC_INACTIVE/IDLE state is configured to support the requested relay service in the RRC connection establishment process), or may follow S11-11 or S11-12 (if the RL UE enters the RRC_CONNECTED state from the RRC_INACTIVE/IDLE state but is not configured to support the requested relay service in the RRC connection establishment process, and is configured to support the requested relay service in the RRC reconfiguration process), or may follow S11-14 or S11-15 (if the RL UE in the RRC_CONNECTED state is configured to support the requested relay service in the RRC reconfiguration process), which are not limited by the present disclosure.

If the RL UE fails to be configured to support the relay service, the RL UE may transmit to, the RM UE, a relay reject message, upon which the RM UE reselects one or more RL UEs from remaining of the at least one of RL UEs as one or more relay nodes, based on the relay reject message and one or more relay response messages respectively received from the one or more RL UEs.

The reselection may be performed when a number of received relay reject message is larger than a predefined threshold.

If the RM UE has received the relay response message from the corresponding RL UE(s), which may indicate that the corresponding RL UE(s) is ready for relay, in S11-17 (corresponding to S719' in FIG. 7B, and S820' in FIG. 8B), the corresponding RL UE(s) initiates an RRC connection establishment process between the RM UE and the corresponding RL UE(s) (also called a PC5-RRC connection establishment process), after the corresponding RL UE(s) receives, from the RM UE, the relay accept message(s) for indicating that it is selected as a relay node.

Figure 12:
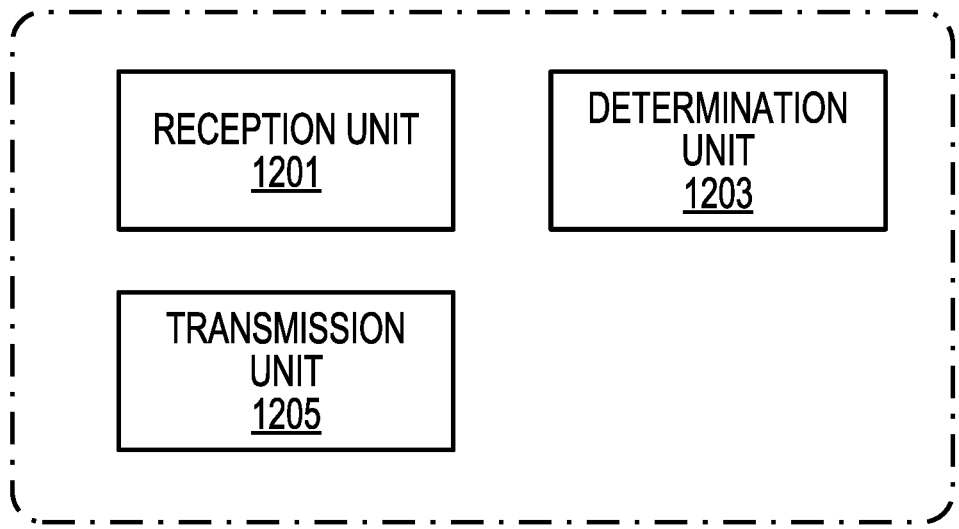
FIG. 12 schematically illustrates a block diagram of a relay UE according to an exemplary embodiment of the present disclosure.

Hereinafter, a structure of an RL UE according to an exemplary embodiment of the present disclosure will be described with reference to FIG. 12. FIG. 12 schematically shows a block diagram of an RL UE 1200 according to an exemplary embodiment of the present disclosure. The RL UE 1200 in FIG. 12 may perform the method 700/700' as described previously with reference to FIG. 7A/7B. Accordingly, some detailed description on the RL UE 1200 may refer to the corresponding description of the method 700/700' in FIG. 7A/7B and the signaling sequence diagrams of FIGS. 10 and 11 as previously discussed, and thus will be omitted here for simplicity.

As shown in FIG. 12, the RL UE 1200 includes a reception unit 1201, a determination unit 1203, and a transmission unit 1205.

The reception unit 1201 is configured to receive, from the RM UE, a relay request message indicating a relay request of the RM UE including: a relay service requested by the RM UE, and an indication of a PLMN subscribed by the RM UE.

The determination unit 1203 is configured to determine that the relay request can be accepted by the RL UE in at least one of cases where:
- the RL UE is authorized to support the relay service;
- the relay service is allowed by a current cell of the RL UE served by a network node;
- the RL UE is currently in a Radio Resource Control 'RRC'_CONNECTED state;
- the RM UE subscribes to a same PLMN as the RL UE; or
- the network node has provided relevant AS configurations to the RL UE.

The transmission unit 1205 is configured to transmit a relay response message to the RM UE based on a determination result of the RL UE.

Alternatively or additionally, the reception unit 1201 is configured to receive system information of the current cell of the RL UE from the network node, the system information including at least one of: an indication of whether the relay service is allowed by the current cell of the RL UE, or a PLMN list Alternatively or additionally, the relay response message includes at least one of:
- an indication of whether or not the RL UE accepts the relay request;
- an RRC state of the RL UE;
- an indication of a PLMN subscribed by the RL UE;
- an indication of whether the RL UE subscribes to a same PLMN as the RM UE;
- the received system information; or
- capability information of the RL UE.

Alternatively or additionally, the relay response message is transmitted to the RM UE only if the RL UE accepts the relay request.

Alternatively or additionally, the relay request message further includes: an indication of whether an L2 relay or an L3 relay is requested.

Alternatively or additionally, the relay response message is transmitted to the RM UE after at least one of:

the RL UE receives the relay request message from the RM UE, the RL UE enters an RRC_CONNECTED state from an RRC_INACTIVE/IDLE state and is configured by the network node based on an RRC setup message received from the network node to support the relay service in an RRC connection establishment process with the network node, or the RL UE is configured by the network node based on an RRC reconfiguration message received from the network node to support the relay service in an RRC reconfiguration process with the network node.

Alternatively or additionally, the RL UE 1200 further includes an RRC connection establishment unit (not shown) configured to, if the RL UE is in an RRC_INACTIVE/IDLE state, initiate an RRC connection establishment process with the network node after the RL UE receives, from the RM UE, a relay accept message indicating that the RL UE is selected by the RM UE as a relay node or the relay request message.

Alternatively or additionally, the RL UE 1200 further includes a stop unit (not shown), configured to stop the RRC connection establishment process, if the relay service is not allowed by the current cell of the RL UE.

Alternatively or additionally, the RL UE 1200 further includes an RRC reconfiguration unit (not shown) configured to, if the RL UE enters the RRC_CONNECTED state from the RRC_INACTIVE/IDLE state but is not configured to support the relay service in the RRC connection establishment process, initiate an RRC reconfiguration process with the network node in order to support the relay service.

Alternatively or additionally, the RRC reconfiguration unit is further configured to, if the RL UE is in an RRC_CONNECTED state, initiate an RRC reconfiguration process with the network node in order to support the relay service, after the RL UE receives, from the RM UE, a relay accept message indicating that the RL UE is selected by the RM UE as a relay node or the relay request message.

Alternatively or additionally, the relay accept message is received from the RM UE, after the RM UE selects the RL UE as the relay node based on the relay response message received from the RL UE.

Alternatively or additionally, the RRC connection establishment unit is further configured to:
transmit, to the network node, an RRC setup request message including the relay service;
receive, from the network node, an RRC setup message including AS configurations for the RL UE to support the relay service;
configure the RL UE itself based on the AS configurations in the received RRC setup message; and
transmit, to the network node, an RRC setup complete message indicating that the RL UE is configured based on the AS configurations in the received RRC setup message to support the relay service.

Alternatively or additionally, the RRC reconfiguration unit is further configured to, for the RL UE in the RRC_CONNECTED state or the RL UE that enters the RRC_CONNECTED state from the RRC_INACTIVE/IDLE state but is not configured to support the relay service:
transmit, to the network node, an RRC reconfiguration request message or a relay service request message that includes the relay service;
receive, from the network node, an RRC reconfiguration message including AS configurations for the RL UE to support the relay service;
configure the RL UE itself based on the AS configurations in the received RRC reconfiguration message; and
transmit, to the network node, an RRC reconfiguration complete message indicating that the RL UE is configured based on the AS configurations in the received RRC reconfiguration message to support the relay service.

Alternatively or additionally, the AS configurations include at least one of: an adaptation layer configuration, a Uu LCH configuration, or a PC5 LCH configuration.

Alternatively or additionally, the adaptation layer configuration includes at least one of: indexes assigned for the RM UE and the RL UE, or a Uu-PC5 LCH mapping.

Alternatively or additionally, the transmission unit 1205 is further configured to transmit, to the RM UE, a relay ready message indicating that the RL UE is ready for relay after the RL UE is configured to support the relay service based on the AS configurations in the RRC setup message or the RRC reconfiguration message, so that an RRC connection establishment process between the RM UE and the RL UE is initiated by the RM UE.

Alternatively or additionally, the RL UE 1200 further includes an RRC connection establishment unit, configured to initiate an RRC connection establishment process between the RM UE and the RL UE after the RL UE is configured to support the relay service based on the AS configurations in the RRC setup message or the RRC reconfiguration message.

Alternatively or additionally, the transmission unit 1205 is further configured to transmit, to the RM UE, a relay reject message, if the RL UE fails to be configured to support the relay service.

Figure 13:
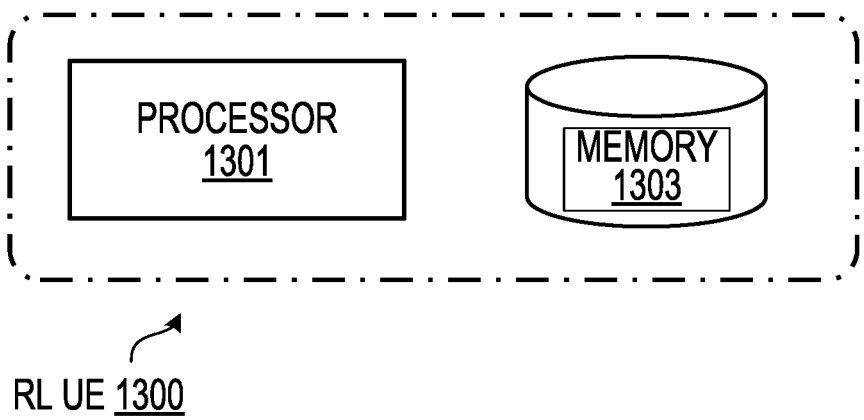
FIG. 13 schematically illustrates another block diagram of a relay UE according to an exemplary embodiment of the present disclosure.

Hereinafter, another structure of an RL UE according to an exemplary embodiment of the present disclosure will be described with reference to FIG. 13. FIG. 13 schematically shows another block diagram of an RL UE 1300 according to an exemplary embodiment of the present disclosure. The RL UE 1300 in FIG. 13 may perform the method 700/700' as described previously with reference to FIG. 7A/7B. Accordingly, some detailed description on the RL UE 1300 may refer to the corresponding description of the method 700/700' in FIG. 7A/7B and the signaling sequence diagrams of FIGS. 10 and 11 as previously discussed, and thus will be omitted here for simplicity.

As shown in FIG. 13, the RL UE 1300 includes at least one processor 1301 and at least one memory 1303. The at least one processor 1301 includes e.g., any suitable CPU (Central Processing Unit), microcontroller, DSP (Digital Signal Processor), etc., capable of executing computer program instructions. The at least one memory 1303 may be any combination of a RAM (Random Access Memory) and a ROM (Read Only Memory). The at least one processor memory 1303 may also include persistent storage, which, for example, can be any single one or combination of magnetic memory, optical memory, or solid state memory or even remotely mounted memory.

The at least one memory 1303 stores instructions executable by the at least one processor 1301, whereby the RL UE 1300 is operative to perform the methods 700/700' as described earlier respectively in conjunction with FIGS. 7A/7B and 10-11. Detailed description thereof thus will be omitted for simplicity.

In particular, the instructions, when loaded from the at least one memory 1303 and executed on the at least one processor 1301, may cause the RL UE 1300 to:
receive, from the RM UE, a relay request message indicating a relay request of the RM UE including: a relay service requested by the RM UE, and an indication of a PLMN subscribed by the RM UE;

determine that the relay request can be accepted by the RL UE in at least one of cases where:

the RL UE is authorized to support the relay service;
the relay service is allowed by a current cell of the RL UE served by a network node;
the RL UE is currently in a Radio Resource Control 'RRC'_CONNECTED state;
the RM UE subscribes to a same PLMN as the RL UE; or
the network node has provided relevant AS configurations to the RL UE; and transmit a relay response message to the RM UE based on a determination result of the RL UE.

Figure 14:
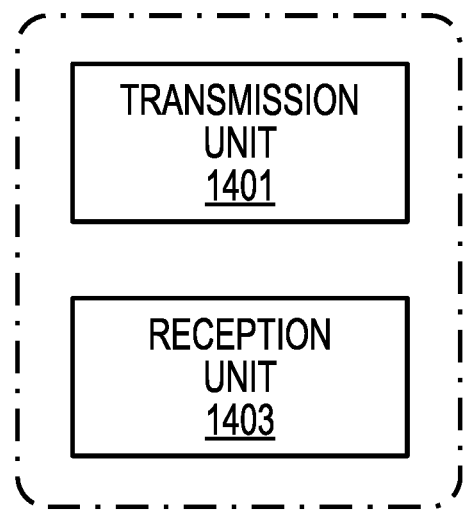
FIG. 14 schematically illustrates a block diagram of a remote UE according to an exemplary embodiment of the present disclosure.

Hereinafter, a structure of an RM UE according to an exemplary embodiment of the present disclosure will be described with reference to FIG. 14. FIG. 14 schematically shows a block diagram of an RM UE 1400 according to an exemplary embodiment of the present disclosure. The RM UE 1400 in FIG. 14 may perform the method 800/800' as described previously with reference to FIG. 8A/8B. Accordingly, some detailed description on the RM UE 1400 may refer to the corresponding description of the method 800/800' in FIG. 8A/8B and the signaling sequence diagrams of FIGS. 10 and 11 as previously discussed, and thus will be omitted here for simplicity.

As shown in FIG. 14, the RM UE 1400 includes a transmission unit 1401, and a reception unit 1403.

The transmission unit 1403 is configured to transmit, to at least one of RL UEs, a relay request message indicating a relay request of the RM UE including: a relay service requested by the RM UE, and an indication of a Public Land Mobile Network (PLMN) subscribed by the RM UE.

The reception unit 1403 is configured to receive relay response messages from the at least one of RL UEs, each relay response message including at least one of:

an indication of whether or not the corresponding RL UE accepts the relay request;
an RRC state of the corresponding RL UE;
an indication of a PLMN subscribed by the corresponding RL UE;
an indication of whether the corresponding RL UE subscribes to a same PLMN as the RM UE;
system information received by the corresponding RL UE from a network node that serves the corresponding RL UE; or
capability information of the corresponding RL UE.

Alternatively or additionally, the relay response message is received from the corresponding RL UE only if the corresponding RL UE accepts the relay request in at least one of cases where:

the corresponding RL UE is authorized to support the relay service;
the relay service is allowed by a current cell of the corresponding RL UE served by the network node;
the corresponding RL UE is currently in an RRC_CONNECTED state;
the RM UE subscribes to a same PLMN as the corresponding RL UE; or
the network node has provided relevant Access Stratum 'AS' configurations to the corresponding RL UE.

Alternatively or additionally, the system information includes at least one of: an indication of whether the relay service is allowed by a current cell of the corresponding RL UE, or a PLMN list.

Alternatively or additionally, the relay request message further includes: an indication of whether an L2 relay or an L3 relay is requested.

Alternatively or additionally, the relay response message is received from the corresponding RL UE after at least one of:

the RM UE transmits the relay request message to the corresponding RL UE,
the corresponding RL UE enters an RRC_CONNECTED state from an RRC_INACTIVE/IDLE state and is configured by the network node based on an RRC setup message received from the network node to support the relay service in an RRC connection establishment process of the corresponding RL UE with the network node, or
the corresponding RL UE is configured by the network node based on an RRC reconfiguration message received from the network node to support the relay service in an RRC reconfiguration process of the corresponding RL UE with the network node.

Alternatively or additionally, the RM UE 1400 further includes a selection unit (not shown) configured to select one or more of the at least one of RL UEs as one or more relay nodes, based on one or more relay response messages respectively received from the one or more RL UEs. The transmission unit 1401 is further configured to transmit, to the selected one or more RL UEs, one or more relay accept message respectively, each relay accept message indicating that the corresponding RL UE is selected by the RM UE as a relay node.

Alternatively or additionally, the reception unit 1403 is further configured to receive a relay ready message from the corresponding RL UE after the corresponding RL UE is configured to support the relay service. The RM UE 1400 further includes an RRC connection establishment unit (not shown), configured to initiate an RRC connection establishment process between the RM UE and the corresponding RL UE.

Alternatively or additionally, the RRC connection establishment unit is further configured to perform, with the corresponding RL UE, an RRC connection establishment process between the RM UE and the corresponding RL UE that is initiated by the corresponding RL UE after the RL UE is configured to support the relay service.

Alternatively or additionally, the RRC connection establishment unit is further configured to initiate an RRC connection establishment process between the RM UE and the network node after at least one of:

the RRC connection establishment process between the RM UE and the corresponding RL UE is established; or
the RL UE is configured to support the relay service.

Alternatively or additionally, the reception unit 1403 is further configured to receive, from the corresponding RL UE, a relay reject message, if the corresponding RL UE fails to be configured to support the relay service.

Alternatively or additionally, the selection unit is further configured to reselect one or more RL UEs from remaining of the at least one of RL UEs as one or more relay nodes based on the relay reject message and one or more relay response messages respectively received from the one or more RL UEs.

Alternatively or additionally, the reselection is performed when a number of received relay reject message is larger than a predefined threshold.

Figure 15:
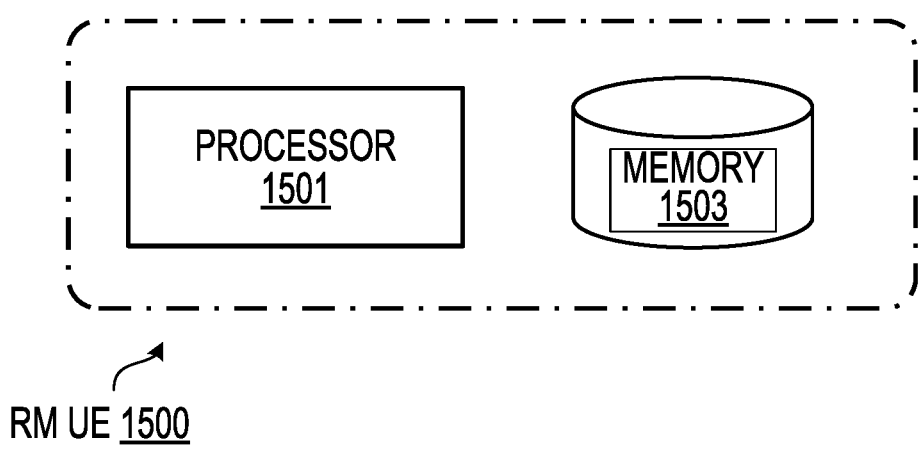
FIG. 15 schematically illustrates another block diagram of a remote UE according to an exemplary embodiment of the present disclosure.

Hereinafter, another structure of an RM UE according to an exemplary embodiment of the present disclosure will be described with reference to FIG. 15. FIG. 15 schematically shows another block diagram of an RM UE 1500 according to an exemplary embodiment of the present disclosure. The RM UE 1500 in FIG. 15 may perform the method 800/800' as described previously with reference to FIG. 8A/8B. Accordingly, some detailed description on the RM UE 1500 may refer to the corresponding description of the method 800/800' in FIG. 8A/8B and the signaling sequence diagrams of FIGS. 10 and 11 as previously discussed, and thus will be omitted here for simplicity.

As shown in FIG. 15, the RM UE 1500 includes at least one processor 1501 and at least one memory 1503. The at least one processor 1501 includes e.g., any suitable CPU (Central Processing Unit), microcontroller, DSP (Digital Signal Processor), etc., capable of executing computer program instructions. The at least one memory 1503 may be any combination of a RAM (Random Access Memory) and a ROM (Read Only Memory). The at least one processor memory 1503 may also include persistent storage, which, for example, can be any single one or combination of magnetic memory, optical memory, or solid state memory or even remotely mounted memory.

The at least one memory 1503 stores instructions executable by the at least one processor 1501, whereby the RM UE 1500 is operative to perform the methods 800/800' as described earlier respectively in conjunction with FIGS. 8A/8B and 10-11. Detailed description thereof thus will be omitted for simplicity.

In particular, the instructions, when loaded from the at least one memory 1503 and executed on the at least one processor 1501, may cause the RM UE 1500 to:

transmit, to at least one of RL UEs, a relay request message indicating a relay request of the RM UE including: a relay service requested by the RM UE, and an indication of a Public Land Mobile Network 'PLMN' subscribed by the RM UE; and receive relay response messages from the at least one of RL UEs, each relay response message including at least one of:

an indication of whether or not the corresponding RL UE accepts the relay request;

an RRC state of the corresponding RL UE;

an indication of a Public Land Mobile Network 'PLMN' subscribed by the corresponding RL UE;

an indication of whether the corresponding RL UE subscribes to a same PLMN as the RM UE;

system information received by the corresponding RL UE from a network node that serves the corresponding RL UE; or capability information of the corresponding RL UE.

Figure 16:
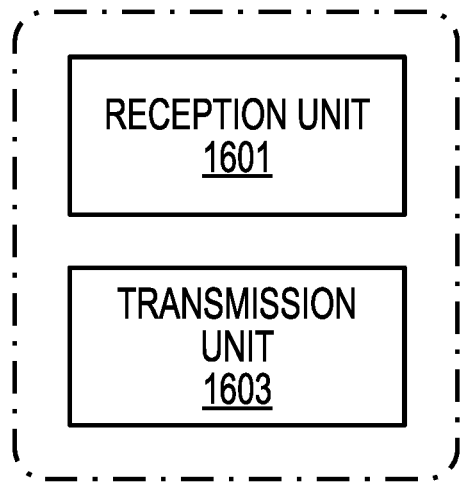
FIG. 16 schematically illustrates a block diagram of a network node according to an exemplary embodiment of the present disclosure.

Hereinafter, a structure of a network node according to an exemplary embodiment of the present disclosure will be described with reference to FIG. 16. FIG. 16 schematically shows a block diagram of a network node 1600 according to an exemplary embodiment of the present disclosure. The network node 1600 in FIG. 16 may perform the method 900/900' as described previously with reference to FIG. 9A/9B. Accordingly, some detailed description on the network node 1600 may refer to the corresponding description of the method 900/900' in FIG. 9A/9B and the signaling sequence diagrams of FIGS. 10 and 11 as previously discussed, and thus will be omitted here for simplicity.

As shown in FIG. 16, the network node 1600 includes a reception unit 1601 and a transmission unit 1603.

The reception unit 1601 is configured to receive, from an RL UE served by the network node, a configuration request message including a relay service that is requested by a RM UE for the RL UE, for requesting the network node to configure the RL UE to support the relay service.

The transmission unit 1603 is configured to transmit, to the RL UE, a configuration message for configuring the RL UE to support the relay service, wherein the configuration message includes AS configurations that include at least one of: an adaptation layer configuration, a Uu LCH configuration, or a PC5 LCH configuration.

Alternatively or additionally, in a case where the RL UE is in an RRC_INACTIVE/IDLE state, the configuration request message is an RRC setup request message that includes the relay service, and the configuration message is an RRC setup message that includes the AS configurations for the RL UE to support the relay service.

Alternatively or additionally, the reception unit 1601 is further configured to receive, from the RL UE, an RRC setup complete message indicating that the RL UE is configured based on the RRC setup message, wherein the RRC setup complete message includes a Non-Access Stratum (NAS) registration request. The transmission unit 1603 is further configured to transmit the NAS registration request to an AMF node of the RL UE to initialize context of the RL UE at the AMF node. The reception unit 1601 is further configured to receive, from the AMF node, a UE context setup request message indicating whether an L2 relay and/or an L3 relay is authorized.

Alternatively or additionally, in a case where the second UE is in an RRC_CONNECTED state, or the RL UE is in an RRC_CONNECTED state, the configuration request message is an RRC reconfiguration request message or a relay service request message that includes the relay service, and the configuration message is an RRC reconfiguration message that includes the AS configurations for the RL UE to support the relay service.

Alternatively or additionally, the reception unit 1601 is further configured to receive, from the RL UE, an RRC reconfiguration complete message indicating that the RL UE is configured to support the relay service.

Alternatively or additionally, the adaptation layer configuration includes at least one of: indexes assigned for the RM UE and the RL UE, or a Uu-PC5 LCH mapping.

Alternatively or additionally, the configuration request message is received from the RL UE, after the RL UE is selected by the RM UE as a relay node, or after the RL UE receives, from the RM UE, a relay request message including the relay service requested by the RM UE.

Alternatively or additionally, the transmission unit 1603 is further configured to transmit system information to the RL UE, the system information including at least one of: an indication of whether the relay service is allowed by a current cell of the RL UE served by the network node, or a PLMN list.

Figure 17:
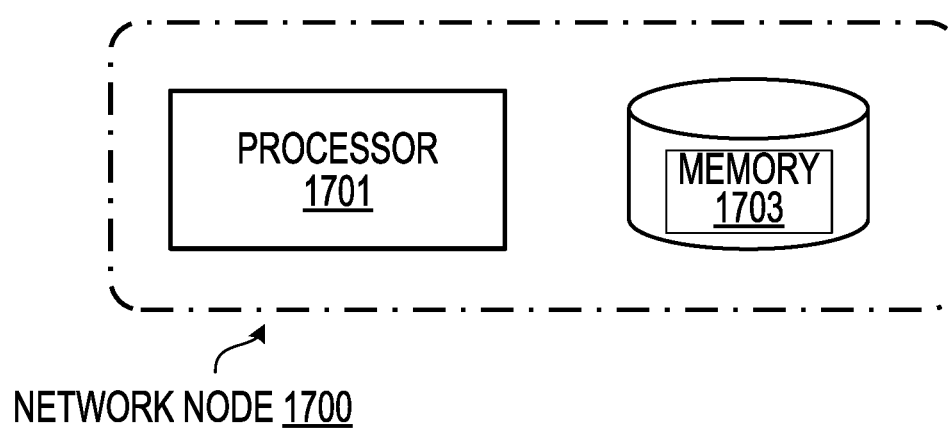
FIG. 17 schematically illustrates another block diagram of a network node according to an exemplary embodiment of the present disclosure.

Hereinafter, another structure of a network node according to an exemplary embodiment of the present disclosure will be described with reference to FIG. 17. FIG. 17 schematically shows another block diagram of a network node 1700 according to an exemplary embodiment of the present disclosure. The network node 1700 in FIG. 17 may perform the method 900/900' as described previously with reference to FIG. 9A/9B. Accordingly, some detailed description on the network node 1700 may refer to the corresponding description of the method 900/900' in FIG. 9A/9B and the signaling sequence diagrams of FIGS. 10 and 11 as previously discussed, and thus will be omitted here for simplicity.

As shown in FIG. 17, the network node 1700 includes at least one processor 1701 and at least one memory 1703. The at least one processor 1701 includes e.g., any suitable CPU (Central Processing Unit), microcontroller, DSP (Digital Signal Processor), etc., capable of executing computer program instructions. The at least one memory 1703 may be any combination of a RAM (Random Access Memory) and a ROM (Read Only Memory). The at least one memory 1703 may also include persistent storage, which, for example, can be any single one or combination of magnetic memory, optical memory, or solid state memory or even remotely mounted memory.

The at least one memory 1703 stores instructions executable by the at least one processor 1701, whereby the network node 1700 is operative to perform the methods 900/900' as described earlier respectively in conjunction with FIGS. 9A/9B and 10-11. Detailed description thereof thus will be omitted for simplicity.

In particular, the instructions, when loaded from the at least one memory 1703 and executed on the at least one processor 1701, may cause the network node 1700 to:
- receive, from an RL UE served by the network node, a configuration request message including a relay service that is requested by a RM UE for the RL UE, for requesting the network node to configure the RL UE to support the relay service; and
- transmit, to the RL UE, a configuration message for configuring the RL UE to support the relay service, wherein the configuration message includes AS configurations including at least one of: adaptation layer configuration, Uu LCH configuration, or PC5 LCH configuration.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 1301 causes the RL UE 1300 to perform the actions, e.g., of the procedure described earlier in conjunction with FIG. 7A/7B; or code/computer readable instructions, which when executed by the at least one processor 1501 causes the RM UE 1500 to perform the actions, e.g., of the procedures described earlier respectively in conjunction with FIG. 8A/8B; or code/computer readable instructions, which when executed by the at least one processor 1701 causes the network node 1700 to perform the actions, e.g., of the procedures described earlier respectively in conjunction with FIG. 9A/9B.

The computer program product may be configured as a computer program code structured in computer program modules. The computer program modules could essentially perform the actions of the flow illustrated in any of FIGS. 7A to 11.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 18:
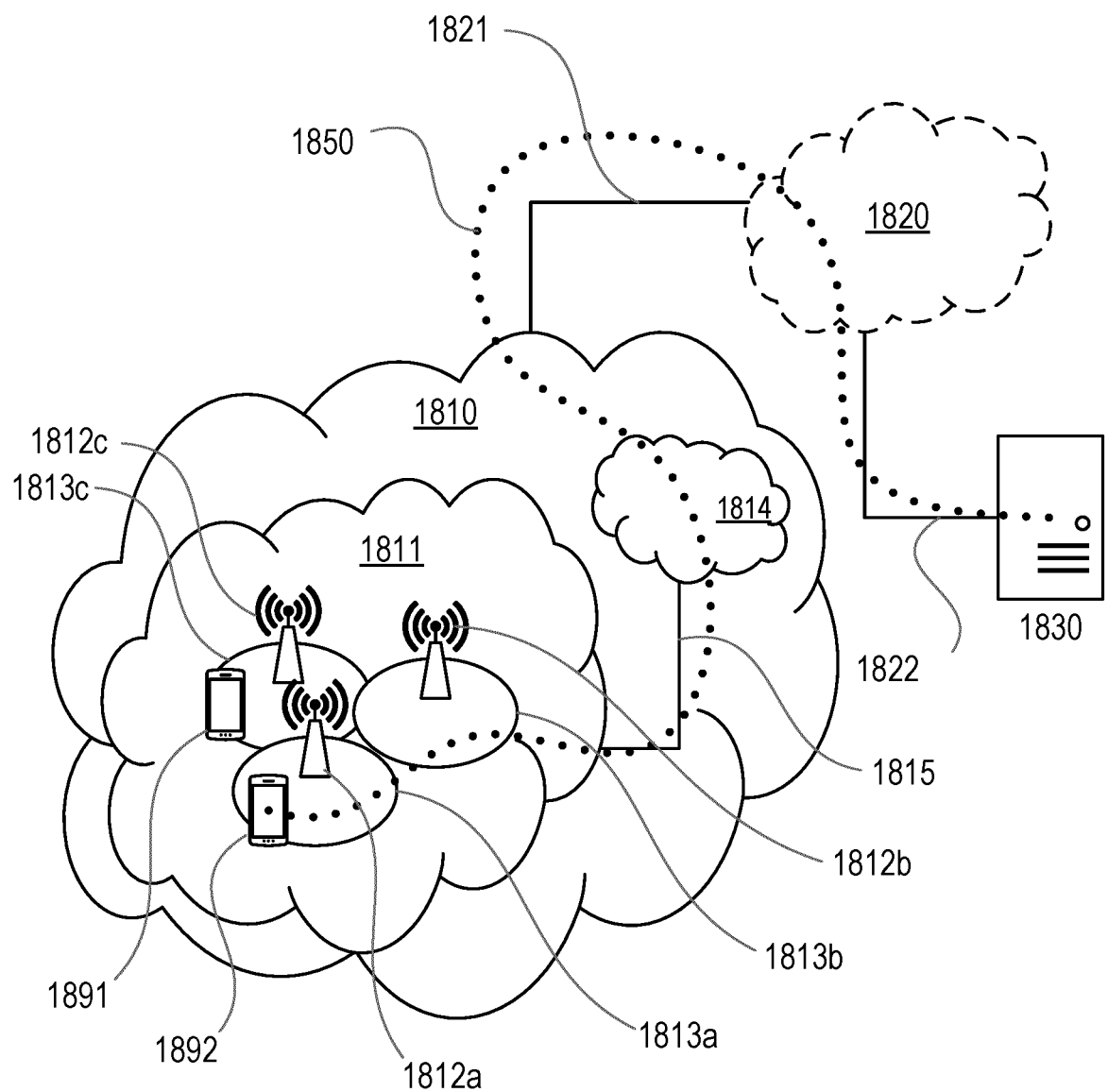
FIG. 18 schematically illustrates a telecommunication network connected via an intermediate network to a host computer.

With reference to FIG. 18, in accordance with an embodiment, a communication system includes a telecommunication network 1810, such as a 3GPP-type cellular network, which comprises an access network 1811, such as a radio access network, and a core network 1814. The access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to the core network 1814 over a wired or wireless connection 1815. A first user equipment (UE) 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

The telecommunication network 1810 is itself connected to a host computer 1830, which may be embodied in the hardware and/or software of a standalone server, a cloud-implemented server, a distributed server or as processing resources in a server farm. The host computer 1830 may be under the ownership or control of a service provider, or may be operated by the service provider or on behalf of the service provider. The connections 1821, 1822 between the telecommunication network 1810 and the host computer 1830 may extend directly from the core network 1814 to the host computer 1830 or may go via an optional intermediate network 1820. The intermediate network 1820 may be one of, or a combination of more than one of, a public, private or hosted network; the intermediate network 1820, if any, may be a backbone network or the Internet; in particular, the intermediate network 1820 may comprise two or more sub-networks (not shown).

The communication system of FIG. 18 as a whole enables connectivity between one of the connected UEs 1891, 1892 and the host computer 1830. The connectivity may be described as an over-the-top (OTT) connection 1850. The host computer 1830 and the connected UEs 1891, 1892 are configured to communicate data and/or signaling via the OTT connection 1850, using the access network 1811, the core network 1814, any intermediate network 1820 and possible further infrastructure (not shown) as intermediaries. The OTT connection 1850 may be transparent in the sense that the participating communication devices through which the OTT connection 1850 passes are unaware of routing of uplink and downlink communications. For example, a base station 1812 may not or need not be informed about the past routing of an incoming downlink communication with data originating from a host computer 1830 to be forwarded (e.g., handed over) to a connected UE 1891. Similarly, the base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In a communication system 1900, a host computer 1910 comprises hardware 1915 including a communication interface 1916 configured to set up and maintain a wired or wireless connection with an interface of a different communication device of the communication system 1900. The host computer 1910 further comprises processing circuitry 1918, which may have storage and/or processing capabilities. In particular, the processing circuitry 1918 may comprise one or more programmable processors, application-specific integrated circuits, field programmable gate arrays or combinations of these (not shown) adapted to execute instructions. The host computer 1910 further comprises software 198, which is stored in or accessible by the host computer 1910 and executable by the processing circuitry 1918. The software 198 includes a host application 1912. The host application 1912 may be operable to provide a service to a remote user, such as a UE 1930 connecting via an OTT connection 1950 terminating at the UE 1930 and the host computer 1910. In providing the service to the remote user, the host application 1912 may provide user data which is transmitted using the OTT connection 1950.

The communication system 1900 further includes a base station 1920 provided in a telecommunication system and comprising hardware 1925 enabling it to communicate with the host computer 1910 and with the UE 1930. The hardware 1925 may include a communication interface 1926 for setting up and maintaining a wired or wireless connection with an interface of a different communication device of the communication system 1900, as well as a radio interface 1927 for setting up and maintaining at least a wireless connection 1970 with a UE 1930 located in a coverage area (not shown in FIG. 19) served by the base station 1920. The communication interface 1926 may be configured to facilitate a connection 1960 to the host computer 1910. The connection 1960 may be direct or it may pass through a core network (not shown in FIG. 19) of the telecommunication system and/or through one or more intermediate networks outside the telecommunication system. In the embodiment shown, the hardware 1925 of the base station 1920 further includes processing circuitry 1928, which may comprise one or more programmable processors, application-specific integrated circuits, field programmable gate arrays or combinations of these (not shown) adapted to execute instructions. The base station 1920 further has software 1921 stored internally or accessible via an external connection.

The communication system 1900 further includes the UE 1930 already referred to. Its hardware 1935 may include a radio interface 1937 configured to set up and maintain a wireless connection 1970 with a base station serving a coverage area in which the UE 1930 is currently located. The hardware 1935 of the UE 1930 further includes processing circuitry 1938, which may comprise one or more programmable processors, application-specific integrated circuits, field programmable gate arrays or combinations of these (not shown) adapted to execute instructions. The UE 1930 further comprises software 1931, which is stored in or accessible by the UE 1930 and executable by the processing circuitry 1938. The software 1931 includes a client application 1932. The client application 1932 may be operable to provide a service to a human or non-human user via the UE 1930, with the support of the host computer 1910. In the host computer 1910, an executing host application 1912 may communicate with the executing client application 1932 via the OTT connection 1950 terminating at the UE 1930 and the host computer 1910. In providing the service to the user, the client application 1932 may receive request data from the host application 1912 and provide user data in response to the request data. The OTT connection 1950 may transfer both the request data and the user data. The client application 1932 may interact with the user to generate the user data that it provides.

Figure 19:
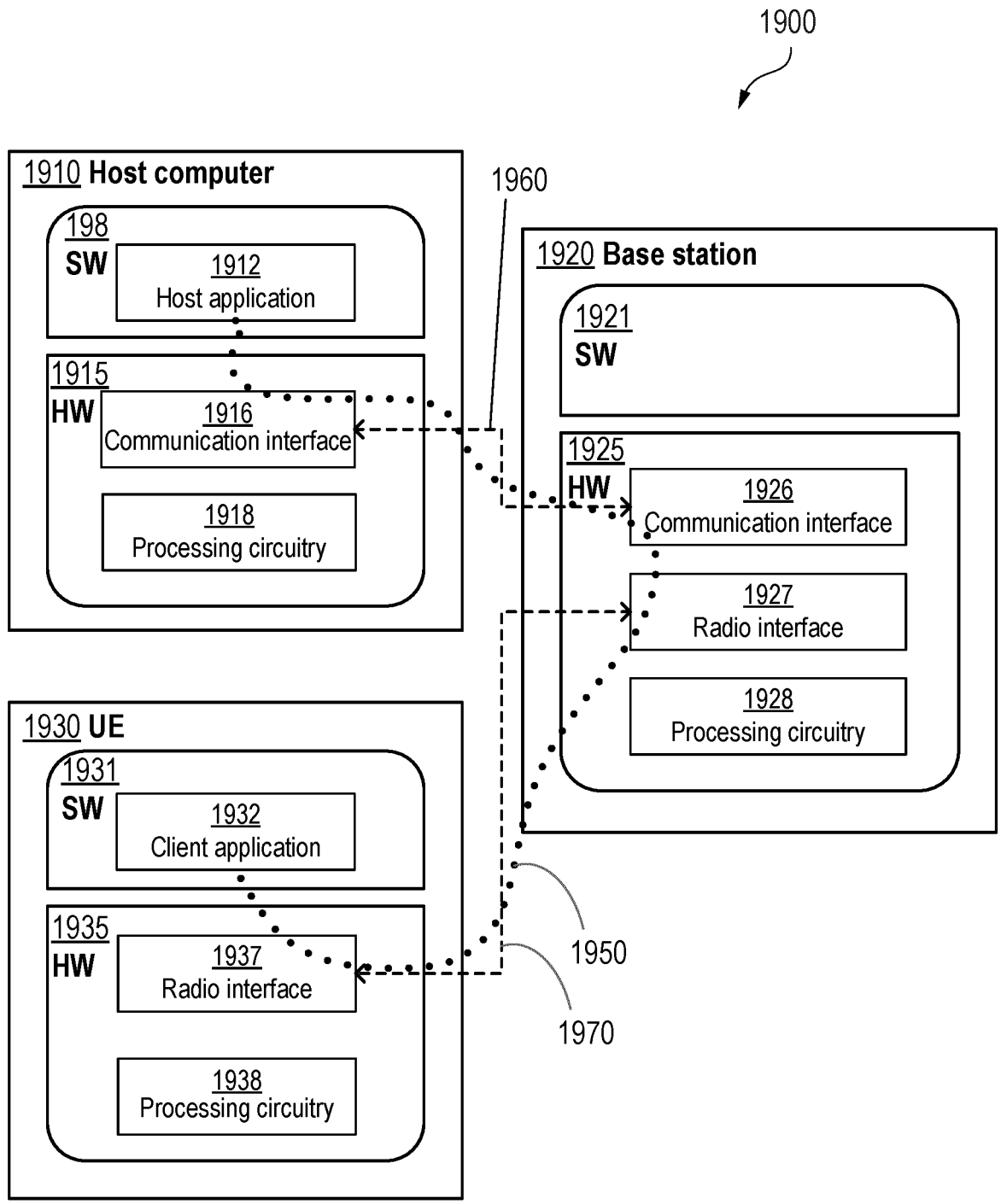
FIG. 19 is a generalized block diagram of a host computer communicating via a base station with a UE over a partially wireless connection.

It is noted that the host computer 1910, base station 1920 and UE 1930 illustrated in FIG. 19 may be identical to the host computer 1910, one of the base stations 1812*a*, 1812*b*, 1812*c* and one of the UEs 1891, 1892 of FIG. 18, respectively. This is to say, the inner workings of these entities may be as shown in FIG. 19 and independently, the surrounding network topology may be that of FIG. 18.

In FIG. 19, the OTT connection 1950 has been drawn abstractly to illustrate the communication between the host computer 1910 and the use equipment 1930 via the base station 1920, without explicit reference to any intermediary devices and the precise routing of messages via these devices. Network infrastructure may determine the routing, which it may be configured to hide from the UE 1930 or from the service provider operating the host computer 1910, or both. While the OTT connection 1950 is active, the network infrastructure may further take decisions by which it dynamically changes the routing (e.g., on the basis of load balancing consideration or reconfiguration of the network).

The wireless connection 1970 between the UE 1930 and the base station 1920 is in accordance with the teachings of the embodiments described throughout this disclosure. One or more of the various embodiments improve the performance of OTT services provided to the UE 1930 using the OTT connection 1950, in which the wireless connection 1970 forms the last segment. More precisely, the teachings of these embodiments may reduce PDCCH detection time and complexity and thereby provide benefits such as reduced user waiting time and reduced power consumption at the UE.

A measurement procedure may be provided for the purpose of monitoring data rate, latency and other factors on which the one or more embodiments improve. There may further be an optional network functionality for reconfiguring the OTT connection 1950 between the host computer 1910 and UE 1930, in response to variations in the measurement results. The measurement procedure and/or the network functionality for reconfiguring the OTT connection 1950 may be implemented in the software 198 of the host computer 1910 or in the software 1931 of the UE 1930, or both. In embodiments, sensors (not shown) may be deployed in or in association with communication devices through which the OTT connection 1950 passes; the sensors may participate in the measurement procedure by supplying values of the monitored quantities exemplified above, or supplying values of other physical quantities from which software 198, 1931 may compute or estimate the monitored quantities. The reconfiguring of the OTT connection 1950 may include message format, retransmission settings, preferred routing etc.; the reconfiguring need not affect the base station 1920, and it may be unknown or imperceptible to the base station 1920. Such procedures and functionalities may be known and practiced in the art. In certain embodiments, measurements may involve proprietary UE signaling facilitating the host computer's 1910 measurements of throughput, propagation times, latency and the like. The measurements may be implemented in that the software 198, 1931 causes messages to be transmitted, in particular empty or 'dummy' messages, using the OTT connection 1950 while it monitors propagation times, errors etc.

Figure 20:
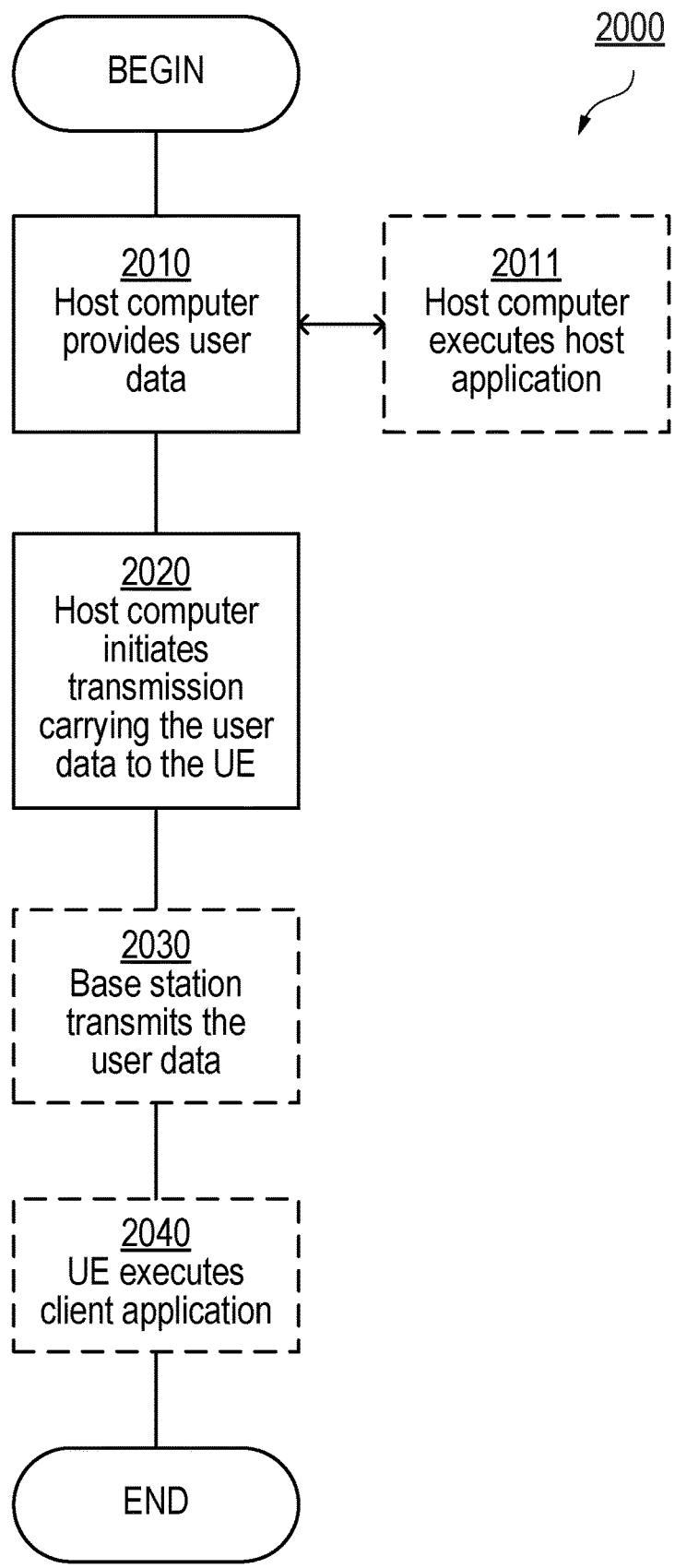
FIGS. 20 to 23 are flowcharts illustrating methods implemented in a communication system including a host computer, a base station and a UE.

FIG. 20 is a flowchart illustrating a method 2000 implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In a first step 2010 of the method, the host computer provides user data. In an optional substep 2011 of the first step 2010, the host computer provides the user data by executing a host application. In a second step 2020, the host computer initiates a transmission carrying the user data to the UE. In an optional third step 2030, the base station transmits to the UE the user data which was carried in the transmission that the host computer initiated, in accordance with the teachings of the embodiments described throughout this disclosure. In an optional fourth step 2040, the UE executes a client application associated with the host application executed by the host computer.

Figure 21:
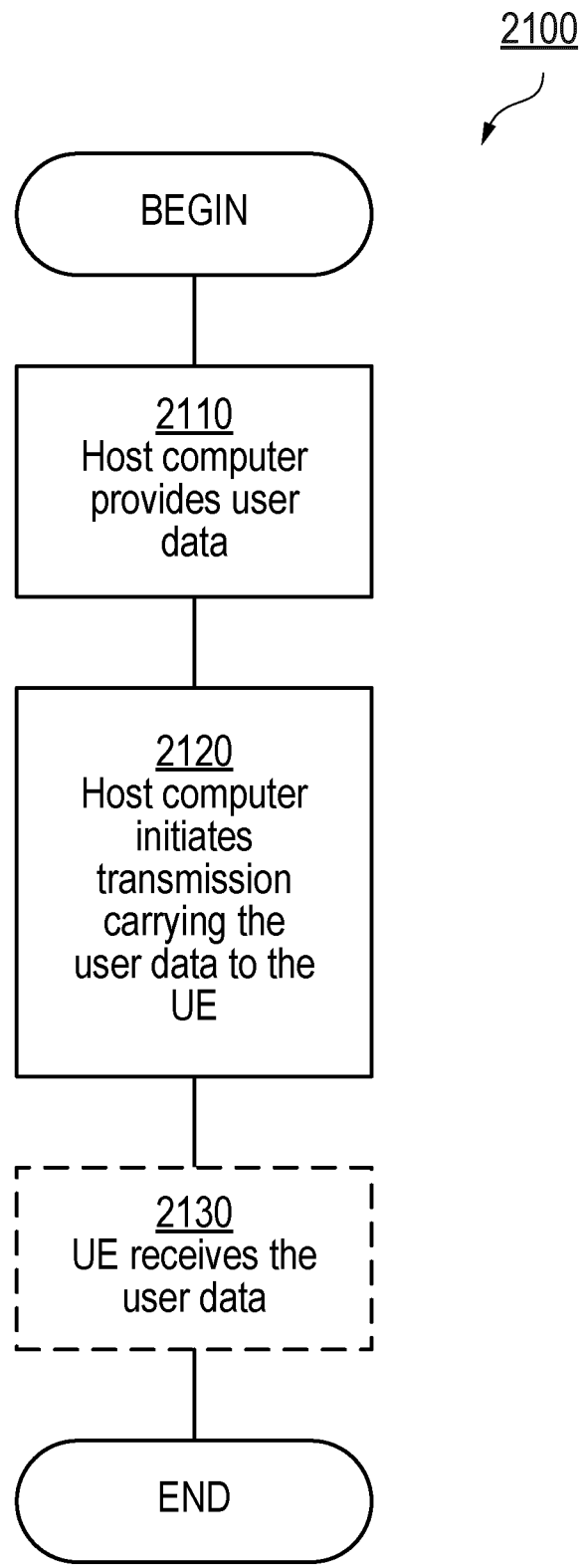

FIG. 21 is a flowchart illustrating a method 2100 implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In a first step 2110 of the method, the host computer provides user data. In an optional substep (not shown) the host computer provides the user data by executing a host application. In a second step 2120, the host computer initiates a transmission carrying the user data to the UE. The transmission may pass via the base station, in accordance with the teachings of the embodiments described throughout this disclosure. In an optional third step 2130, the UE receives the user data carried in the transmission.

Figure 22:
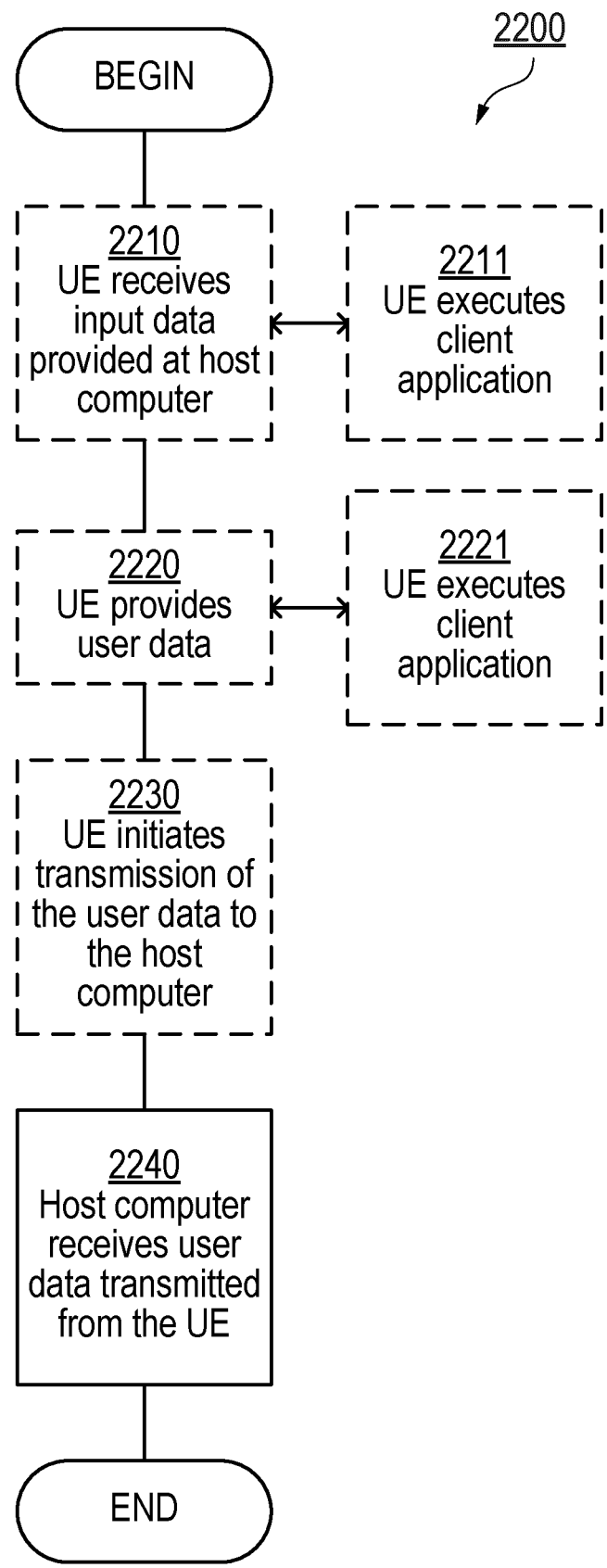

FIG. 22 is a flowchart illustrating a method 2200 implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In an optional first step 2210 of the method, the UE receives input data provided by the host computer. Additionally or alternatively, in an optional second step 2220, the UE provides user data. In an optional substep 2221 of the second step 2220, the UE provides the user data by executing a client application. In a further optional substep 2211 of the first step 2210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2230, transmission of the user data to the host computer. In a fourth step 2240 of the method, the host computer receives the user data transmitted from the UE, in accordance with the teachings of the embodiments described throughout this disclosure.

Figure 23:
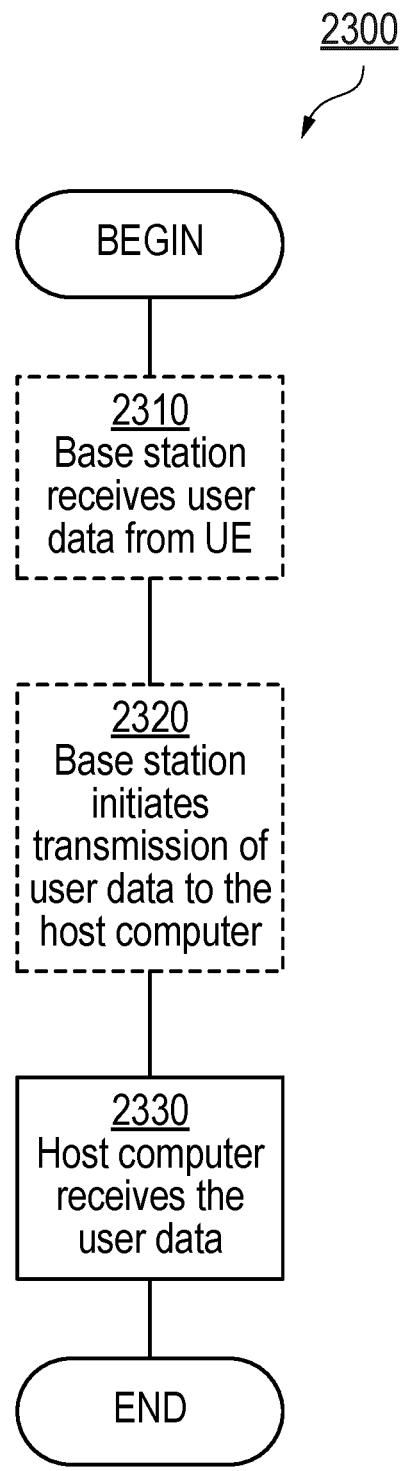

FIG. 23 is a flowchart illustrating a method 2300 implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In an optional first step 2310 of the method, in accordance with the teachings of the embodiments described throughout this disclosure, the base station receives user data from the UE. In an optional second step 2320, the base station initiates transmission of the received user data to the host computer. In a third step 2330, the host computer receives the user data carried in the transmission initiated by the base station.

Other aspects of the present disclosure are defined in the following numbered statements:

Statement 1. A method (700, 700') at a second user equipment 'UE', comprising:
  receiving (S703, S703'), from a first UE, a relay request message indicating a relay request of the first UE comprising: a relay service requested by the first UE, and an indication of a Public Land Mobile Network 'PLMN' subscribed by the first UE;
  determining (S705, S705') that the relay request can be accepted by the second UE in at least one of cases where:
    the second UE is authorized to support the relay service;
    the relay service is allowed by a current cell of the second UE served by a network node;
      the second UE is currently in a Radio Resource Control 'RRC'_CONNECTED state;
    the first UE subscribes to a same PLMN as the second UE; or
      the network node has provided relevant Access Stratum 'AS' configurations to the second UE; and
  transmitting (S707, S707') a relay response message to the first UE based on a determination result of the second UE.

Statement 2. The method (700, 700') according to Statement 1, further comprising:
  receiving (S701, S701') system information of the current cell of the second UE from the network node, the system information comprising at least one of: an indication of whether the relay service is allowed by the current cell of the second UE, or a PLMN list.

Statement 3. The method (700, 700') according to Statement 2, wherein the relay response message comprises at least one of:
  an indication of whether or not the second UE accepts the relay request;
  an RRC state of the second UE;
  an indication of a PLMN subscribed by the second UE;
  an indication of whether the second UE subscribes to a same PLMN as the first UE;
  the received system information; or
  capability information of the second UE.

Statement 4. The method (700, 700') according to any of Statements 1 to 3, wherein the relay response message is transmitted to the first UE only if the second UE accepts the relay request.

Statement 5. The method (700, 700') according to any of Statements 1 to 4, wherein the relay request message further comprises: an indication of whether an L2 relay or an L3 relay is requested.

Statement 6. The method (700, 700') according to any of Statements 1 to 5, wherein the relay response message is transmitted to the first UE after at least one of:
  the second UE receives (S703, S703') the relay request message from the first UE,
  the second UE enters an RRC_CONNECTED state from an RRC_INACTIVE/IDLE state and is configured by the network node based on an RRC setup message received from the network node to support the relay service in an RRC connection establishment process with the network node (S7115'), or
  the second UE is configured by the network node based on an RRC reconfiguration message received from the network node to support the relay service in an RRC reconfiguration process with the network node (S715', S7175').

Statement 7. The method (700, 700') according to any of Statements 1 to 6, wherein if the second UE is in an RRC_INACTIVE/IDLE state, the method further comprises:
  initiating (S711, S711') an RRC connection establishment process with the network node after the second UE receives, from the first UE, a relay accept message indicating that the second UE is selected by the first UE as a relay node (S709) or the relay request message (S703').

Statement 8. The method (700, 700') according to Statement 7, further comprising:
  stopping (S713, S713') the RRC connection establishment process, if the relay service is not allowed by the current cell of the second UE.

Statement 9. The method (700, 700') according to Statement 7, further comprising:
  initiating (S715, S715') an RRC reconfiguration process with the network node in order to support the relay service, if the second UE enters the RRC_CONNECTED state from the RRC_INACTIVE/IDLE state but is not configured to support the relay service in the RRC connection establishment process.

Statement 10. The method (700, 700') according to any of Statements 1 to 6, wherein if the second UE is in an RRC_CONNECTED state, the method further comprises:
  initiating (S717, S717') an RRC reconfiguration process with the network node in order to support the relay service, after the second UE receives, from the first UE, a relay accept message indicating that the second UE is selected by the first UE as a relay node (S709) or the relay request message (S703').

Statement 11. The method (700, 700') according to any of Statements 7 to 10, wherein the relay accept message is received (S709, S709') from the first UE, after the first UE selects the second UE as the relay node based on the relay response message received from the second UE.

Statement 12. The method (700, 700') according to any of Statements 7 to 8 and 11, wherein the RRC connection establishment process comprises:
  transmitting (S7111, S7111'), to the network node, an RRC setup request message comprising the relay service;
  receiving (S7113, S7113'), from the network node, an RRC setup message comprising AS configurations for the second UE to support the relay service;
  configuring (S7115, S7115') the second UE itself based on the AS configurations in the received RRC setup message; and
  transmitting (S7117, S7117'), to the network node, an RRC setup complete message indicating that the second UE is configured based on the AS configurations in the received RRC setup message to support the relay service.

Statement 13. The method (700, 700') according to any of Statements 9 to 11, wherein the RRC reconfiguration process comprises:
  transmitting (S7171, S7171'), to the network node, an RRC reconfiguration request message or a relay service request message that comprises the relay service;
  receiving (S7173, S7173'), from the network node, an RRC reconfiguration message comprising AS configurations for the second UE to support the relay service;
  configuring (S7175, S7175') the second UE itself based on the AS configurations in the received RRC reconfiguration message; and
  transmitting (S7177, S7177'), to the network node, an RRC reconfiguration complete message indicating that the second UE is configured based on the AS configurations in the received RRC reconfiguration message to support the relay service.

Statement 14. The method (700, 700') according to Statement 12 or 13, wherein the AS configurations comprise at least one of: adaptation layer configuration, Uu Logical Channel 'LCH' configuration, or PC5 LCH configuration.

Statement 15. The method (700, 700') according to Statement 14, wherein the adaptation layer configuration comprises at least one of: indexes assigned for the first UE and the second UE, or a Uu-PC5 LCH mapping.

Statement 16. The method (700) according to any of Statements 12 to 15, further comprises:
  transmitting (S719), to the first UE, a relay ready message indicating that the second UE is ready for relay after the second UE is configured to support the relay service based on the AS configurations in the RRC setup message or the RRC reconfiguration message, so that an RRC connection establishment process between the first UE and the second UE is initiated by the first UE.

Statement 17. The method (700') according to any of Statements 12 to 15, further comprises:
  initiating (S719') an RRC connection establishment process between the first UE and the second UE after the second UE is configured to support the relay service based on the AS configurations in the RRC setup message or the RRC reconfiguration message.

Statement 18. The method (700, 700') according to any of Statements 12 to 15, further comprising:
  transmitting (S721, S721'), to the first UE, a relay reject message, if the second UE fails to be configured to support the relay service.

Statement 19. A method (800, 800') at a first user equipment 'UE', comprising:
  transmitting (S803, S803'), to at least one of second UEs, a relay request message indicating a relay request of the first UE comprising: a relay service requested by the first UE, and an indication of a Public Land Mobile Network 'PLMN' subscribed by the first UE; and
  receiving (S807, S807') relay response messages from the at least one of second UEs, each relay response message comprising at least one of:
    an indication of whether or not the corresponding second UE accepts the relay request;
    an RRC state of the corresponding second UE;
    an indication of a Public Land Mobile Network 'PLMN' subscribed by the corresponding second UE;
    an indication of whether the corresponding second UE subscribes to a same PLMN as the first UE;
    system information received by the corresponding second UE from a network node that serves the corresponding second UE; or
    capability information of the corresponding second UE.

Statement 20. The method (800, 800') according to Statement 19, wherein the relay response message is received from the corresponding second UE only if the corresponding second UE accepts the relay request in at least one of cases where:
  the corresponding second UE is authorized to support the relay service;

the relay service is allowed by a current cell of the corresponding second UE served by the network node;

the corresponding second UE is currently in a Radio Resource Control 'RRC'_CONNECTED state;

the first UE subscribes to a same PLMN as the corresponding second UE; or the network node has provided relevant Access Stratum 'AS' configurations to the corresponding second UE.

Statement 21. The method (800, 800') according to Statement 19 or 20, wherein the system information comprises at least one of: an indication of whether the relay service is allowed by a current cell of the corresponding second UE, or a PLMN list.

Statement 22. The method (800, 800') according to any of Statements 19 to 21, wherein the relay request message further comprises: an indication of whether an L2 relay or an L3 relay is requested.

Statement 23. The method (800, 800') according to any of Statements 19 to 22, wherein the relay response message is received from the corresponding second UE after at least one of:

the first UE transmits the relay request message to the corresponding second UE (S803, S803'), the corresponding second UE enters an RRC_CONNECTED state from an RRC_INACTIVE/IDLE state and is configured by the network node based on an RRC setup message received from the network node to support the relay service in an RRC connection establishment process of the corresponding second UE with the network node, or the corresponding second UE is configured by the network node based on an RRC reconfiguration message received from the network node to support the relay service in an RRC reconfiguration process of the corresponding second UE with the network node.

Statement 24. The method (800, 800') according to any of Statements 19 to 23, further comprising:

selecting (S808, S808') one or more of the at least one of second UEs as one or more relay nodes, based on one or more relay response messages respectively received from the one or more second UEs; and transmitting (S809, S809'), to the selected one or more second UEs, one or more relay accept message respectively, each relay accept message indicating that the corresponding second UE is selected by the first UE as a relay node.

Statement 25. The method (800) according to Statement 24, further comprising:

receiving (S819) a relay ready message from the corresponding second UE after the corresponding second UE is configured to support the relay service; and initiating (S820) an RRC connection establishment process between the first UE and the corresponding second UE.

Statement 26. The method (800') according to Statement 24, further comprising:

performing (S820'), with the corresponding second UE, an RRC connection establishment process between the first UE and the corresponding second UE that is initiated by the corresponding second UE after the second UE is configured to support the relay service.

Statement 27. The method (800, 800') according to Statement 24, further comprising:

initiating (S822, S822') an RRC connection establishment process between the first UE and the network node after at least one of:

the RRC connection establishment process between the first UE and the corresponding second UE is established (S820); or the second UE is configured to support the relay service.

Statement 28. The method (800, 800') according to any of Statements 19 to 27, further comprising:

receiving (S821, S821'), from the corresponding second UE, a relay reject message, if the corresponding second UE fails to be configured to support the relay service.

Statement 29. The method (800, 800') according to Statement 28, further comprising:

reselecting (S823, S823') one or more second UEs from remaining of the at least one of second UEs as one or more relay nodes based on the relay reject message and one or more relay response messages respectively received from the one or more second UEs.

Statement 30. The method (800, 800') according to Statement 29, wherein the reselection is performed when a number of received relay reject message is larger than a predefined threshold.

Statement 31. A method (900, 900') at a network node, comprising:

receiving (S903, S903'), from a second user equipment 'UE' served by the network node, a configuration request message comprising a relay service that is requested by a first UE for the second UE, for requesting the network node to configure the second UE to support the relay service; and transmitting (S905, S905'), to the second UE, a configuration message for configuring the second UE to support the relay service, wherein the configuration message comprises AS configurations that include at least one of: adaptation layer configuration, Uu Logical Channel 'LCH' configuration, or PC5 LCH configuration.

Statement 32. The method (900) according to Statement 31, wherein in a case where the second UE is in an RRC_INACTIVE/IDLE state, the configuration request message is an RRC setup request message that comprises the relay service, and the configuration message is an RRC setup message that comprises the AS configurations for the second UE to support the relay service.

Statement 33. The method (900) according to Statement 32, further comprising:

receiving (S907), from the second UE, an RRC setup complete message indicating that the second UE is configured based on the RRC setup request message, wherein the RRC setup complete message comprises a Non-Access Stratum 'NAS' registration request;

transmitting (S909) the NAS registration request to an Access Management Function 'AMF' node of the second UE to initialize context of the second UE at the AMF node; and receiving (S911), from the AMF node, a UE context setup request message indicating whether an L2 relay and/or an L3 layer is authorized.

Statement 34. The method (900) according to Statement 31, wherein in a case where the second UE is in an RRC_CONNECTED state, or the second UE enters the RRC_CONNECTED state from an RRC_INACTIVE/IDLE state but is not configured to support the relay service in an RRC connection establishment process, the configuration request message is an RRC reconfiguration request message or a relay service request message that comprises the relay service, and the configuration message is an RRC reconfiguration message that comprises the AS configurations for the second UE to support the relay service.

Statement 35. The method (900') according to Statement 34, further comprising:
receiving (S907'), from the second UE, an RRC reconfiguration complete message indicating that the second UE is configured to support the relay service.

Statement 36. The method (900, 900') according to any of Statements 31 to 35, wherein the adaptation layer configuration comprises at least one of: indexes assigned for the first UE and the second UE, or a Uu-PC5 LCH mapping.

Statement 37. The method (900, 900') according to any of Statements 31 to 36, wherein the configuration request message is received from the second UE, after the second UE is selected by the first UE as a relay node, or after the second UE receives, from the first UE, a relay request message comprising the relay service requested by the first UE.

Statement 38. The method (900, 900') according to any of Statements 31 to 37, further comprising:
transmitting (S901, S901') system information to the second UE, the system information comprising at least one of: an indication of whether the relay service is allowed by a current cell of the second UE served by the network node, or a Public Land Mobile Network 'PLMN' list.

Statement 39. A second user equipment 'UE' (1300), comprising:
at least one processor (1301), and
at least one memory (1303), storing instructions which, when executed on the at least one processor (1301), cause the second UE (1300) to:
receive, from a first UE, a relay request message indicating a relay request of the first UE comprising:
a relay service requested by the first UE, and an indication of a Public Land Mobile Network 'PLMN' subscribed by the first UE;
determine that the relay request can be accepted by the second UE in at least one of cases where:
the second UE is authorized to support the relay service;
the relay service is allowed by a current cell of the second UE served by a network node;
the second UE is currently in a Radio Resource Control 'RRC'_CONNECTED state;
the first UE subscribes to a same PLMN as the second UE; or
the network node has provided relevant Access Stratum 'AS' configurations to the second UE; and
transmit a relay response message to the first UE based on a determination result of the second UE.

Statement 40. The second UE (1300) according to Statement 39, wherein the instructions, when executed on the at least one processor (1301), further cause the second UE (1300) to perform the method according to any of Statements 2 to 18.

Statement 41. A first user equipment 'UE' (1500), comprising:
at least one processor (1501), and
at least one memory (1503), storing instructions which, when executed on the at least one processor (1501), cause the first UE (1500) to:
transmit, to at least one of second UEs, a relay request message indicating a relay request of the first UE comprising: a relay service requested by the first UE, and an indication of a Public Land Mobile Network 'PLMN' subscribed by the first UE; and
receive relay response messages from the at least one of second UEs, each relay response message comprising at least one of:
an indication of whether or not the corresponding second UE accepts the relay request;
an RRC state of the corresponding second UE;
an indication of a Public Land Mobile Network 'PLMN' subscribed by the corresponding second UE;
an indication of whether the corresponding second UE subscribes to a same PLMN as the first UE;
system information received by the corresponding second UE from a network node that serves the corresponding second UE; or
capability information of the corresponding second UE.

Statement 42. The first UE (1500) according to Statement 41, wherein the instructions, when executed on the at least one processor (1501), further cause the first UE (1500) to perform the method according to any of Statements 20 to 30.

Statement 43. A network node (1700), comprising:
at least one processor (1701), and
at least one memory (1703), storing instructions which, when executed on the at least one processor (1701), cause the network node (1700) to:
receive, from a second user equipment 'UE' served by the network node, a configuration request message comprising a relay service that is requested by a first UE for the second UE, for requesting the network node to configure the second UE to support the relay service; and
transmit, to the second UE, a configuration message for configuring the second UE to support the relay service, wherein the configuration message comprises AS configurations that include at least one of: adaptation layer configuration, Uu Logical Channel 'LCH' configuration, or PC5 LCH configuration.

Statement 44. The network node (1700) according to Statement 43, wherein the instructions, when executed on the at least one processor (1701), further cause the network node to perform the method according to any of Statements 32 to 38.

Statement 45. A computer readable storage medium having computer program instructions stored thereon, the computer program instructions, when executed by at least one processor, causing the at least one processor to perform the method according to any of Statements 1 to 18.

Statement 46. A computer readable storage medium having computer program instructions stored thereon, the computer program instructions, when executed by at least one processor, causing the at least one processor to perform the method according to any of Statements 19 to 30.

Statement 47. A computer readable storage medium having computer program instructions stored thereon, the computer program instructions, when executed by at least one processor, causing the at least one processor to perform the method according to any of Statements 31 to 38.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method at a second user equipment, UE, comprising:
receiving, from a first UE, a relay request message indicating a relay request of the first UE, wherein the relay request is for a relay service requested by the first UE, and the relay request message comprises an indication of a Public Land Mobile Network, PLMN, to which the first UE is subscribed;
determining that the relay request can be accepted by the second UE in at least one case where:
the second UE is authorized to support the relay service;
the relay service is allowed by a current cell of the second UE served by a network node;
the second UE is currently in a Radio Resource Control, RRC, connected state;
the first UE subscribes to a same PLMN as the second UE; or
the network node has provided relevant Access Stratum, AS, configurations to the second UE; and
transmitting a relay response message to the first UE based on a result of the determination;
wherein the relay request message further comprises: an indication of whether or not a Layer 2 relay or a Layer 3 relay is requested.

2. The method according to claim 1, further comprising:
receiving system information of the current cell of the second UE from the network node, the system information comprising at least one of:
an indication of whether or not the relay service is allowed by the current cell of the second UE; or
a PLMN list.

3. The method according to claim 1, wherein the relay response message comprises at least one of:
an indication of whether or not the second UE accepts the relay request;
an RRC state of the second UE;
an indication of a PLMN to which the second UE is subscribed;
an indication of whether or not the second UE subscribes to a same PLMN as the first UE;
system information; or
capability information of the second UE.

4. The method according to claim 1, wherein the relay response message is transmitted to the first UE only if the second UE accepts the relay request.

5. The method according to claim 1, wherein the relay response message is transmitted to the first UE after at least one of:
the second UE receives the relay request message from the first UE,
the second UE enters an RRC connected state from an RRC inactive or idle state and is configured, by the network node based on an RRC setup message received from the network node, to support the relay service in an RRC connection establishment process with the network node, or
the second UE is configured, by the network node based on an RRC reconfiguration message received from the network node, to support the relay service in an RRC reconfiguration process with the network node.

6. The method according to claim 1, wherein if the second UE is in an RRC connected state, the method further comprises:
initiating an RRC reconfiguration process with the network node in order to support the relay service, after the second UE receives, from the first UE, a relay accept message indicating that the second UE is selected by the first UE as a relay node or the relay request message.

7. The method according to claim 6, wherein the RRC reconfiguration process comprises:
transmitting, to the network node, an RRC reconfiguration request message or a relay service request message that comprises the relay service;
receiving, from the network node, an RRC reconfiguration message comprising AS configurations for the second UE to support the relay service;
configuring the second UE itself based on the AS configurations in the received RRC reconfiguration message; and
transmitting, to the network node, an RRC reconfiguration complete message indicating that the second UE is configured, based on the AS configurations in the received RRC reconfiguration message, to support the relay service.

8. The method according to claim 7, wherein the AS configurations comprise at least one of:
an adaptation layer configuration;
a Uu Logical Channel, LCH, configuration; or
a PC5 LCH configuration.

9. The method according to claim 8, wherein the adaptation layer configuration comprises at least one of: indexes assigned for the first UE and the second UE, or a Uu LCH to PC5 LCH mapping.

10. A method at a first user equipment, UE, comprising:
transmitting, to at least one second UE, a relay request message indicating a relay request of the first UE, wherein the relay request is for a relay service requested by the first UE, and the relay request message comprises an indication of a Public Land Mobile Network, PLMN, to which the first UE is subscribed; and
receiving a relay response message from the at least one second UE, wherein each relay response message comprises at least one of:
an indication of whether or not the corresponding second UE accepts the relay request;
a Radio Resource Control, RRC, state of the corresponding second UE;
an indication of a PLMN to which the corresponding second UE is subscribed;
an indication of whether or not the corresponding second UE subscribes to a same PLMN as the first UE;
system information received by the corresponding second UE from a network node that serves the corresponding second UE; or
capability information of the corresponding second UE;
wherein the relay request message further comprises: an indication of whether or not a Layer 2 relay or a Layer 3 relay is requested.

11. The method according to claim 10, wherein the relay response message is received from the corresponding second UE only if the corresponding second UE accepts the relay request in at least one case where:
the corresponding second UE is authorized to support the relay service;
the relay service is allowed by a current cell of the corresponding second UE served by the network node;
the corresponding second UE is currently in an RRC connected state;
the first UE subscribes to a same PLMN as the corresponding second UE; or the network node has provided relevant Access Stratum, AS, configurations to the corresponding second UE.

12. The method according to claim 10, wherein the system information comprises at least one of:
an indication of whether or not the relay service is allowed by a current cell of the corresponding second UE; or
a PLMN list.

13. The method according to claim 10, wherein the relay response message is received from the corresponding second UE after at least one of:
the first UE transmits the relay request message to the corresponding second UE,
the corresponding second UE enters an RRC connected state from an RRC inactive or idle state and is configured, by the network node based on an RRC setup message received from the network node, to support the relay service in an RRC connection establishment process of the corresponding second UE with the network node, or
the corresponding second UE is configured, by the network node based on an RRC reconfiguration message received from the network node, to support the relay service in an RRC reconfiguration process of the corresponding second UE with the network node.

14. The method according to claim 10, further comprising:
initiating an RRC connection establishment process between the first UE and the network node after at least one of:
the RRC connection establishment process between the first UE and the corresponding second UE is established; or
the second UE is configured to support the relay service.

15. A method at a network node, comprising:
receiving, from a second user equipment, UE, served by the network node, a configuration request message indicating a request for the network node to configure the second UE to support a relay service that is requested by a first UE for the second UE; and
transmitting, to the second UE, a configuration message for configuring the second UE to support the relay service, wherein the configuration message comprises Access Stratum, AS, configurations that include at least one of:
an adaptation layer configuration;
a Uu Logical Channel, LCH, configuration; or
a PC5 LCH configuration;
wherein the configuration request message is received from the second UE, after the second UE is selected by the first UE as a relay node, or after the second UE receives, from the first UE, a relay request message comprising the relay service requested by the first UE;
wherein the relay request message further comprises: an indication of whether or not a Layer 2 relay or a Layer 3 relay is requested.

16. The method according to claim 15, wherein in a case where the second UE is in a Radio Resource Control, RRC, inactive or idle state, the configuration request message is an RRC setup request message that comprises the relay service, and the configuration message is an RRC setup message that comprises the AS configurations for the second UE to support the relay service.

17. The method according to claim 16, further comprising:
receiving, from the second UE, an RRC setup complete message indicating that the second UE is configured based on the RRC setup request message, wherein the RRC setup complete message comprises a Non-Access Stratum, NAS, registration request;
transmitting the NAS registration request to an Access Management Function, AMF, node of the second UE to initialize context of the second UE at the AMF node; and
receiving, from the AMF node, a UE context setup request message indicating whether or not a Layer 2 relay and/or a Layer 3 relay is authorized.

18. The method according to claim 15, wherein in a case where the second UE is in a Radio Resource Control, RRC, connected state, or the second UE enters the RRC connected state from an RRC inactive or idle state but is not configured to support the relay service in an RRC connection establishment process, the configuration request message is an RRC reconfiguration request message or a relay service request message that comprises the relay service, and the configuration message is an RRC reconfiguration message that comprises the AS configurations for the second UE to support the relay service.

19. The method according to claim 18, further comprising:
receiving, from the second UE, an RRC reconfiguration complete message indicating that the second UE is configured to support the relay service.

20. The method according to claim 15, wherein the adaptation layer configuration comprises at least one of: indexes assigned for the first UE and the second UE, or a Uu LCH to PC5 LCH mapping.

21. The method according to claim 15, further comprising:
transmitting system information to the second UE, the system information comprising at least one of:
an indication of whether or not the relay service is allowed by a current cell of the second UE served by the network node; or
a Public Land Mobile Network, PLMN, list.

22. A second user equipment, UE, comprising:
at least one processor, and
at least one memory, storing instructions which, when executed on the at least one processor, cause the second UE to:
receive, from a first UE, a relay request message indicating a relay request of the first UE, wherein the relay request is for a relay service requested by the first UE, and the relay request message comprises an indication of a Public Land Mobile Network, PLMN, to which the first UE is subscribed;
determine that the relay request can be accepted by the second UE in at least one case where:
the second UE is authorized to support the relay service;
the relay service is allowed by a current cell of the second UE served by a network node;
the second UE is currently in a Radio Resource Control, RRC, connected state;
the first UE subscribes to a same PLMN as the second UE; or
the network node has provided relevant Access Stratum, AS, configurations to the second UE; and
transmit a relay response message to the first UE based on a result of the determination;
wherein the relay request message further comprises: an indication of whether or not a Layer 2 relay or a Layer 3 relay is requested.

23. A first user equipment, UE, comprising:
at least one processor, and
at least one memory, storing instructions which, when executed on the at least one processor, cause the first UE to:
  transmit, to at least one second UE, a relay request message indicating a relay request of the first UE, wherein the relay request is for a relay service requested by the first UE, and the relay request message comprises an indication of a Public Land Mobile Network, PLMN, to which the first UE is subscribed; and
  receive a relay response message from the at least one second UE, wherein each relay response message comprises at least one of:
    an indication of whether or not the corresponding second UE accepts the relay request;
    a Radio Resource Control, RRC, state of the corresponding second UE;
    an indication of a PLMN to which the corresponding second UE is subscribed;
    an indication of whether or not the corresponding second UE subscribes to a same PLMN as the first UE;
    system information received by the corresponding second UE from a network node that serves the corresponding second UE; or
    capability information of the corresponding second UE;
  wherein the relay request message further comprises: an indication of whether or not a Layer 2 relay or a Layer 3 relay is requested.

24. A network node, comprising:
at least one processor, and
at least one memory, storing instructions which, when executed on the at least one processor, cause the network node to:
  receive, from a second user equipment, UE, served by the network node, a configuration request message indicating a request for the network node to configure the second UE to support a relay service that is requested by a first UE for the second UE; and
  transmit, to the second UE, a configuration message for configuring the second UE to support the relay service, wherein the configuration message comprises Access Stratum, AS, configurations that include at least one of:
    an adaptation layer configuration;
    a Uu Logical Channel, LCH, configuration; or
    a PC5 LCH configuration;
  wherein the configuration request message is received from the second UE, after the second UE is selected by the first UE as a relay node, or after the second UE receives, from the first UE, a relay request message comprising the relay service requested by the first UE;
  wherein the relay request message further comprises: an indication of whether or not a Layer 2 relay or a Layer 3 relay is requested.

* * * * *